(12) United States Patent
Van Fleet et al.

(10) Patent No.: US 10,877,152 B2
(45) Date of Patent: Dec. 29, 2020

(54) SYSTEMS AND METHODS FOR GENERATING SYNTHETIC SENSOR DATA

(71) Applicant: The MathWorks, Inc., Natick, MA (US)

(72) Inventors: Chad M. Van Fleet, South Lyon, MI (US); Joseph P. Lomonaco, South Lyon, MI (US); Arvind Jayaraman, Lyon Township, MI (US)

(73) Assignee: The MathWorks, Inc., Natick, MA (US)

( * ) Notice: Subject to any disclaimer, the term of this patent is extended or adjusted under 35 U.S.C. 154(b) by 58 days.

(21) Appl. No.: 16/191,552

(22) Filed: Nov. 15, 2018

(65) Prior Publication Data

US 2019/0302259 A1    Oct. 3, 2019

Related U.S. Application Data

(60) Provisional application No. 62/729,497, filed on Sep. 11, 2018, provisional application No. 62/679,371, (Continued)

(51) Int. Cl.
*G06K 9/00* (2006.01)
*G01S 17/86* (2020.01)
(Continued)

(52) U.S. Cl.
CPC .......... *G01S 17/86* (2020.01); *G01S 15/8993* (2013.01); *G01S 15/8997* (2013.01); *G01S 17/90* (2020.01);
(Continued)

(58) Field of Classification Search
CPC .. G01S 15/8993; G01S 15/8997; G01S 17/86; G01S 17/90; G05D 1/024; G05D 1/0255; G05D 1/0257; G05D 2201/0213; G06T 11/001; G06T 15/506; G06T 17/05; G06T 1/20
See application file for complete search history.

(56) References Cited

U.S. PATENT DOCUMENTS 6,735,557 B1 * 5/2004 Castellar ................. G06T 15/00
                                                                      701/436
9,519,739 B1   12/2016 Kuznicki et al.
(Continued)

OTHER PUBLICATIONS

Berger, Christian, et al., "Engineering Autonomous Driving Software," Experience from the DARPA Urban Challenge, Springer 2012, pp. 1-29.

(Continued)

*Primary Examiner* — Ian L Lemieux
(74) *Attorney, Agent, or Firm* — Cesari and McKenna, LLP; Michael R. Reinemann

(57) ABSTRACT

Systems and methods generate synthetic sensor data, such as synthetic radar, lidar, and/or sonar data from three dimensional (3D) scene data that may be custom designed. Reflectivity coefficients in the radar, lidar, and/or sonar spectrums may be determined for objects included in the 3D scene data. The reflectivity coefficients may be utilized by a game engine for computing the synthetic sensor data. The synthetic sensor data may be used in the creation, evaluation, and/or verification of a design for a controller or other system that utilizes such data.

29 Claims, 38 Drawing Sheets

Related U.S. Application Data filed on Jun. 1, 2018, provisional application No. 62/648,664, filed on Mar. 27, 2018.

(51) Int. Cl.

| | |
|---|---|
| *G01S 15/89* | (2006.01) |
| *G06T 1/20* | (2006.01) |
| *G06T 11/00* | (2006.01) |
| *G06T 15/50* | (2011.01) |
| *G06T 17/05* | (2011.01) |
| *G05D 1/02* | (2020.01) |
| *G01S 17/90* | (2020.01) |

(52) U.S. Cl.
CPC .......... *G05D 1/024* (2013.01); *G05D 1/0255* (2013.01); *G05D 1/0257* (2013.01); *G06T 1/20* (2013.01); *G06T 11/001* (2013.01); *G06T 15/506* (2013.01); *G06T 17/05* (2013.01); *G05D 2201/0213* (2013.01)

(56) References Cited

U.S. PATENT DOCUMENTS

| | | | |
|---|---|---|---|
| 10,482,003 B1* | 11/2019 | Bondor | B62D 15/025 |
| 2015/0023602 A1* | 1/2015 | Wnuk | G06F 19/321 |
| | | | 382/190 |
| 2016/0321381 A1* | 11/2016 | English | G05B 17/02 |
| 2017/0039765 A1* | 2/2017 | Zhou | G06T 19/006 |
| 2018/0025640 A1 | 1/2018 | Micks et al. | |
| 2018/0060725 A1 | 3/2018 | Groh et al. | |
| 2019/0152486 A1* | 5/2019 | Schuette | G06K 9/00791 |
| 2019/0179979 A1* | 6/2019 | Melick | G01S 17/931 |
| 2019/0213290 A1* | 7/2019 | Delva | B60W 50/00 |
| 2019/0236341 A1* | 8/2019 | Nallapa | G06K 9/00335 |
| 2019/0236380 A1* | 8/2019 | Fukuhara | G05D 1/0088 |
| 2019/0243371 A1* | 8/2019 | Nister | G05D 1/0231 |
| 2019/0278698 A1* | 9/2019 | Ahner | G06F 30/15 |
| 2020/0074266 A1* | 3/2020 | Peake | G05D 1/0257 |
| 2020/0098172 A1* | 3/2020 | Atsmon | G06T 19/006 |

OTHER PUBLICATIONS

Jayaraman, Arvind, et al., "Creating 3D Virtual Driving Environments for Simulation-Aided Development of Autonomous Driving and Active Safety," SAE International, SAE Technical Paper 2017-01-0107, Mar. 28, 2017, pp. 1-6.

Koopman, Phillip, et al., "Challenges in Autonomous Vehicle Testing and Validation," Preprint: 2016 SAR World Congress, SAE International Journal of Transportation Safety, SAE Technical Paper 2016-01-0128, 2016, pp. 1-10.

Phong, Bui Tuong, "Illumination for Computer Generated Pictures," Graphics and Image Processing, Communications of the ACM, vol. 18, No. 6, Jun. 1975, pp. 311-317.

"RF Toolbox™: User's Guide," R2018a, The MathWorks, Inc., Mar. 2018, pp. 1-1272.

"RF Blockset™: User's Guide," R2018a, The MathWorks, Inc., Mar. 2018, pp. 1-264.

"European Search Report and Written Opinion," European Application No. 19164309.7, Applicant: The MathWorks, Inc., dated Aug. 26, 2019, pp. 1-8.

\* cited by examiner

| Material ID | Material Path | Radar | | | Sonar | | | Lidar | | |
|---|---|---|---|---|---|---|---|---|---|---|
| | | Diffuse Strength | Specular Strength | Specular Exponent | Diffuse Strength | Specular Strength | Specular Exponent | Diffuse Strength | Specular Strength | Specular Exponent |
| 1 | "/Game/Assets/Materials/Concrete" | 0.6 | 0.1 | 10 | 0.6 | 0.1 | 10 | 0.6 | 0.1 | 10 |
| 2 | "/Game/Assets/Materials/Asphalt" | 0.6 | 0.1 | 10 | 0.6 | 0.1 | 10 | 0.6 | 0.1 | 10 |
| 3 | "/Game/Assets/Materials/Metal" | 0.3 | 0.9 | 25 | 0.3 | 0.9 | 25 | 0.3 | 0.9 | 25 |
| 4 | "/Game/Assets/Materials/Glass" | 0.3 | 0.8 | 20 | 0.3 | 0.8 | 20 | 0.3 | 0.8 | 20 |
| 5 | "/Game/Assets/Materials/Plastic" | 0.5 | 0.3 | 10 | 0.5 | 0.3 | 10 | 0.5 | 0.3 | 10 |
| 6 | "/Game/Assets/Materials/Skin" | 0.8 | 0.1 | 10 | 0.8 | 0.1 | 10 | 0.8 | 0.1 | 10 |
| 7 | "/Game/Assets/Materials/Fur" | 0.5 | 0.1 | 10 | 0.5 | 0.1 | 10 | 0.5 | 0.1 | 10 |

FIG. 10

```
1 PixelIQ = complex(zeros(Height,Width));

2 PixelRangeBinIndex = zeros(Height,Width,'int32');

3 for i = 1:Height
4    for j = 1:Width

5        PixelIQ(i,j) = Magnitude(i,j) * exp(complex(0,2 * pi * (2 *
6 Range(i,j)) / Lambda));

7        PixelRangeBinIndex(i,j) = round(Range(i,j) / RangeResolution);
8    end
9 end
```

FIG. 11

```
1 ReceiverIQ = zeros(1,NumRangeBins);

2 for i = 1:Height
3    for j = 1:Width 4        k = PixelRangeBinIndex(i,j);

5        ReceiverIQ(k) = ReceiverIQ(k) + PixelIQ(i,j);
6    end
7 end
```

FIG. 12

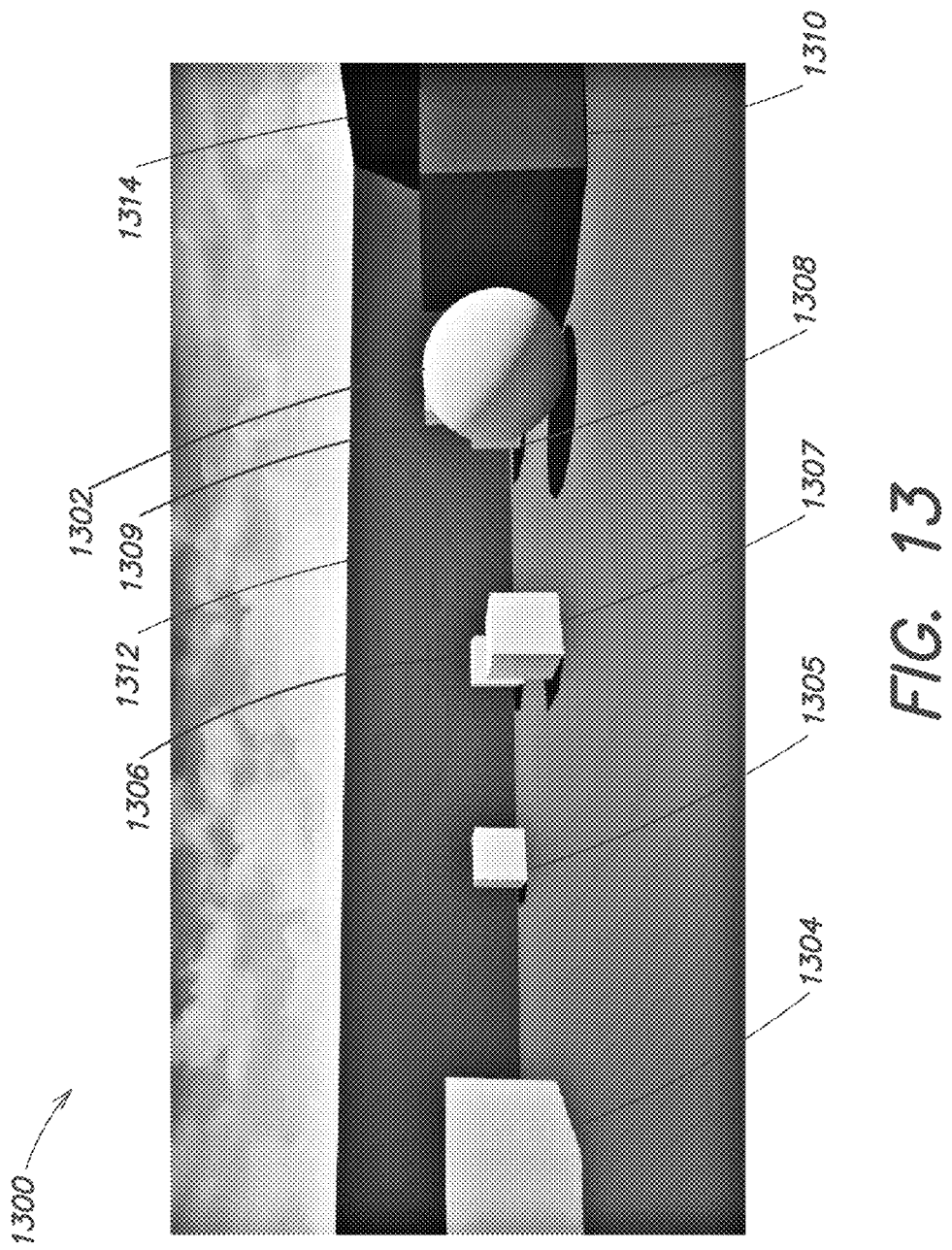

```
function [VertexOut_X,VertexOut_Y,VertexOut_Z] = VertexShader(VertexIn_X,VertexIn_Y,VertexIn_Z,...
    PerspectiveHorizontalFOV,...
    PerspectiveVerticalFOV,...
    SphericalHorizontalFOV,...
    SphericalVerticalFOV)

AzRatio = PerspectiveHorizontalFOV ./ SphericalHorizontalFOV;
ElRatio = PerspectiveVerticalFOV  ./ SphericalVerticalFOV;

[Az,El,R] = cart2sph(VertexIn_X,VertexIn_Y,VertexIn_Z);

Az = Az .* AzRatio;
El = El .* ElRatio;

[VertexOut_X,VertexOut_Y,VertexOut_Z] = sph2cart(Az,El,R);

end
```

*FIG. 32*

```
[numthreads(512, 1, 1)]
void MainLidarCS(uint3 dtid : SV_DispatchThreadID)
{
    if( dtid.x < LidarCSConstants.NumTotalPointsToSample)
    {
        uint Dist, Reflectivity;

//Calculate Indexing Info
        const float texelWidth = LidarCSConstants.InputImageTexelWidth;
        const float texelHeight = LidarCSConstants.InputImageTexelHeight;
        unit2 imgIdx = unit2(dtid.x % LidarCSConstants.SamplerTextureWidth,
            dtid.x / LidarCSConstants.SamplerTextureWidth);

//The Output is distance and reflectivity
        float2 UVToSample = LidarSamplerUV[imgIdx];

The InterpolatedTex will contain .x = Distance to Hit Point, .y =
        Reflectivity of Hit Point float2 texelpos = unit2(LidarCSConstants.InputImageTextureWidth,
            LidarCSConstants.InputImageTextureHeight) * UVToSample;
        float2 lerps = frac( texelpos );

float4 sourcevals[4];
```

To Fig. 34A
FIG. 34A

*From Fig. 34A*

```
sourcevals[0] = Texture2DSample(InTexture, PixSampler, UVToSample);
float4 defaultVal = sourcevals[0];
float MinP = defaultVal.r * LidarCSConstants.MinInterpolationFactor;
float MaxP = defaultVal.r * LidarCSConstants.MaxInterpolationFactor;

sourcevals[1] = GetPix(Texture2DSample(InTexture, PixSampler, UVToSample +
float2(texelWidth, 0)), defaultVal, MinP, MaxP);
sourcevals[2] = GetPix(Texture2DSample(InTexture, PixSampler, UVToSample +
float2(0, texelHeight)), defaultVal, MinP, MaxP);
sourcevals[3] = GetPix(Texture2DSample(InTexture, PixSampler, UVToSample +
float2(texelWidth, texelHeight)), defaultVal, MinP, MaxP);
float4 InterpolatedTex = lerp( lerp( sourcevals[0], sourcevals[1], lerp.x ),
                               lerp( sourcevals[2], sourcevals[3], lerp.x ),
                               lerp.y );

// No Hit
if (interpolatedTex.r > LidarCSConstants.MaxDistance)
{
    Dist = LidarCSConstants.MaxDistanceLidarReturnVal;
    Reflectivity = 0
}
else
{
```

```
From Fig. 34B

Dist = min( uint)(InterpolatedTex.r /
    LidarCSConstants.Distance.Quantization), UINT16_MAX);
    Reflectivity = min( (uint) (InrerpolatedTex.g *
    (float)UINT8_MAX, UINT8_MAX);
  }

//The Output is Distance and Reflectivity
  LidarD[imgIdx] = (Reflectivity << 16) | Dist;
 }
}
```

FIG. 34C

SYSTEMS AND METHODS FOR GENERATING SYNTHETIC SENSOR DATA

CROSS-REFERENCE TO RELATED APPLICATIONS

This application claims the benefit of Provisional Patent Application Ser. No. 62/729,497 filed Sep. 11, 2018 for System and Methods for Generating Synthetic Sensor Data by Chad M. Van Fleet et al., Provisional Patent Application Ser. No. 62/679,371, filed Jun. 1, 2018, for Systems and Methods for Generating Synthetic Sensor Data by Chad M. Van Fleet et al., and claims the benefit of Provisional Patent Application Ser. No. 62/648,664 filed Mar. 27, 2018 for Systems and Methods for Generating Synthetic Sensor Data by Chad M. Van Fleet et al., which applications are hereby incorporated by reference in their entireties.

COMPUTER PROGRAM LISTING

A portion of the disclosure of this patent document contains material that is subject to copyright protection. The copyright owner has no objection to facsimile reproduction by anyone of the patent document for the patent disclosure, as it appears in the United States Patent and Trademark Office patent file or records, but otherwise reserves all copyright rights whatsoever. Copyright © 2018 The MathWorks, Inc.

BRIEF DESCRIPTION OF THE DRAWINGS

The description below refers to the accompanying drawings, of which:

FIG. 10 is an example lookup table in accordance with one or more embodiments;

FIG. 11 is an illustration of example code in accordance with one or more embodiments;

FIG. 12 is an illustration of example code in accordance with one or more embodiments;

FIG. 13 is a schematic illustration of a visual representation of an example three dimensional (3D) scene in accordance with one or more embodiments;

FIG. 32 is an illustration of example code of a function for transforming or pre-distorting vertices of scene data in accordance with one or more embodiments;

FIGS. 34A-C are partial views of an illustration of example computer code in accordance with one or more embodiments.

DETAILED DESCRIPTION OF ILLUSTRATIVE EMBODIMENTS

Figure 1:
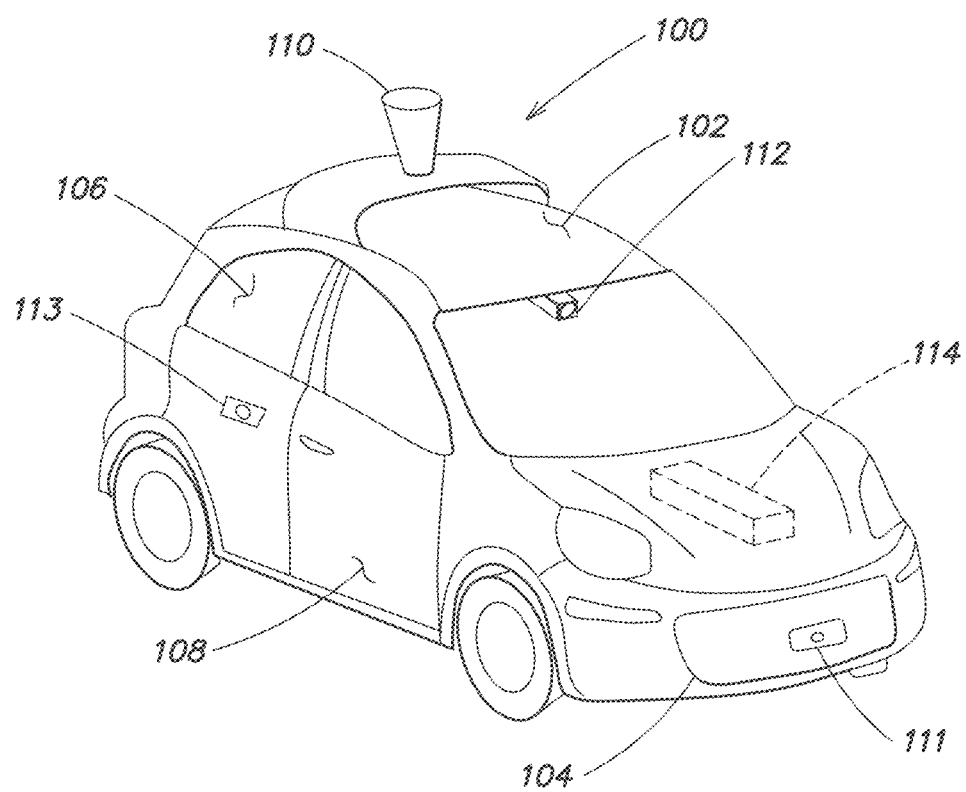
FIG. 1 is a schematic illustration of an example autonomous vehicle in accordance with one or more embodiments.

Autonomous vehicles, such as self-driving cars, use data from multiple, vehicle-mounted sensors to detect objects and navigate through an environment. Exemplary sensors include vision, light detection and ranging (lidar), radio detection and ranging (radar), and sonar sensors. Data, such as signals, generated by these sensors are provided to one or more control systems, such as Advanced Driver Assistance Systems (ADAS) and/or active safety systems installed on the cars, that process the received sensor data, and issue commands based on algorithms executed by the control systems. The issued commands may be steering commands issued to the car's steering system, braking commands issued to the car's braking system, warnings sent to the car's dashboard, audio system, seat, and/or steering wheel, etc. The issued commands may provide real time control of the car. Exemplary ADAS and active safety systems include Automatic Emergency Braking (AEB) in which a vehicle's brakes are applied automatically to prevent a collision or reduce collision speed; Forward-Collision Warning (FCW) in which visual and/or audible warnings are issued to alert a driver to a potential collision: Blind-Spot Warning (BSW) in which visual and/or audible warnings are issued to the driver indicating a vehicle in a blind spot; Rear cross-traffic warning in which visual, audible, or haptic notifications are issued to a driver of an object or vehicle that is out of the rear camera's range, but could be moving into it; Rear Automatic Emergency Braking (Rear AEB) in which a vehicle's brakes are automatically applied to prevent backing into an object behind the vehicle; Lane-Departure Warning (LDW) in which visual, audible, or haptic warnings are issued to alert the driver when the vehicle crosses lane markings; Lane-Keeping Assist (LKA) in which automatic corrective steering input or braking is provided to keep a vehicle within lane markings; Lane-centering assist in which continuous active steering is applied to keep a vehicle within lanes; and Adaptive Cruise Control (ACC) in which a vehicle is automatically kept a constant distance from the vehicle ahead.

A radar sensor for example may include a radar transmitter that emits electromagnetic (EM) signals, such as pulses, and a receiver that receives echoes of the pulses returned from targets in the environment. The more strongly a target reflects the transmitted pulses, the greater the returned echo at the receiver, resulting in a higher signal-to-noise ratio (SNR) and a higher likelihood of detection of the target. A radar system may process data from a radar sensor to determine the range, e.g., distance, to a target, for example by measuring the time from when the transmitter emits the pulse until the echo is received. A radar system may also determine one or more angles to the target relative to the radar system, such as azimuth and elevation. A radar system also may determine range rate for a target. Range rate, which is also called Doppler or radial velocity, is the velocity of the target along a line extending from the radar system to the target.

FIG. 1 is a schematic illustration of an example autonomous vehicle 100 in accordance with one or more embodiments. The vehicle 100 has a roof 102, a front bumper 104, an interior 106, and a right side 108. Several sensors are mounted on the vehicle 100. For example, a lidar sensor 110 is mounted to the roof 102, a radar sensor 111 is mounted to the front bumper 104, a forward facing video camera 112 is mounted in the interior 106, and a sonar sensor 113 is mounted on the right side 108. The vehicle 100 also includes a controller 114. Data, such as signals, generated by the sensors 110-113 are provided to the controller 114, which implements one or more algorithms to process the data and generate commands, such as commands for autonomously driving the vehicle 100.

Exemplary radar sensors include the Long Range Radar (LRR) and the Mid-Range Radar (MRR) families of radar sensors from Robert Bosch GmbH of Heilbronn, Germany. These radar sensors are monostatic (the transmitters and receivers are co-located), Frequency Modulated Continuous Wave (FMCW), Doppler radar sensors that operate in the 76 GHz to 81 GHz frequency range. Exemplary sonar sensors include the Generation 6 axial and radial ultrasonic sensors (USS6) from Robert Bosch GmbH of Abstatt, Germany, and ultrasonic sensors from MaxBotix Inc. of Brainerd, Minn., such as the MB8450 Car Detection Sensor, among others. Exemplary lidar sensors include the VLP family of lidar sensors from Velodyne LiDAR, Inc. of San Jose, Calif., which generate 300,000 points/second and have a 360° horizontal field of view and a 30° vertical field of view.

The accuracy of the algorithms executed by the control systems may be critical for safe, real-time control of the vehicle. Algorithms may be developed using simulation models created in a model-based design environment. Sample sensor data is often used to design, evaluate, and test the algorithms that, when completed, may be deployed at controllers of autonomous vehicles, such as the controller 114 of the vehicle 100. For example, sample radar data may be read out of a file and provided as an input to an initial design for the controller 114. The sample radar data may be obtained by recording the output of a physical radar sensor mounted to a vehicle as the vehicle is driven (either manually or autonomously) through an environment.

Figure 2:
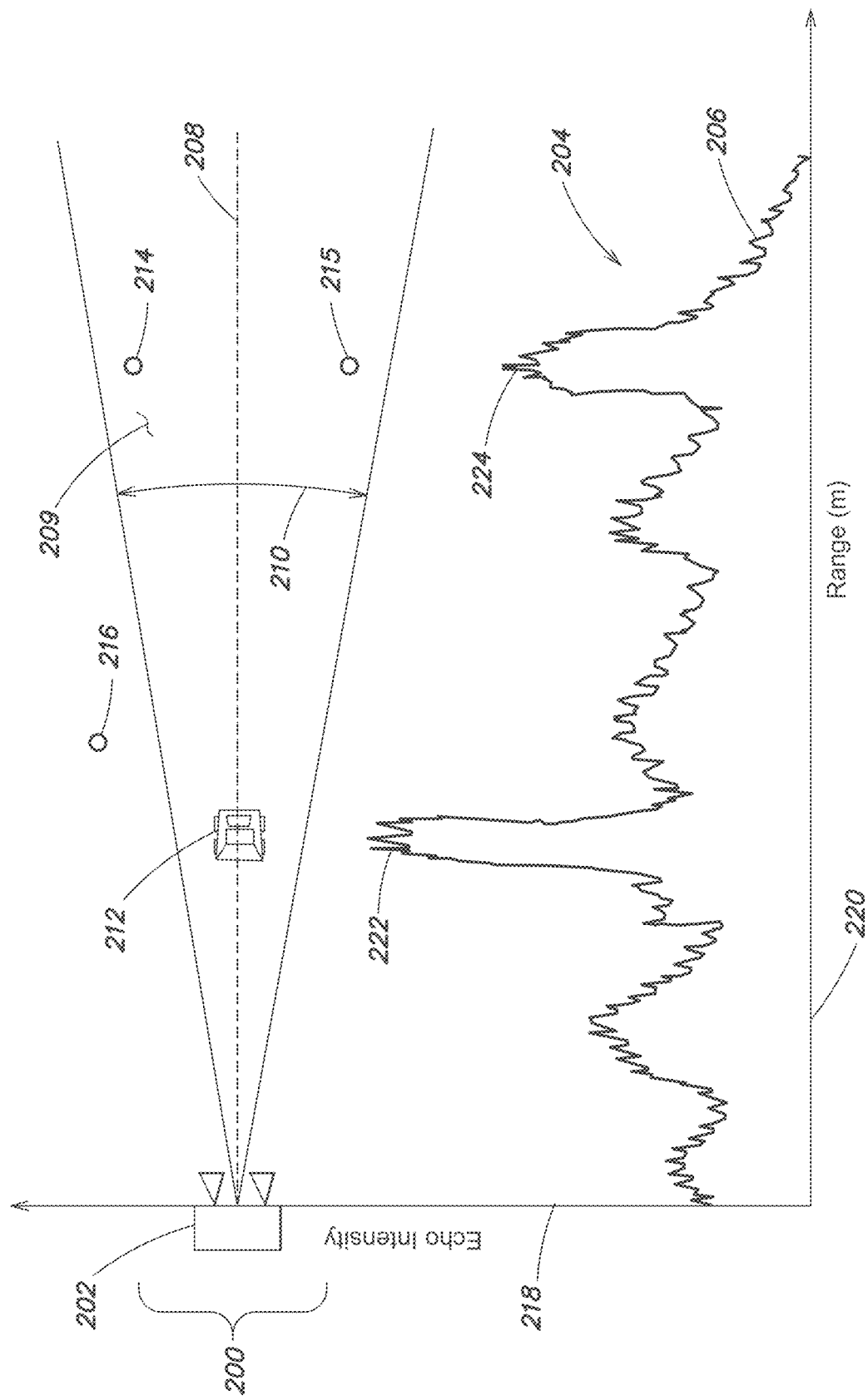
FIG. 2 is a schematic illustration of a radar sensor and a plot of radar data in accordance with one or more embodiments.

FIG. 2 is a schematic illustration of a bird's eye view of an example environment 200 that includes a real world, physical radar sensor 202 with a plot 204 of radar data 206 generated by the physical radar sensor 202 in accordance with one or more embodiments. The radar sensor 202 may point in a direction 208, and have a transmitting beam pattern 209 indicated by an angle 210. A leading car 212 and two pedestrians 214 and 215 may be within the radar's transmitting beam pattern 209. Another pedestrian 216 may also be in the environment 200, but may be located outside of the radar's transmitting beam pattern 209. The plot 204 may include a y-axis 218 that indicates echo or reflection intensity in decibels (dB), and an x-axis 220 that indicates radar range in meters (m) of the radar data 206. As indicated, the radar data 206 includes one peak 222 corresponding to the leading car 212, and another peak 224 corresponding to the two pedestrians 214 and 215. The two pedestrians 214 and 215 may be represented by the one peak 224 in the radar data 206 because they are both located approximately the same distance away from the radar sensor 202. The peak 224 may be a sum of the reflection intensity from both pedestrians 214 and 215. The radar data 206 may not include a peak for the other pedestrian 216 who is outside of the radar's beam pattern 209.

The initial design for the controller 114 may be in the form of a computer program. In a model-based design approach, a model, such as a block diagram, may be created. The model may be executed within a modeling environment. The model may implement one or more algorithms, and may simulate the behavior of the controller being designed. The behavior of the model, such as the commands generated by the model, in response to the sample radar data may be evaluated. If the model's behavior is unsatisfactory, for example when an AEB system does not issue a brake command in response to an object, the user may modify or revise the model, and test it again using the sample radar data. This process may be repeated until the model achieves acceptable behavior for the controller 114 being designed.

Code may then be generated for the final version of the model, and deployed at the controller 114 for real time usage.

The quality of the data used to design, evaluate, and test the algorithms is crucial to ensure safe and proper operation of the controllers. The recorded radar sensor data used to evaluate the simulation model, however, is limited to the particular objects, such as other vehicles, pedestrians, road signs, etc., observed by the radar sensor as the vehicle moves through the environment. Because it is limited to the particular environment in which it was obtained, recorded radar sensor data may be unable to ensure robust evaluation of controller designs. In addition, sample data representing unsafe conditions requiring emergency responses by the algorithms can be difficult if not impossible to obtain in a safe manner. Accordingly, a real problem in the development of control algorithms exists due to the limited nature of sample sensor data that is available to evaluate and test the operation of such algorithms.

Briefly, the present disclosure relates to systems and methods for generating synthetic sensor data, such as synthetic radar, lidar, and/or sonar data from three dimensional (3D) scene data that may be custom designed for a desired scene. The synthetic sensor data may be used in the creation, evaluation, and/or verification of a design for a controller or other system that utilizes such data. In some exemplary embodiments, the controller may be a controller of a vehicle (e.g., an autonomous vehicle that does not require human input for its operation, or a vehicle that, at least partially, requires human input for its operation). In such exemplary embodiments, the controller may be configured to control operations of the vehicle.

Figure 3:
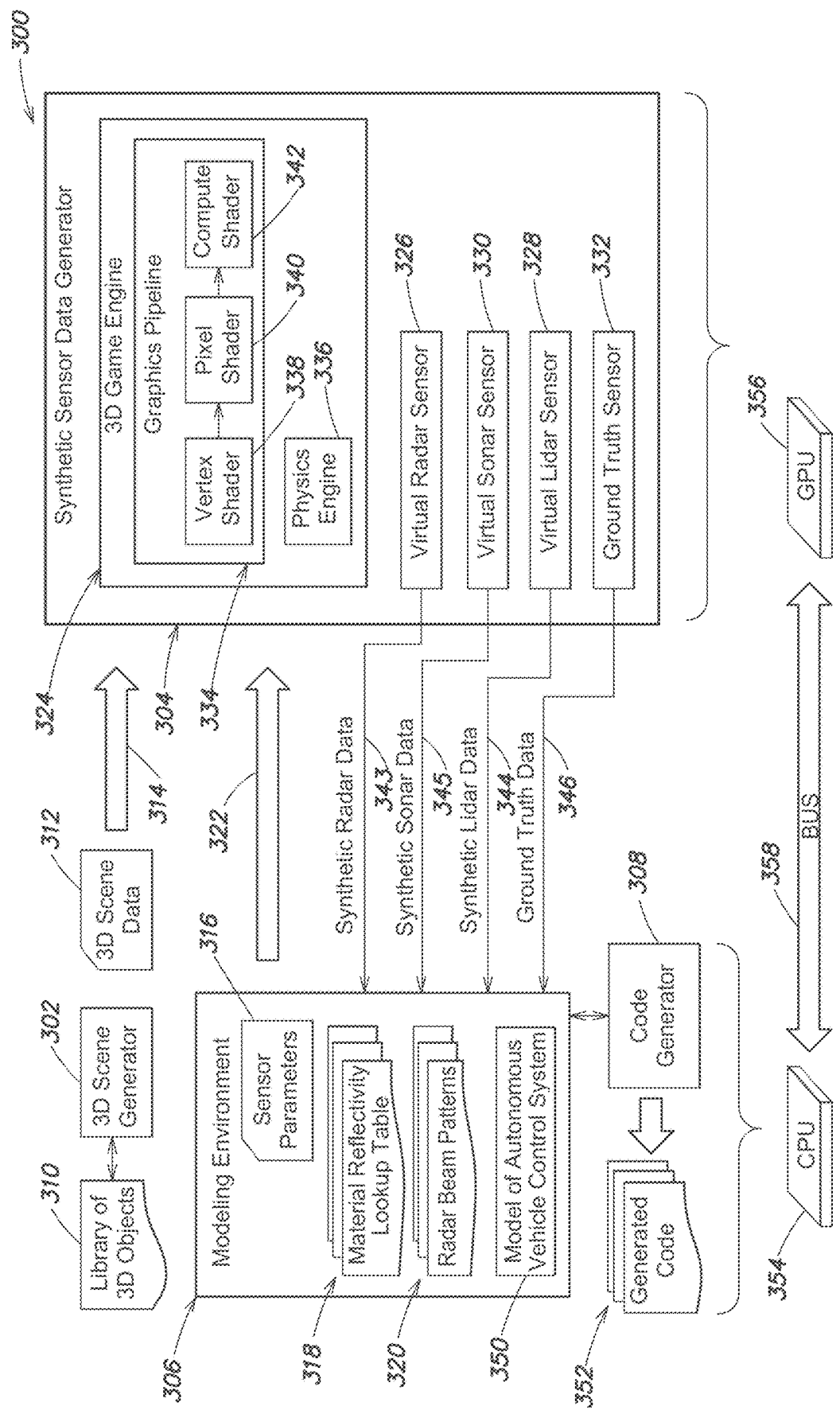
FIG. 3 is a schematic illustration of an example system for generating synthetic sensor data in accordance with one or more embodiments.

FIG. 3 is a schematic illustration of an example system 300 in accordance with one or more embodiments. The system 300 may include a 3D scene generator 302, a synthetic sensor data generator 304, a modeling environment 306, and a code generator 308. The 3D scene generator 302 may have access to one or more libraries of 3D objects, such as the library 310. A user may operate the 3D scene generator 302 to create custom 3D scene data 312 that may include objects from the library 310. The 3D scene data 312 may include a virtual ego vehicle having radar, lidar, and/or sonar sensors. An ego vehicle refers to the vehicle hosting the sensors. The 3D scene data 312 may describe a roadway along which the virtual ego vehicle and other vehicles may travel. The 3D scene data 312 may include additional objects, such as pedestrians, traffic signals, road signs, etc. In addition, attributes may be assigned to the objects that indicate properties of the objects, such as its material, its surface texture, emissivity characteristics, etc. The 3D scene data 312 may be provided to the synthetic sensor data generator 304, as indicated by arrow 314.

Sensor parameters as indicated at 316, material reflectivity lookup tables indicated generally at 318, and radar beam patterns indicated generally at 320 may be defined within the modeling environment 306. The sensor parameters 316 may include values for properties or attributes of the sensors, such as radar frequency, maximum range, etc. The material reflectivity lookup tables 318 may include information regarding radar, lidar, and/or sonar reflectivity for various materials. The radar beam patterns 320 may include information on various radar beam patterns. The sensor parameters 316, information from the material reflectivity lookup tables 318, and the radar beam patterns 320 may be provided to the synthetic sensor data generator 304, as indicated by arrow 322.

The synthetic sensor data generator 304 may include a 3D game engine 324, a virtual radar sensor 326, a virtual lidar sensor 328, a virtual sonar sensor 330, and a ground truth sensor 332. The 3D game engine 324 may include a graphics pipeline 334 and a physics engine 336. The graphics pipeline 334 may include a vertex shader 338, a pixel shader 340, and a compute shader 342. The virtual radar, lidar, and/or sonar sensors 326, 328, 330 may be mounted to the virtual ego vehicle included in the scene data 312.

The synthetic sensor data generator 304 may generate synthetic sensor data that may be provided to the modeling environment 306. The synthetic sensor data may represent signals emitted by the virtual radar, lidar, and/or sonar sensors 326, 328, 330 as the virtual ego vehicle moves about a 3D scene, e.g., drives along the roads of the 3D scene data 312. For example, the virtual radar sensor 326, the virtual lidar sensor 328, and/or the virtual sonar sensor 330 may generate synthetic radar, lidar, and/or sonar signals that are based on objects, such as the other vehicles, pedestrians, etc., within the sensors' fields of view, and provide those signals to the modeling environment 306, as indicated at arrows 343, 344, and 345, respectively. For example, with respect to the virtual radar sensor 326, the 3D game engine 324 may be configured to determine which is objects from the 3D scene data 312 are within the virtual radar sensor's field of view, e.g., which objects are virtually illuminated by the virtual radar sensor 326, based on the parameters specified for the virtual radar sensor 326 and the location and orientation of objects in the 3D scene data 312 relative to the virtual radar sensor 326. The game engine 324 may be configured to compute the amount of energy reflected back to the virtual radar sensor 326 by objects within the radar sensor's field of view, and to generate radar signals, such as range, amplitude, and range rate, as a function of the amount of energy reflected back to the virtual radar sensor 326. For example, the game engine 324 may utilize the objects' attributes, such as reflectivity, when determining the amount of energy reflected back. The game engine 324 may be further configured to compute synthetic lidar and sonar signals 344 and 345 for the virtual lidar sensor 328 and the virtual sonar sensor 330 in a similar manner.

The ground truth sensor 332 may be configured to compute ground truth data 346 for the ground truth sensor 332 for objects in the 3D scene data 312. The ground truth data 346 may include the type, identity, location, orientation, and velocity of objects in the 3D scene data 312. The ground truth data 346 may be computed based on the positions of the objects within the 3D scene data 316, e.g., relative to the virtual ego vehicle.

A simulation model 350 of a controller, such as an autonomous vehicle controller, may be opened in the modeling environment 306. The synthetic sensor data, such as the synthetic radar, lidar, and/or sonar data 343, 344, and 345 may be used during the design, evaluation, and/or verification of the simulation model 350. For example, the synthetic sensor data may be utilized as input data during execution of the model 350, and the model's outputs, such as command signals for an autonomous vehicle, may be evaluated. The behavior of the model 350 also may be evaluated with regard to the ground truth data 346. If the model 350 of the controller does not behave as intended, it may be modified or revised, and reevaluated using the same or new synthetic sensor data. When the model 350 behaves as intended, the code generator 308 may generate generated code 352 for the model 350. The generated code 352 may be in a form that is executable outside of the modeling environment 306. For example, the generated code may be source code that may be compiled into an executable. The generated code 352 may be deployed on an embedded platform, for example to realize the autonomous vehicle controller 114 (FIG. 1).

In some embodiments, one or more processors, such as a Central Processing Unit (CPU) 354, of a data processing device, such as a workstation, may run the 3D scene generator 302, the modeling environment 306, and the code generator 308. These entities may be implemented as software modules, such as one or more application programs. In addition, one or more parallel processing units, such as a Graphics Processor Unit (GPU) 356, of the data processing device may run the synthetic sensor data generator 304, which includes the 3D game engine 324. The GPU 356 may be connected to the CPU 354 by a bus 358, such as a Peripheral Component Interface (PCI) bus, PCI Express (PCIe) bus, or Accelerated Graphics Port (AGP) bus, among others.

The simulation model 350 may be a time-based model that simulates the behavior of a dynamic system as it changes over time. The modeling environment 306 may include a solver that may solve the simulation model 350 repeatedly over the simulation time at intervals called simulation time steps. The modeling environment 306 (or solver) may specify a default simulation time, for example from zero to ten seconds, although the simulation time, including the units of time, may be altered by a user. It should be understood that simulation time differs from actual clock time. For example, even though a simulation model's execution may be simulated from zero to ten seconds, it may take a small fraction of actual clock time for the CPU 354 to execute the simulation model 350 over that simulation time.

The simulation model 350 may generate commands for controlling the movement of the virtual ego vehicle within the 3D scene. For example, the simulation model 350 may include a model of the ego vehicle. Furthermore, at each simulation time step, the modeling environment 306 (or solver) may compute new throttle, steering, and braking signals or commands for the virtual ego vehicle, and these throttle, steering, and braking commands may be provided to the 3D game engine 324, as also indicated by the arrow 322. The 3D game engine 324 may update the position of the virtual ego within the 3D scene data 312 based on the received throttle, steering, and braking commands for the virtual ego vehicle. For example, the 3D game engine 324 may move the virtual ego vehicle relative to the 3D scene data 312. The virtual radar, lidar, and sonar sensors 326, 328, and 330 may generate new synthetic radar, lidar, and sonar signals based on the new position of the virtual ego vehicle, and provide these signals to the simulation model 350 as indicated at arrows 343-345. The signals may be processed by the simulation model 350, for example as part of the design, evaluation, or testing of the control algorithm simulated by the model 350. The ground truth sensor 332 may also generate new ground truth data, which may also be provided to the simulation model 350. Execution of the simulation model 350 by the modeling environment 306 may thus be synchronized and operate in lock step with the calculation of synthetic sensor data by the synthetic sensor data generator 304. In some embodiments, the simulation model of the ego vehicle may be separate from the simulation model of the controller.

As described herein, a sample time property may be associated with the virtual radar, lidar, and sonar sensors 326-330. The modeling environment 306 may direct the 3D game engine 324 to compute new virtual sensor data 343-345 when a simulation time step matches a sensor's sample time.

In other embodiments, rather than provide throttle, steering, and braking commands, the modeling environment 306 may a compute a new position of the virtual ego vehicle at each simulation time step in a coordinate frame of the 3D scene data 312 and provide this new position to the 3D game engine 324. The 3D game engine may move the virtual ego vehicle to this new position, and the virtual radar, lidar, and sonar sensors 326, 328, and 330 may generate new synthetic radar, lidar, and sonar signals based on the new position of the virtual ego vehicle. In addition to moving the virtual ego vehicle, one or more virtual objects within the 3D scene data 312, such as other vehicles, pedestrians, etc., may also be moved.

The modeling environment 306 and the synthetic sensor data generator 304 may communicate using the Data Distribution Service (DDS) data exchange protocol.

In sum, the 3D game engine 324 and the modeling environment 306 may work cooperatively to compute and utilize the synthetic sensor data efficiently.

FIG. 3 is meant for illustrative purposes only, and the present disclosure may be implemented in other ways. For example, in other embodiments, the 3D scene generator 302 may be part of the synthetic sensor data generator 304 or of the 3D game engine 324.

3D Objects

A user of the system 300 may create and/or import 3D objects for use in creating the 3D scene data 312. A 3D object, such as a car, may be a static mesh of triangles (or other polygons) that define the object's outer surface. Each triangle may be defined by its corners, called vertices, e.g., $V_1$, $V_2$, and $V_3$. The static mesh of triangles may define the surface geometry of the 3D object. A complex 3D object, such as a car, may be formed from a plurality of objects, such as an object for the car's body, an object for the car's windshield, objects for the car's bumpers, objects for the car's doors, etc. An object may also be referred to as a surface model and/or a mesh.

Exemplary tools for creating meshes representing 3D objects include 3dsMax, Maya, and Softimage all from Autodesk, Inc. of San Rafael, Calif.

In some embodiments, a user may operate the 3D scene generator 302 to create objects, which may then be saved in the library 310.

A given object may be stored as a set of vertices that make up the object, e.g., $V_1$, $V_2$, $V_3$, $V_4$, $V_5$, $V_6$, etc. Data associated with each vertex may include:

the vertex's x, y, and z coordinates in a coordinate frame that may be local to the given object; and normal vectors (Normals) along each axis ($N_x$, $N_y$, $N_z$) of the object's coordinate frame.

In addition to the data associated with each vertex, a set of properties may be defined for an object, and values may be assigned to these properties. In some embodiments, the properties may include diffuse and specular reflection coefficients at radar, lidar, and/or sonar frequencies/wavelengths. For example, diffuse and specular reflection coefficients may be determined empirically for the types of objects included in the 3D scene data 312. These empirically derived coefficients may be assigned to objects included in the 3D scene data 312.

In other embodiments, the properties may include attributes of the objects from which diffuse and specular reflection coefficients can be calculated. For example, attributes, such as the object's material type, such as metal, glass, concrete, asphalt, etc., its emissivity, its surface texture, and its transparency, may be specified for an object. Diffuse and specular reflection coefficients may then be determined by performing lookups on the material reflectivity lookup tables 318 using the material type, texture, and/or other physical attributes as indexes into the tables 318. In other embodiments, functions may be used to compute or derive diffuse and specular reflection coefficients from the physical attributes. The functions may be implemented and executed by the modeling environment 306 and/or the 3D game engine 324. For example, the functions may be implemented in the Unreal Engine's Material system.

In yet other embodiments, diffuse and specular reflection coefficients (or properties from which those coefficients may be calculated or derived) may be inferred, from the name of the material type, e.g., concrete, glass, etc. For example, default coefficients may be provided for various types of materials.

In some embodiments, the diffuse and specular reflection coefficients and/or the attributes from which they may be determined may be included in a texture map or more simply a texture associated with an object of the 3D scene data 312. This texture may be processed by the graphics pipeline 334 during generation of synthetic sensor data. For example, a texture map of reflectivity coefficients may be associated with a road object. The reflectivity coefficients may have a range of 0-1, such that values for asphalt portions of the road, which have lower reflectivity, may be 0-0.3, while paint markings on the road, which have higher reflectivity, may be 0.6-1. The 3D game engine 324 may utilize the texture map when computing reflectivity for the virtual radar, lidar, or sonar sensors 326, 328, 330.

Object properties may be defined using the game engine 324. For example, the Unreal Engine game engine from Epic Games, Inc. of Cary, N.C. provides a set of attributes called a Material for an object that defines how the object will be rendered by the Unreal Engine game engine. The Unreal Engine game engine provides an editor through which a user can create a Material for a given 3D object. A Material may also include operations or functions performed on attributes to compute additional attributes for an object. The Material for a given 3D object may be defined to include diffuse and specular reflection coefficients and/or properties from which those coefficients may be calculated, derived, or inferred.

In some embodiments, the virtual radar, lidar, and sonar sensors 326, 328, 330 of the ego vehicle may be implemented as Actors of the Unreal Engine game engine. An Actor is an Object Oriented Programming (OOP) object that can be placed in a scene, called a Level. Actors support 3D transformations such as translation and rotation within the Level in which they are placed. For example, the Actors used to implement the virtual radar, lidar, and sonar sensors may incorporate one or more Scene Capture 2D Camera Actors of the Unreal Engine game engine. A Scene 2D Camera Actor may capture a scene view of the 3D scene data 312 from the camera's view frustum, and store that scene view as an image, e.g., a 2D array or grid of pixels. No surface mesh may be defined for a Scene 2D Camera Actor, and thus no image of a Scene 2D Camera Actor may be generated by the Unreal Engine game engine.

Generation of 3D Scene Data

A user may select particular 3D objects, such as cars, roads, pedestrians, etc., from the library 310, and arrange them to form a scene, which may be saved as the 3D scene data 312. The 3D scene data 312, which may be created by the 3D scene generator 302, e.g., in response to user inputs, may include a virtual ego vehicle with the virtual sensors 326, 328, 330 mounted thereon. The 3D scene data 312 may be defined through the 3D scene generator 302 to change over time. For example, some objects within the 3D scene data 312 may change position and/or orientation over time. The physics engine 336 may determine how objects move and interact with each other. The physics engine 336 may also determine how the virtual ego vehicle moves in response to received throttle, steering, and braking commands, e.g., from the modeling environment 306. The 3D scene data 312 may be stored in one or more files, such as a scene file, or other data structures.

In some embodiments, the modeling environment 306 may provide a physics engine configured to calculate a position of the virtual ego vehicle, and this position may be provided to the 3D game engine 324, as described.

Virtual Sensor Properties

Parameters or properties may be defined for the virtual sensors 326, 328, 330. Exemplary parameters include the location of the virtual sensors 326, 328, 330, for example, in relation to the ego vehicle, e.g., in the ego vehicle coordinate frame. As illustrated in FIG. 1, the virtual radar sensor 326 may be located in a front bumper of the ego vehicle. The virtual lidar sensor 328 may be located on the roof. The virtual sonar sensor 330 may be located in a door. A vector denoting the direction in which the virtual sensor is pointing, and another vector denoting an upward direction relative to the ego vehicle coordinate frame may also be specified. Other parameters include the sensor's operating frequency, such as 77 GHz for a radar sensor and 100 kHz for a sonar sensor, the rate at which measurements are generated. For a radar sensor, additional properties may include the field of view, e.g., in terms of azimuth and elevation angles, maximum range, range resolution, type, e.g., pulsed or continuous wave, etc.

Values for parameters of the virtual sensors 326, 328, 330 may be user-specified, set programmatically, and/or automatically derived, e.g., from published specifications, if one or more of the virtual sensors is identified as matching a physical sensor. Information from the published specifications may be stored in one or more Lookup Tables (LUTs) or other data structures.

Figure 4:
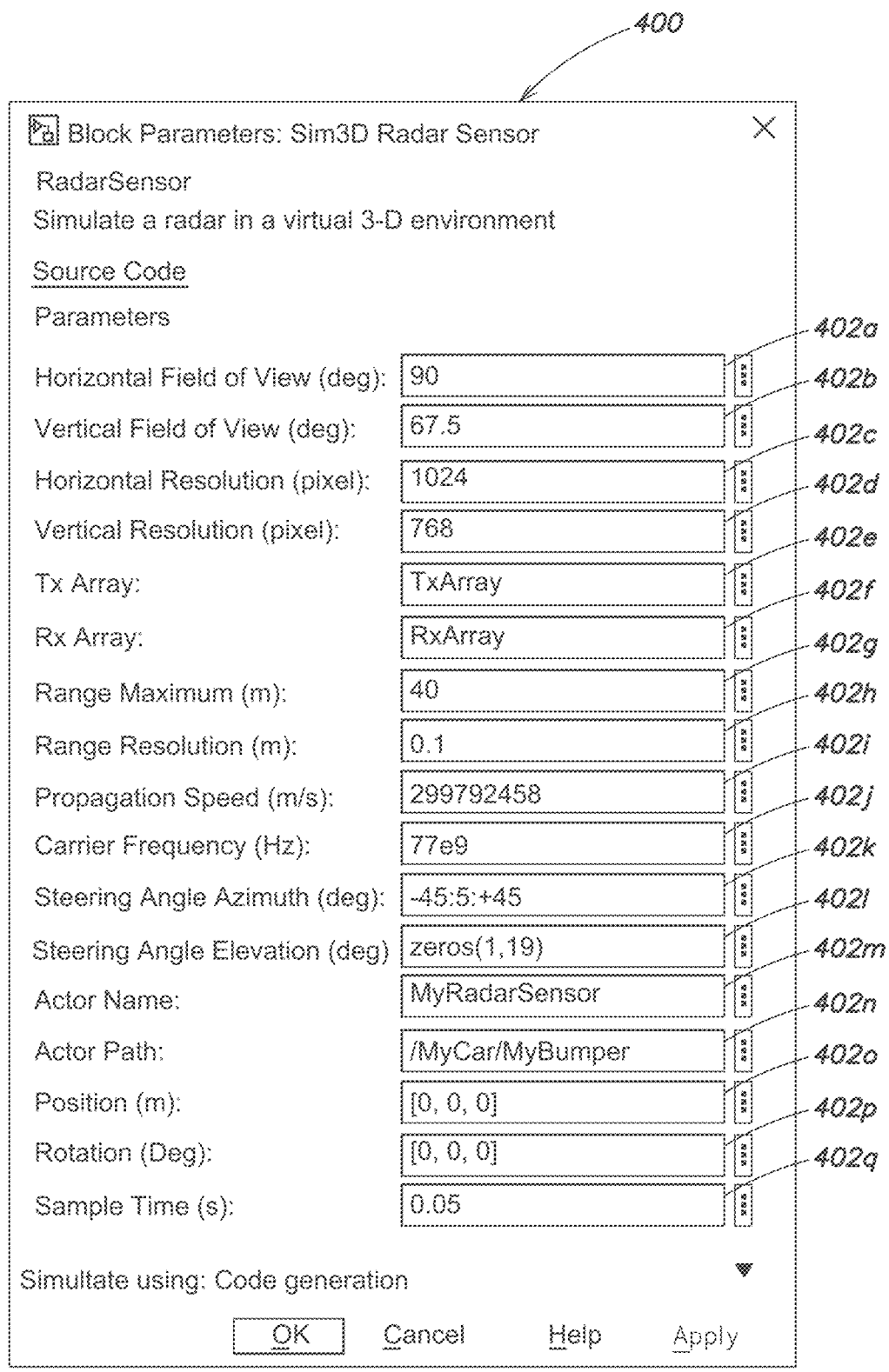
FIG. 4 is a schematic illustration of an example graphical affordance through which values for parameters of a virtual sensor may be specified in accordance with one or more embodiments.

FIG. 4 is a schematic illustration of an example graphical affordance 400 through which values for parameters of the virtual radar sensor 326 may be specified, e.g., set, in accordance with one or more embodiments. The graphical affordance 400 may be created by a User Interface (UI) engine of the modeling environment 306. The graphical affordance 400 may be in the form of a window, such as a properties page or parameter dialog, that includes a plurality of data entry boxes through which a user may set and/or select values for parameters of the virtual radar sensor 326. For example, the graphical affordance 400 may include horizontal and vertical field of view data entry boxes 402a and 402b for receiving values for the radar sensor's horizontal and vertical fields of view, e.g., in degrees (deg). The graphical affordance 400 also may include horizontal and vertical resolution data entry boxes 402c and 402d for receiving horizontal and vertical resolution values, e.g., in pixels, for an image plane created by the graphics pipeline 334 of the 3D game engine 324 for the virtual radar sensor 326. In some embodiments, boxes 402c and 402d may be omitted, and the graphics pipeline 334 may use default values instead of user-specified values.

The graphical affordance 400 may include transmit (Tx) and receive (Rx) array data entry boxes 402e and 402f for receiving the identity of elements for modeling the geometry of radar sensor's transmit array and receive array. Tx and Rx array parameters may specify the number of antenna elements for the virtual radar sensor 326 or the number of microphone elements for the virtual sonar sensor 330, the pattern of elements, and their location and orientation. An array of transmitting elements has a radiation pattern, and an array of receiving elements has a response pattern, and the Tx and Rx array parameters may be used, for example by the modeling environment, to calculate beam patterns for the respective virtual radar sensor 326 or virtual sonar sensor 330.

The graphical affordance 400 may include range maximum and range resolution data entry boxes 402g and 402h for receiving values for the virtual radar's maximum (max) range and range resolution, e.g., in meters (m). The modeling environment 306 may compute the number of range bins for the virtual radar sensor 326 as a function of the values specified for the radar's maximum and minimum ranges and the range resolution. For example:

$$M = \frac{R_{max} - R_{min}}{\Delta R}$$

where,
M is the number of range bins,
$R_{max}$ is the radar sensor's maximum range,
$R_{min}$ is the radar sensor's minimum range, and
$\Delta R$ is the radar sensor's range resolution.

In some embodiments, the modeling environment 306 may set the virtual radar's minimum range to zero by default. In other embodiments, a value may be specified, for example through a data entry box of the graphical affordance 400. The modeling environment 306 may utilize the max range and range resolution values to determine the number of data points returned by the virtual radar sensor at each measurement instant. For example, the modeling environment may utilize the max range and range resolution values to determine the sampling rate of a virtual radar signal generated by the 3D game engine 324 from which the number of data points is determined. Each data point may correspond to an amplitude value, e.g., in decibels (dB), at a particular range value. The range values may be in 1-meter increments.

The graphical affordance 400 may include a propagation speed data entry box 402i for receiving a value for the speed of the radar sensor's electro-magnetic energy, e.g., in meters per second (m/s), such as the speed of light. The graphical affordance 400 may include a carrier frequency data entry box 402j for receiving a value for the radar sensor's carrier frequency, e.g., in Hz, such as 77 GHz. The modeling environment 306 may utilize the propagation speed and the carrier frequency to calculate the wavelength of the virtual radar sensor 326, and the modeling environment 306 may utilize the wavelength to calculate the radar sensor's beam pattern. For example, the Tx/Rx array geometry and wavelength may be used to calculate beam patterns at a startup phase of model simulation, and the beam patterns may be stored for later use. Beam patterns also may be calculated at other times, such as during runtime of a model simulation. In some embodiments, the Tx/Rx array geometry and/or the wavelength may be tunable parameters. The graphical affordance 400 may include steering angle azimuth and steering angle elevation data entry boxes 402k and 402l for receiving user-specified values for the direction, e.g., in degrees, in which the radar sensor is pointing relative to a forward, e.g., x-direction, of the ego vehicle coordinate frame. The graphical affordance 400 may include actor name and actor path data entry boxes 402m and 402n for receiving values specifying unique identifying information for the virtual radar sensor 326 and a file location at which a data structure containing the parameters may be stored. The graphical affordance 400 may include position and rotation data entry boxes 402o and 402p for receiving values for x, y, and z coordinates and the pitch, roll, and yaw of the virtual radar sensor 326 in the ego vehicle coordinate frame. The graphical affordance 400 may include a sample time data entry box 402q for receiving a value indicating how often, e.g., in seconds, the virtual radar sensor 326 takes a measurement.

The values entered for the parameters of the virtual radar sensor 326, e.g., by a user, may be stored as the sensor options 316, and at least some of the values may be provided to the synthetic sensor data generator 304.

Generation of Synthetic Radar Data

Figure 5A:
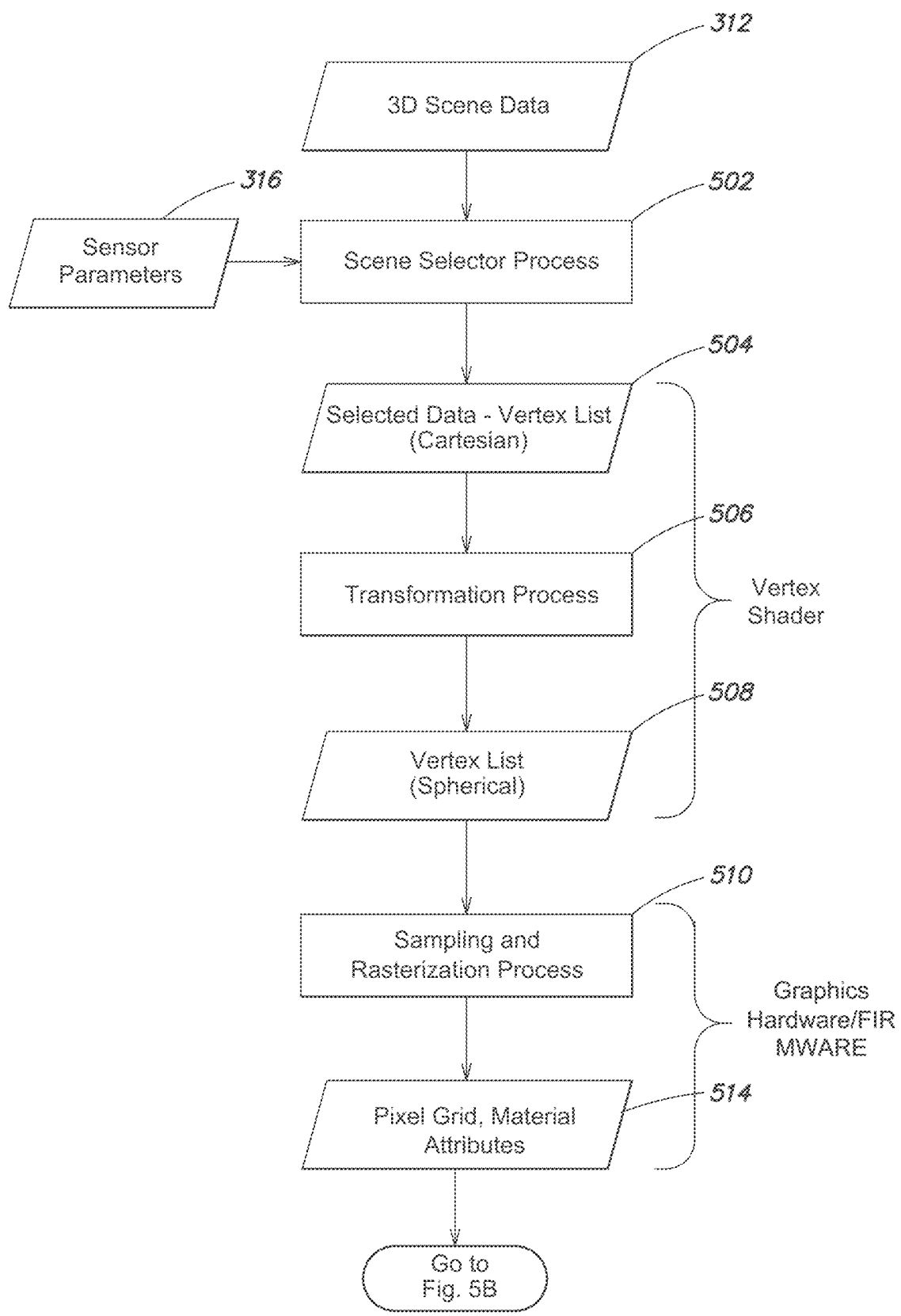
FIGS. 5A and 5B are partial views of a schematic illustration of an example process flow for generating synthetic radar data in accordance with one or more embodiments.
Figure 5B:
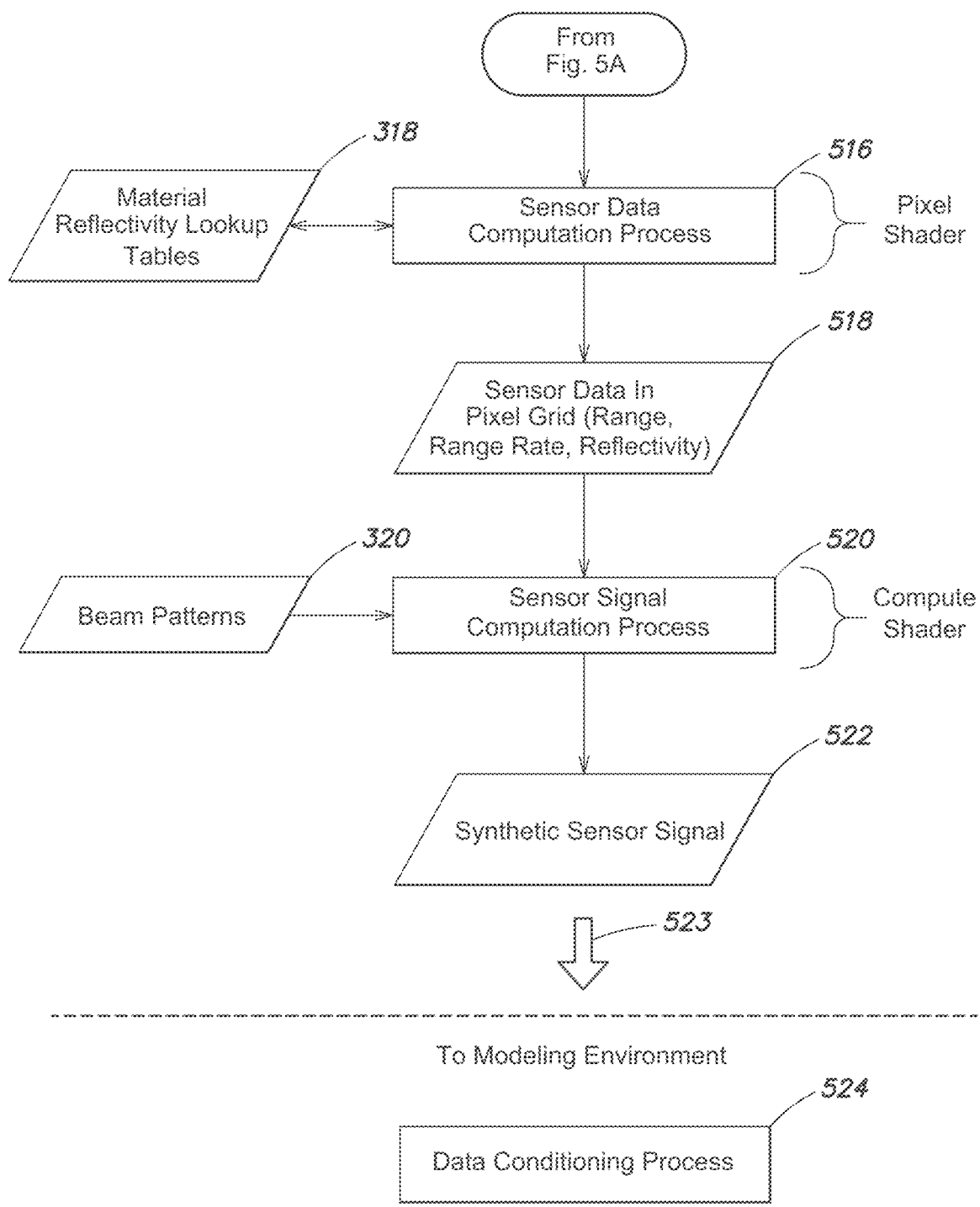

FIGS. 5A and 5B are partial views of a schematic illustration of an example process flow for generating synthetic radar data for the virtual radar sensor 326 in accordance with one or more embodiments. The process flow of FIGS. 5A and 5B is intended for illustrative purposes only. The present disclosure may be used with and/or implement other process flows. For example, in some embodiments, one or more process steps may be omitted, additional process steps may be added, the order of process steps may be changed, and/or one or more sequences indicated by the arrows may be omitted. The 3D scene data 312, which may include material attributes of the vertices for the objects included in the 3D scene data 312, and the sensor parameters 316 may be provided to a scene selector process 502. The scene selector process 502 may determine which objects included in the 3D scene data 312 are within the virtual radar sensor's field of view. The scene selector process 502 may make this determination for each measurement, e.g., sample time, of the virtual radar sensor 326. The scene selector process 502 may determine the location of the ego vehicle and the location of the virtual radar sensor 326 in the 3D scene data 312. The scene selector process 502 may also determine the rotation and/or orientation of the virtual radar sensor 326 is pointing, the virtual radar's horizontal and vertical fields of view, and the maximum range of the radar sensor. The scene selector process 502 may utilize this information to determine which objects in the 3D scene data 302 are within the virtual radar sensor's field of view. In some embodiments, at least some objects may be opaque, and the scene selector process 502 also may determine if an object, otherwise within the radar sensor's field of view, is occluded. For example, as with visible light, an object representing a pedestrian may be occluded by an object representing a car that is located in between the pedestrian and the virtual radar sensor 326. The scene selector process 502 may clip the vertices for objects that are outside of the virtual radar sensor's field of view. The output of the scene selector process 502 may be data, e.g., selected data 504, from the 3D scene data 312 for the objects determined to be within the virtual radar sensor's field of view.

The selected data 504 may include a list of the vertices of the objects or portions thereof determined to be within the virtual radar sensor's field of view. For each vertex, the selected data 504 may include the x, y, z coordinates of the vertex in the ego vehicle coordinate frame, and the normal vector and the material attributes assigned to the vertex. The selected data 504 also may include the identifier of the respective object. It should be understood that the scene selector process 502 may apply a model matrix to convert x, y, z coordinates of vertices from an object coordinate frame to the ego vehicle coordinate frame. In some embodiments, the x, y, z coordinates of the vertices may be in the virtual radar sensor coordinate frame. In this case, a view matrix may be applied to convert the x, y, z coordinates from the ego vehicle coordinate frame to the radar sensor coordinate frame.

The scene selector process 502 may compute a projection of the vertices of the selected data 504 onto one or more two dimensional (2D) planes, which may be referred to as a Cartesian projection. The selected data 504 as projected onto the one or more planes may be subjected to one or more transformation processes as indicated at process step 506. In an embodiment, the transformation process 506 may transform the vertex list from the Cartesian projection to a spherical projection. For example, because the virtual radar, lidar, and sonar sensors 236, 238, 330 are radiating sensors whose signal-to-noise (SNR) ratio is a function of range, the transformation process 506 may transform the vertices of objects projected on the 2D plane, e.g., a performed by the game engine, to a projection on at least a portion of a sphere. For the ground truth sensor 332, other transforms may be used, such as the Gall-Peters projection.

Unlike a camera, a radar sensor may have a horizontal field of view that is 180° wide. As a result, the area of pixels as one approaches the left and right sides or edges 620 and 622 of the 2D plane 608 will be stretched, e.g., distorted. For pixels along the sides or edges 620 and 622, e.g., at the very edges of the virtual radar sensor's 180° field of view, the pixel area approaches infinity. In an embodiment, the game engine 324 may be configured to reduce or correct this distortion by projecting vertices onto a spherical projection. For a Cartesian projection, vertices at the same range may get stretched (distorted) toward the edges of the grid. For a spherical projection, however, the vertices toward the edge will be the same as at the center.

Figure 8:
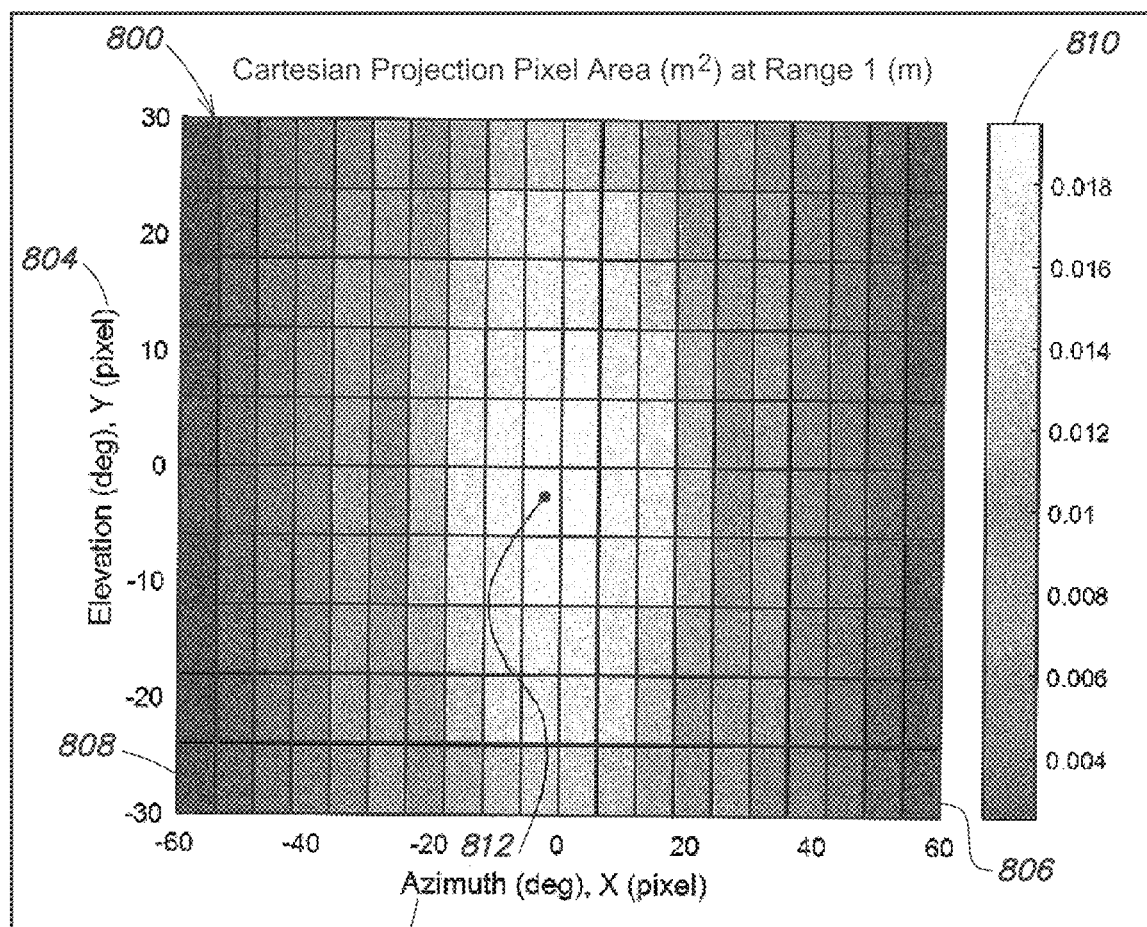
FIG. 8 is an example plot of pixel areas from a planar projection.

FIG. 8 is a schematic illustration of an example plot 800 of pixel area for a Cartesian projection intended to illustrate the distortion problem. The plot 800 is in the form of a pseudocolor or checkerboard plot, and has a combination azimuth/x-axis 802 and a combination elevation/y-axis 804. The plot 800 represents a horizontal field of view of 120° and a vertical field of view of 60°. The plot 800 has right and left sides or edges 806 and 808. A legend 810 in the form of a colorband is also presented. As indicated by the legend 810, the area of pixels at a center 812 of the plot 800 (e.g., 0.018 m$^2$) are much larger as compared to the area of pixels along the sides 806 and 808 (e.g., 0.004 m$^2$).

Figure 9:
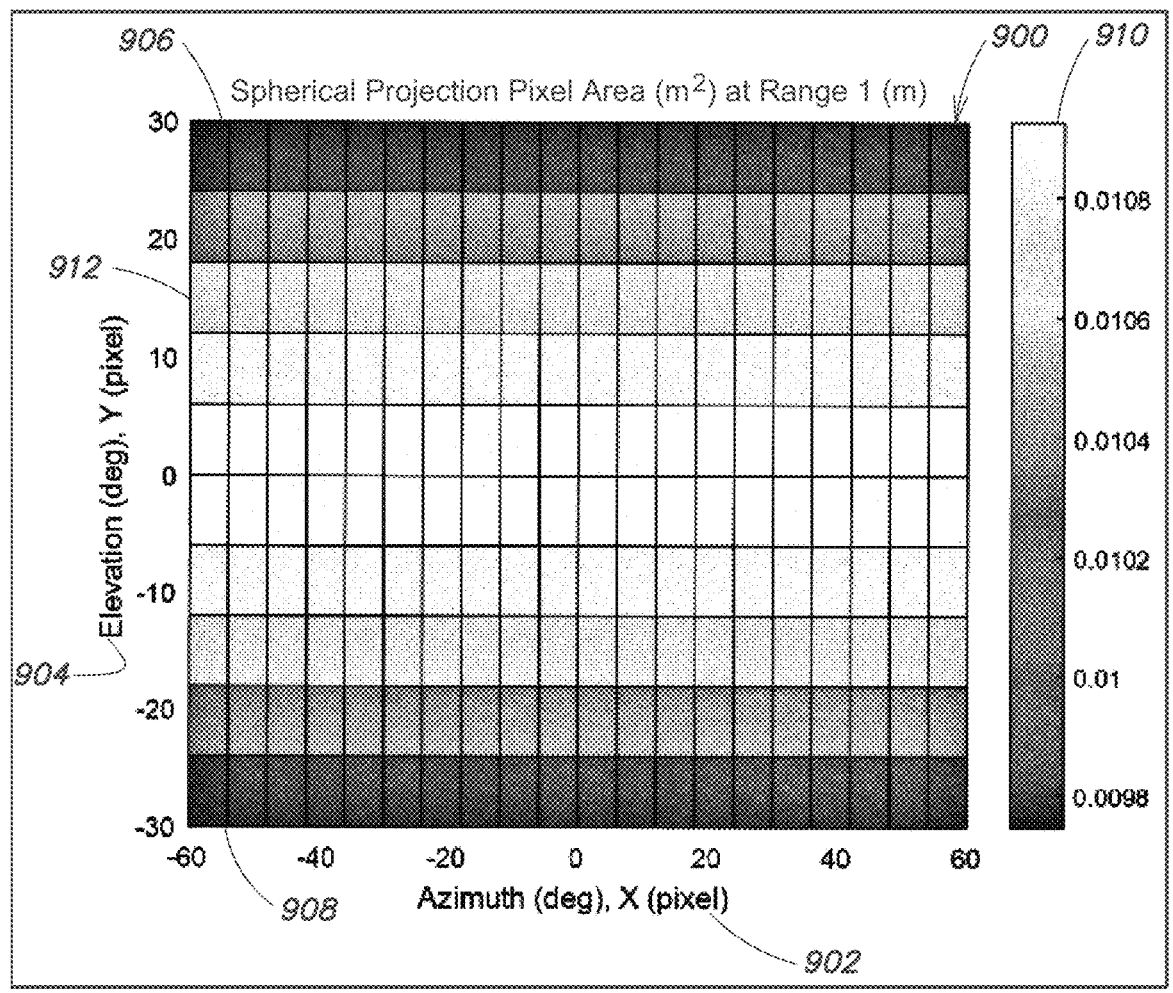
FIG. 9 is an example plot of pixel areas based on a spherical projection.

FIG. 9 is a schematic illustration of an example plot 900 of pixel area as computed using a spherical projection and transformed to a 2D planar, pre-distorted projection intended to illustrate a solution to the distortion problem. The plot 900 is in the form of a pseudocolor or checkerboard plot, and has a combination azimuth/x-axis 902 and a combination elevation/y-axis 904. Like the plot 800, the plot 900 represents a horizontal field of view of 120° and a vertical field of view of 60°. The plot 900 has top and bottom edges 906 and 908. A legend 910 in the form of a colorband is also presented. As indicated by the legend 910, the area of pixels of the plot 900, which is based upon a spherical projection, are nearly uniform throughout the entire pixel grid as compared to the pixel areas of the Cartesian projection plot 800, which have a wide range. For example, the pixel areas of the plot 900 are nearly uniform along the entire azimuth range for a given elevation. Furthermore, the pixel area along the zero elevation 912 of the plot 900 (e.g., 0.0108 m$^2$) are very close to the area of pixels along the top and bottom edges 906 and 908 (e.g., 0.0098 m$^2$).

Figure 6:
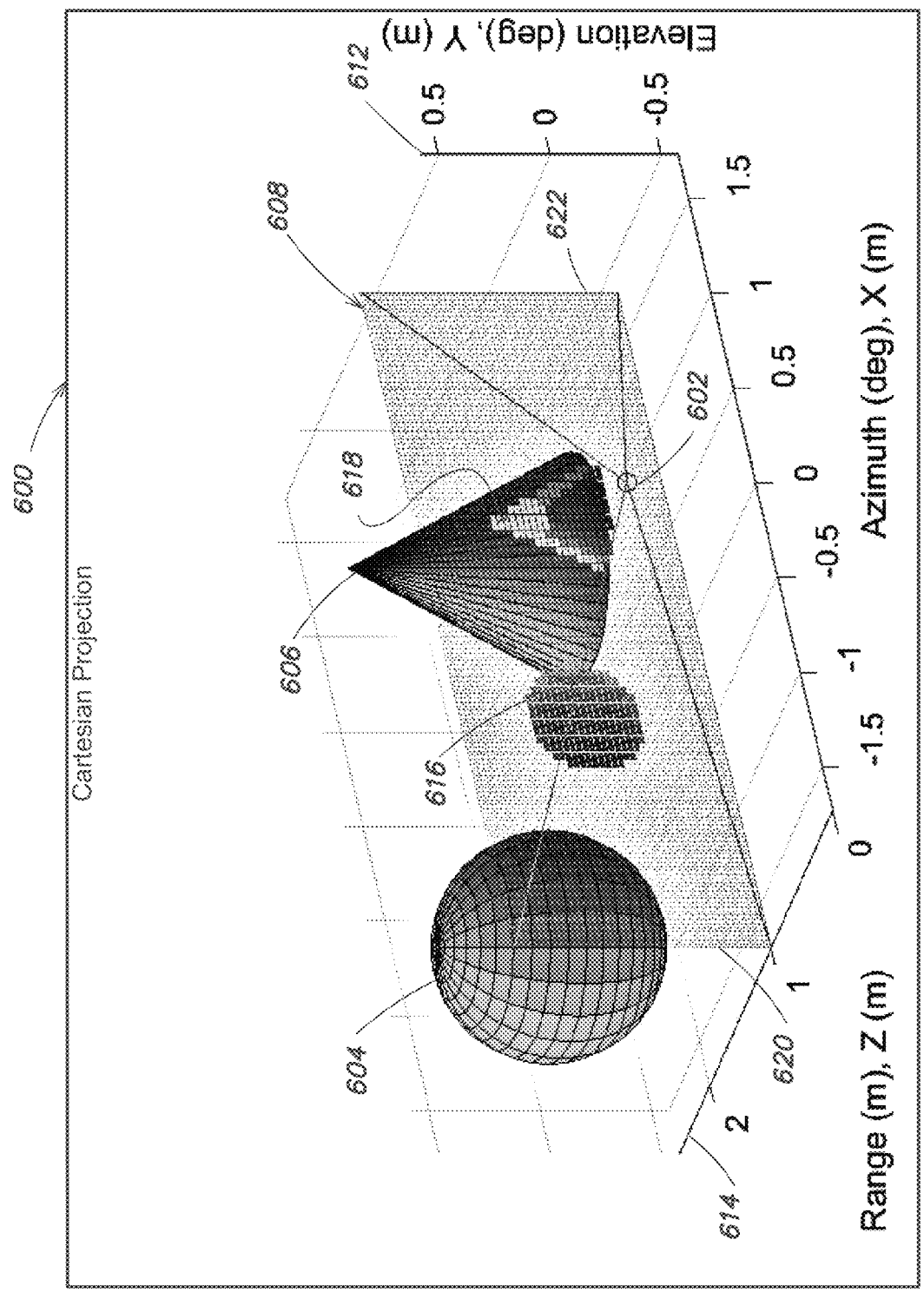
FIG. 6 is a schematic illustration of an example planar projection in accordance with one or more embodiments.
Figure 7:
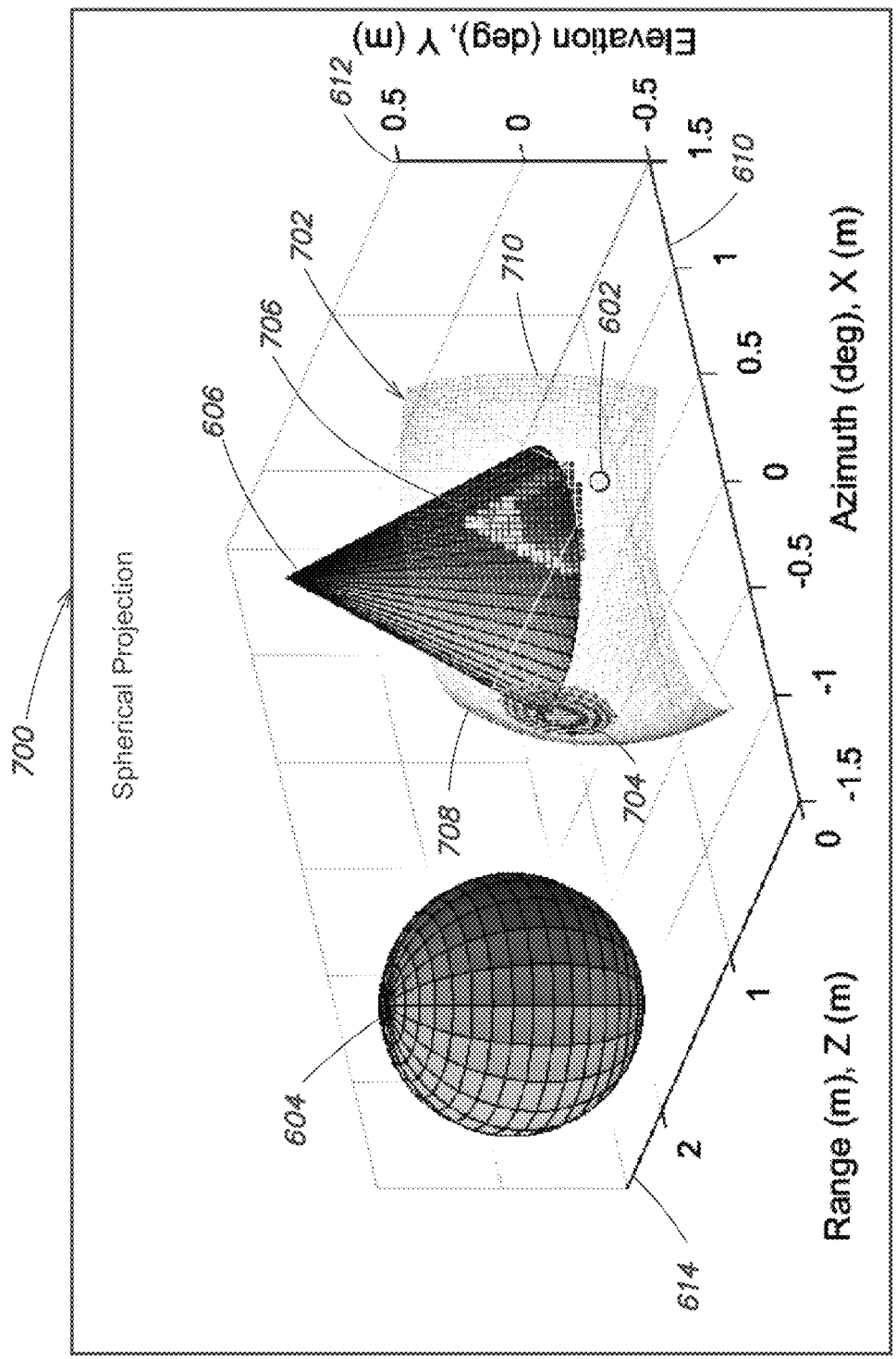
FIG. 7 is a schematic illustration of an example spherical projection in accordance with one or more embodiments.
Figure 28:
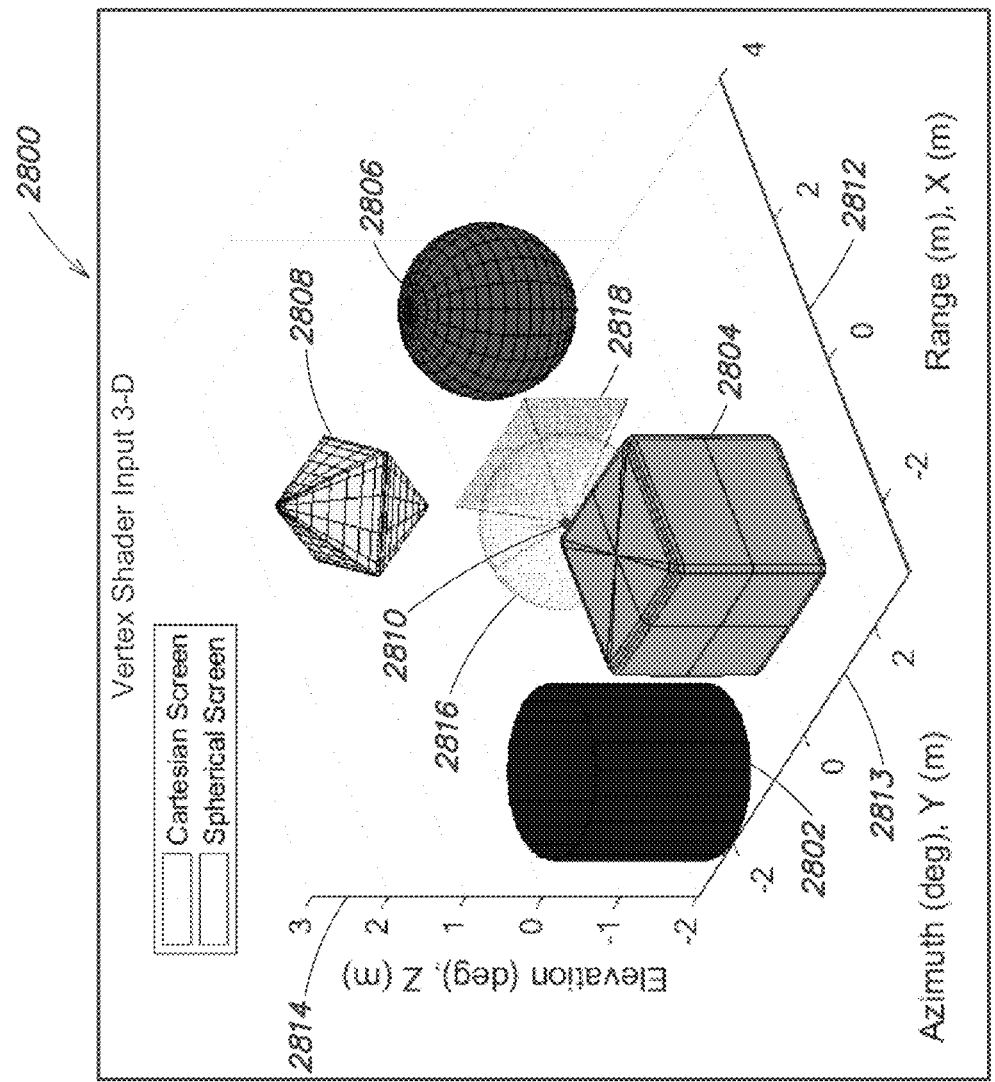
FIG. 28 is a schematic illustration of example scene data input to a vertex shader.
Figure 29:
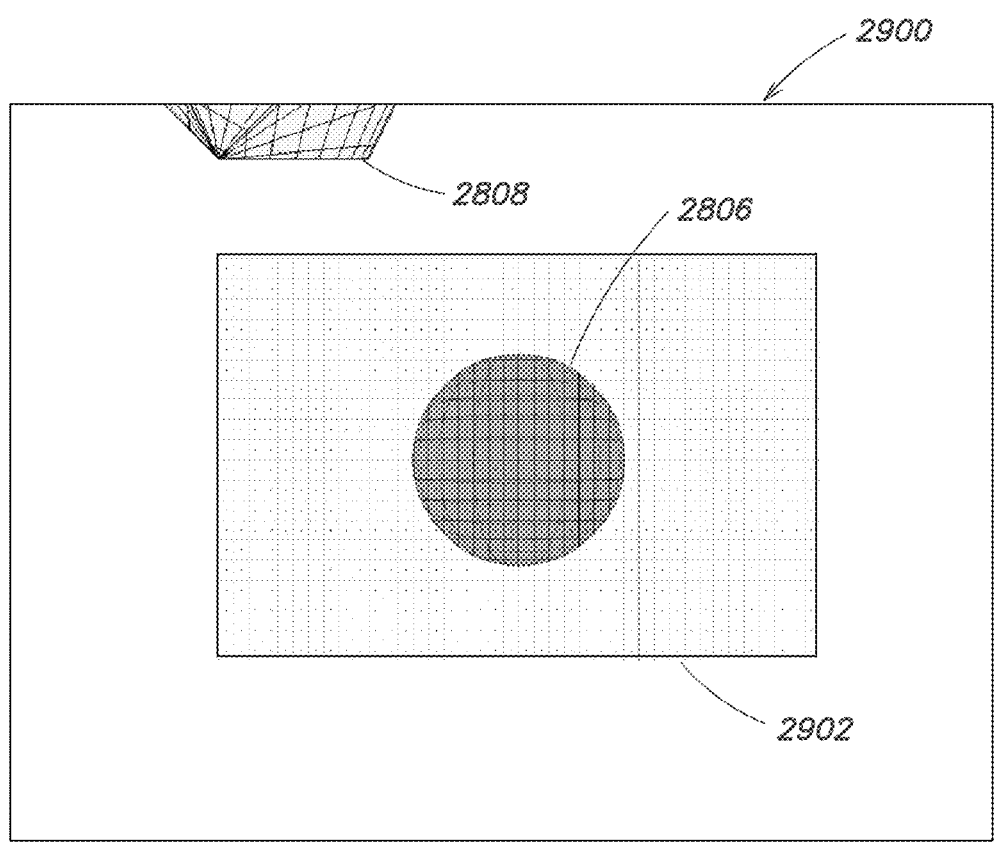
FIG. 29 is a schematic illustration of an example output of a vertex shader from scene data.
Figure 30:
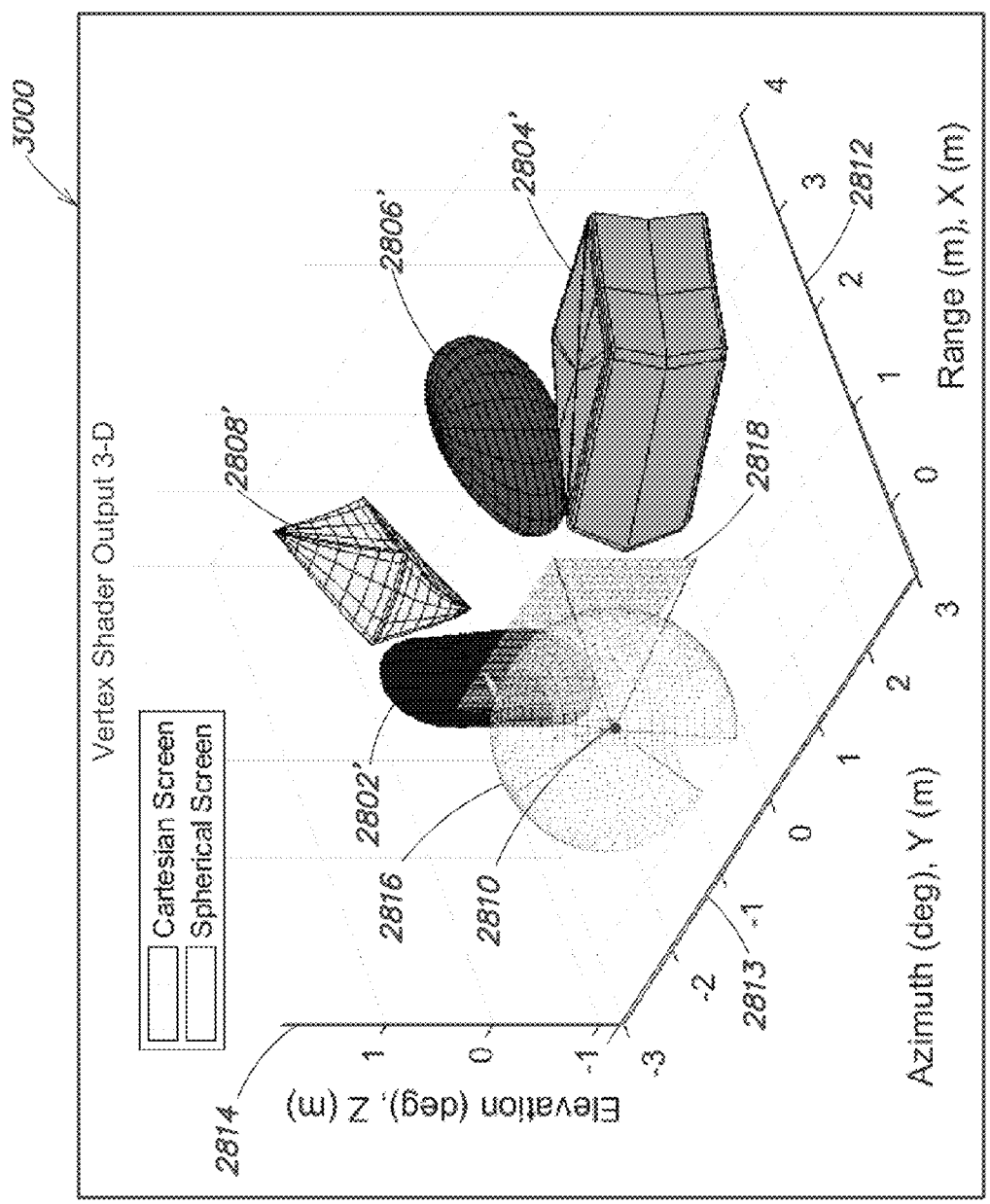
FIG. 30 is a schematic illustration of example scene data following an example projection and/or transformation.

The process of utilizing a spherical projection of the vertices to reduce the distortion is described first with reference to FIGS. 28-30 and then with reference to FIGS. 6 and 7.

FIG. 28 is a schematic illustration of example scene data 2800 that may be input to the vertex shader 338. For purposes of explanation, the scene data 2800 may include a plurality of objects, such as a cylinder 2802, a cube 2804, a sphere 2806, and an octahedron 2808. A sensor, such as a radar sensor, may be defined within the scene data 2810, as indicated at point 2810. The objects 2802-2808 may be disposed within the scene data 2800 as a function of range, azimuth, and elevation relative to the radar sensor 2810, as indicated by axes 2812, 2813, and 2814, respectively. The radar sensor 2810 may be located at range 0, azimuth 0, and elevation 0. The radar sensor 2810 may be pointing toward the sphere 2806 as indicated by the scales on the range, azimuth, and elevation axes 2812-2814. As illustrated, the cylinder 2802 and the cube 2804 are located behind the radar sensor 2810.

Suppose instead of the radar sensor 2810 that a camera were located in the scene data 2800 at that same location. For a camera, a standard vertex shader may determine which vertices are being pointed at by the camera. The standard vertex shader may also project the vertices onto a 2D Cartesian plane. FIG. 29 is a schematic illustration of an example output 2900 for a camera that might be generated by a standard vertex shader from the scene data 2800. The output 2900 may be 2D projection of vertices of objects at which the camera is pointing. For example, the output 2900 may include vertices from the sphere 2806 and from a portion of the octahedron 2808. The standard vertex shader may project vertices from the sphere 2806 and the portion of the octahedron 2808 onto a 2D Cartesian plane. The output 2900 may be provided to a standard pixel shader, which may determine which of the vertices projected onto the 2D Cartesian plane are within the camera's field of view, which is illustrated by screen 2902. As illustrated, only the vertices from the sphere 2806 fall on the screen 2902

Unlike a standard camera, a virtual sensor of the present disclosure may sense objects all around the sensor. For example, a lidar sensor may sense objects that are to the front, the sides, and even behind the sensor, unlike a camera. Accordingly, while only the sphere 2806 was in view of the camera, the radar sensor 2810 (or a lidar sensor) may sense all of the objects 2802-2808 included in the scene data 2800.

In some embodiments, the vertex shader 338 of the 3D game engine 324 may be configured to create a Spherical projection of vertices from the scene data 2800. For example, the vertex shader 338 may project vertices of the objects 2802-2808 onto a Spherical projection 2816 (FIG. 28). The vertex shader 338 may also transform, e.g., predistort, the vertices onto a 2D plane, which may be at least partially represented by a screen 2818 (FIG. 28).

FIG. 30 is a schematic illustration of example scene data 3000 following an example projection and/or transformation of vertices of the objects 2802-2808 using a spherical projection. The scene data 3000 includes transformed versions of the cylinder, cube, sphere, and octahedron, as indicated by transformed objects 2802'-2808'. As illustrated, the transformation applied by the vertex shader 338 may make the objects 2802'-2808' appear to be in front of the radar sensor 2810.

Figure 31:
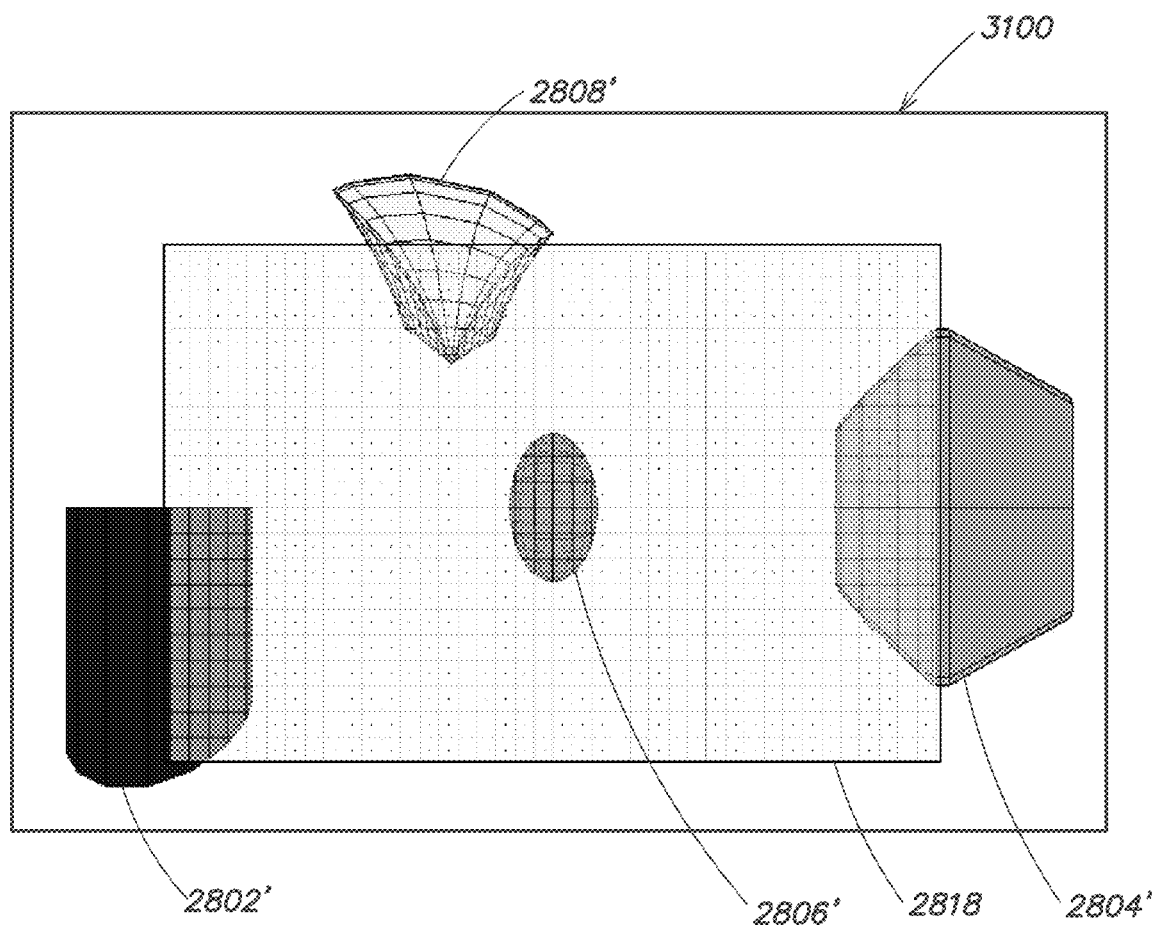
FIG. 31 is an illustration of an example two dimensional (2D) output of a vertex shader.

FIG. 31 is an example 2D output 3100 of the vertex shader 338 for the objects 2802-2808 following a spherical projection. The 2D output 3100 includes vertices of all of the objects 2802'-2808', and at least some vertices from all of the objects 2802-2808 are on the screen 2818. The 2D output 3100 shows how vertices of objects 2802-2808 within the scene data 2800 may be pre-distorted, such that a spherical screen with Azimuth (Az)=270° and Elevation (El)=120° field of view can be mapped into a standard Cartesian screen with Az=90° and El=67.5°.

As mentioned, FIGS. 6 and 7 provide another description of the spherical projection process.

FIG. 6 is a schematic illustration of an example planar Cartesian projection 600 of 3D scene data. The virtual radar sensor 326 may have a location given by a point 602 in the Cartesian projection 600, which may be 0, 0, 0 in the virtual radar sensor coordinate frame. The selected data may include vertices for two objects, a sphere object 604 and a cone object 606. The transformation process 506 may process each vertex of the selected data. For each vertex, the transformation process 506 may obtain the x, y, z coordinates of the vertex in the virtual radar sensor coordinate frame. The transformation process 506 may apply a Cartesian projection matrix to the x, y, and z coordinates of the vertex to compute the projection of the vertex onto a two dimensional (2D) plane 608, e.g., an orthographic and perspective projection. The 2D plane 608 may be a pixel grid having a horizontal resolution and a vertical resolution as specified for the virtual radar sensor 326, e.g., by the values entered at data entry boxes 402*c* and 402*d* (FIG. 4). Vertex coordinates may thus be converted from x, y, z coordinates to u, v, depth coordinates of this pixel grid. A virtual sensor coordinate frame including an x-axis 610, a y-axis 612, and a z-axis 614 may be associated with the 2D plane 608.

Applying the Cartesian projection matrix, the transformation process 506 projects the sphere 604 onto the 2D pixel grid 608 at pixel region 616. Similarly, the transformation process 506 projects the cone 606 onto the 2D pixel grid 608 at pixel region 618. Suitable Cartesian projection matrices include Unreal Engine's camera projection matrix.

FIG. 7 is a schematic illustration of an example spherical projection 700 of the data illustrated in FIG. 6. The Spherical projection 700 includes a spherical pixel grid 702. The transformation process 506 may apply a Spherical projection matrix to the x, y, and z coordinates of vertices to project them onto the spherical projection 700. Vertex coordinates may thus be converted from x, y, z coordinates to u, v, and depth on the spherical projection 700. The transformation process 506 may project vertices of the sphere object 604 onto the spherical pixel grid 702 at pixel region 704, and the vertices of the cone object 606 onto the spherical pixel grid 702 at pixel region 706. By generating a spherical projection, the area of pixels remains nearly constant throughout the entire pixel grid. The size of the spherical pixel grid 702 may be determined by the focal length of the virtual radar sensor 326, e.g., the pixel in the middle of the spherical pixel grid 702 may be in focus. The radius of the sphere may be set to the distance from the sensor, e.g., the virtual radar sensor, position to the sensor pixel grid, e.g., the sensor screen, such that the middle pixel of the grid 702 and the sphere may touch.

In other embodiments, the graphics pipeline 334, including the pixel shader 340 and the compute shader 342, however, may be configured to operate on vertices and/or pixels of a flat pixel grid, e.g., a flat screen, and not on vertices and/or pixels of a spherical pixel grid, e.g., a curved screen. In some embodiments, the transformation process 506 may pre-distort the vertices for subsequent processing by the pixel shader 340 and/or the compute shader 342. For example, as illustrated in the example code of FIG. 32 described herein, the transformation process 506 may estimate the angular difference between each vertex as projected on the 2D pixel grid 608 and on the spherical pixel grid 702 as measured from the location of the virtual radar sensor 326, e.g., from the point 602. The transformation process 506 may utilize the angular differences to compute a pre-distortion projection matrix that rotates vertices from the curved screen 702 to a flat screen. The transformation process 506 may then apply this pre-distortion matrix to the vertices as projected onto the curved screen 702 to rotate the vertices from the curved screen 702 to a flat screen, while leaving the range to the vertices unchanged.

While the above explanations included descriptions of translating vertices onto 2D Cartesian planes followed by descriptions of translating vertices onto spherical projections, it should be understood that the vertex shader 338 may be configured to translate the vertices directly onto a spherical projection in one-step. With the vertices translated to a spherical projection, the vertex shader 338 may then interpret the vertices as a Cartesian plane.

Returning to FIG. 5A, the output of the transformation process 506 may be a vertex list 508 for data from the 3D scene data 312 where the pixel areas are pre-distorted based on a spherical projection, as explained above. The vertex list 508 may also include the material attributes, which may be carried through the scene selector process 502 and the transformation process 506.

In some embodiments, the operations of the scene selector process 502 and the transformation process 506 may be performed by the vertex shader 338 of the graphics pipeline 334.

FIG. 32 is example code 3200 of a function for transforming, e.g., pre-distorting, vertices of the scene data in accordance with one or more embodiments. The code 3200 in the MATLAB programming language. The code 3200 may operate on each vertex, and may include a portion 3202 that computes the Azimuth Ratio and the Elevation Ratio between the Spherical and 2D Planar perspectives. The code 3200 may include another portion 3204 that computes Azimuth (Az), Elevation (El), and Range for the current vertex, using the MATLAB function 'cart2sph'. The input to the cart2sph function are the x, y, z coordinates of the vertex. Another portion 3206 scales the Az and El values computed for the vertex (but not the range) using the Azimuth and Elevation Ratios. The code 3200 includes a further portion 3208 that computes 2D Cartesian x, y, z values for the current vertex. The portion 3208 uses the MATLAB 'sph2cart' function.

It should be understood that code performing the functionality illustrated at FIG. 32 may be written in other languages, such as the High-Level Shader Language (HLSL), for implementation and/or execution by the vertex shader 338.

The vertex list 508 may be subjected to a sampling and rasterization process 510. The sampling and rasterization process 510 may include collecting the vertices and assembling them into 2D triangles. The sampling and rasterization process 510 may further include filling in the 2D triangles with pixels using a rasterization process. The filled in 2D triangles may also be referred to as fragments. For each pixel of a given 2D triangle or fragment, the sampling and rasterization process 510 may determine the x, y, z values, azimuth and elevation, and the normal. The sampling and rasterization process 510 may remove, e.g., clip, pixels that are hidden, e.g., occluded by other pixels.

As described, instead of being associated with color values, each vertex may be associated with one or more material attributes, which may be included in the 3D scene data 312, and carried through the scene selector and transformation processes 502 and 506. The sampling and rasterization process 510 may determine material attribute values for the pixels of the 2D triangles or fragments. The material attribute values for the pixels may be computed as a function of the values of the material attributes of the vertices. This may be done using one or more lookup tables, which may be built from interrogating objects, such as game assets in the Unreal Engine game engine. In other embodiments, lookup tables may be manually constructing, for example by tagging materials prior to running the environment 300. The output of the sampling and rasterization process 510 may be a pixel grid 514 that may include the x, y, z values, azimuth and elevation, the normal, and the material attributes for each pixel. The pixel grid 514 may represent the same data as the vertex list 508, but up-sampled at screen coordinates.

In some embodiments, the sampling and rasterization process 510 may be performed by the pixel shader 340 and/or by firmware of the graphics engine 324.

One or more of the scene selector process 502, the transformation process 506, and the sampling and vertex process 510 may be computer programs written in the High-Level Shader Language (HLSL). Normally, a vertex shader determines color values for the vertices of objects. A vertex shader may determine color as the sum of diffuse, specular, ambient, and emissive lighting. Because the synthetic sensor generator 304 is not producing an image for presentation on a display device, the vertex shader 338 may not compute color values for the vertices, nor may the pixel shader 340 compute color values for the pixels of the 2D triangles or fragments. Instead, as described, the pixel shader 340 may be configured to utilize material attributes of vertices to compute material attributes for the pixels of the 2D triangles or fragments formed by vertices. The material attributes may then be used to determine diffuse and specular reflectivity coefficients for the pixels, and these coefficients may be used in the calculation of synthetic radar data. As described, the material attributes also may be used to determine diffuse and specular reflectivity coefficients for use in calculating lidar and/or sonar data.

The pixel grid 514, which may include the x, y, z values for the pixels, azimuth and elevation, the normal of the pixels, and the material attributes for the pixels may be received by a sensor data computation process 516 (FIG. 5B). The sensor data computation process 516 may compute range and range rate values for the pixels from the x, y, z values of the pixels. For example, the sensor data computation process 516 may utilize a Euclidian distance formula to compute range, such as $$\text{range} = \sqrt{x^2 + y^2 + z^2}$$

where x, y, and z are the coordinates of the respective pixel, e.g., in the radar sensor coordinate frame.

Range rate may be computed as the change in range at each sample time.

The sensor data computation process 516 may also perform a lookup on the material reflectivity lookup tables 318 using the material attributes and normals for the pixels, and obtain reflectivity coefficients for the pixels from the lookup tables 318.

FIG. 10 is a schematic illustration of an example reflectivity lookup table (LUT) 1000 for a plurality of material types. The reflectivity LUT 1000 may be an array having a plurality of columns and rows whose intersections define cells or records for storing data. For example, the reflectivity LUT 1000 may include a plurality of rows 1002a-g where each row 1002 corresponds to a respective material type. The reflectivity LUT 1000 may include a Material Identifier (ID) column 1004 that may include unique IDs assigned to material types, such as integer values 1 to 7, and a Material Path column 1006 that may identify a file location for the respective material file, which in the Unreal Engine game engine may be a *.uasset file type. The reflectivity LUT 1000 also may include columns including reflectivity data for one or more of radar reflectivity 1008, sonar reflectivity 1010, or lidar reflectivity 1012. The radar reflectivity 1008 may include columns 1014-1016 for radar diffuse strength, radar specular strength, and radar specular exponent coefficients. The sonar reflectivity 1010 may include columns 1018-1020 for sonar diffuse strength, sonar specular strength, and sonar specular exponent coefficients. The lidar column 1012 may include columns 1022-1024 for lidar diffuse strength, lidar specular strength, and lidar specular exponent coefficients.

The sensor data computation process 516 may attenuate the reflectivity coefficients, for example in response to atmospheric conditions, such as rain, snow, fog, etc., to produce final or total coefficients. The attenuation, which may be a function of range and wavelength, may be determined using a formula or a lookup table.

The output of the sensor data computation process 516 may be a pixel grid 518 that includes range, range rate, and reflectivity information, e.g., the reflectivity coefficients, for each pixel.

In some embodiments, the sensor data computation process 516 may be performed by the pixel shader 340.

The pixel grid 518 generated by the sensor data computation process 516 may be received by a sensor signal computation process 520. The range, range rate, and reflectivity coefficients for each pixel may be processed, e.g., combined using a weighted 3D spatial integral (integration by shells), by the sensor signal computation process 520 to compute a synthetic radar sensor signal 522. The sensor signal computation process 520 may receive one or more beam patterns for the virtual radar sensor 326, and the received beam pattern may be used in determining the synthetic radar sensor signal 522. The synthetic radar sensor signal 522 may include range, amplitude, and range rate.

The purpose of the spatial integration process may be to compute the complex response of the electromagnetic (EM) waves as seen by the virtual radar sensor 326. The EM waves are radiated by the transmitter, scattered by the 3D scene, and absorbed by the receiver. The radar transmitter and receiver may be assumed to be collocated. It may also be assumed that the radar transmitter is phase coherent. In some embodiments, the spatial integration process may be applied in multiple steps. First, the pixel shader 340 may be configured to perform the following operations:

1. Get the magnitude of the pixel reflectance (Magnitude).
2. Get the range of the pixel (Range).
3. Calculate the complex response of the pixel (PixelIQ).
4. Calculate the range bin index of the pixel (PixelRangeBinIndex).

FIG. 11 is a schematic illustration of example code 1100 for performing these operations at each pixel. The code 1100 is in the MATLAB language. At line 1 of the code 1100, a 2D matrix named 'PixelIQ' is created having a size matching the virtual radar sensor's resolution, e.g., Height, Width. The elements of the PixelIQ matrix are assigned a complex data type, e.g., the elements have a real part and an imaginary part, and the elements are also initialized to zero. At line 2 another 2D matrix is created, this one called 'PixelRangeBinIndex' again having a size matching the virtual radar sensor's resolution, e.g., Height, Width. The elements are assigned a 32-bit integer data type, and are initialized to zero. At lines 5-6, the elements of the PixelIQ matrix are computed by:

1. multiplying each pixel's range value by 2 and dividing result by the wavelength of the virtual radar sensor 326 (Lambda);
2. multiplying result of step 1 by 2 times Pi;
3. creating a complex output from step 2, where the real component is zero and the imaginary component is the result of step 2;
4. returning the complex exponential of step 3; and
5. multiplying the result of step 4 by the magnitude of the pixel's reflectance.

The magnitude of pixel reflectance may be computed using an illumination model, such as the Phong illumination model but without the ambient components.

At line 7, the elements of the PixelRangeBinIndex matrix are computed by:

1. rounding the range value for each pixel to the nearest integer; and
2. dividing the result of step 1 by the virtual radar sensor's range resolution.

Next, the compute shader 342 may be configured to perform the following operations:

1. Get the complex response of the pixel (PixelIQ).
2. Get the range bin index of the pixel (PixelRangeBinIndex).
3. Sum all the complex responses corresponding in the same range bin (ReceiverIQ).

FIG. 12 is a schematic illustration of example code 1200 for performing these operations at each pixel. The code 1200 is in the MATLAB programming language. At line 1 of the example code 1200, a vector called 'ReceiverIQ' is created having a number of elements equal to the number of range bins (NumRangeBins) determined for the virtual radar sensor 326. At line 4, the pixel range bin index value is retrieved for each pixel, and at line 5, the complex responses for all pixels having that same pixel range bin index value are summed.

The synthetic radar sensor signal 522 may be provided by the synthetic sensor data generator 304 to the modeling environment 306, as indicated by arrow 523. In some embodiments, a data conditioning process 524 may be run by the modeling environment 306, which may perform such things as pulse integration, Doppler shift, detection and tracking, etc.

Example 3D Scene Data

FIG. 13 is a schematic illustration of a visual representation of an example 3D scene 1300 in accordance with one or more embodiments. The 3D scene 1300 includes a sphere 1302 and seven cubes 1304-1310. The 3D scene 1300 further includes a back wall 1312 and a right side wall 1314. The 3D scene 1300 may appear as though viewed from the location of the virtual radar sensor 326.

Figure 14:
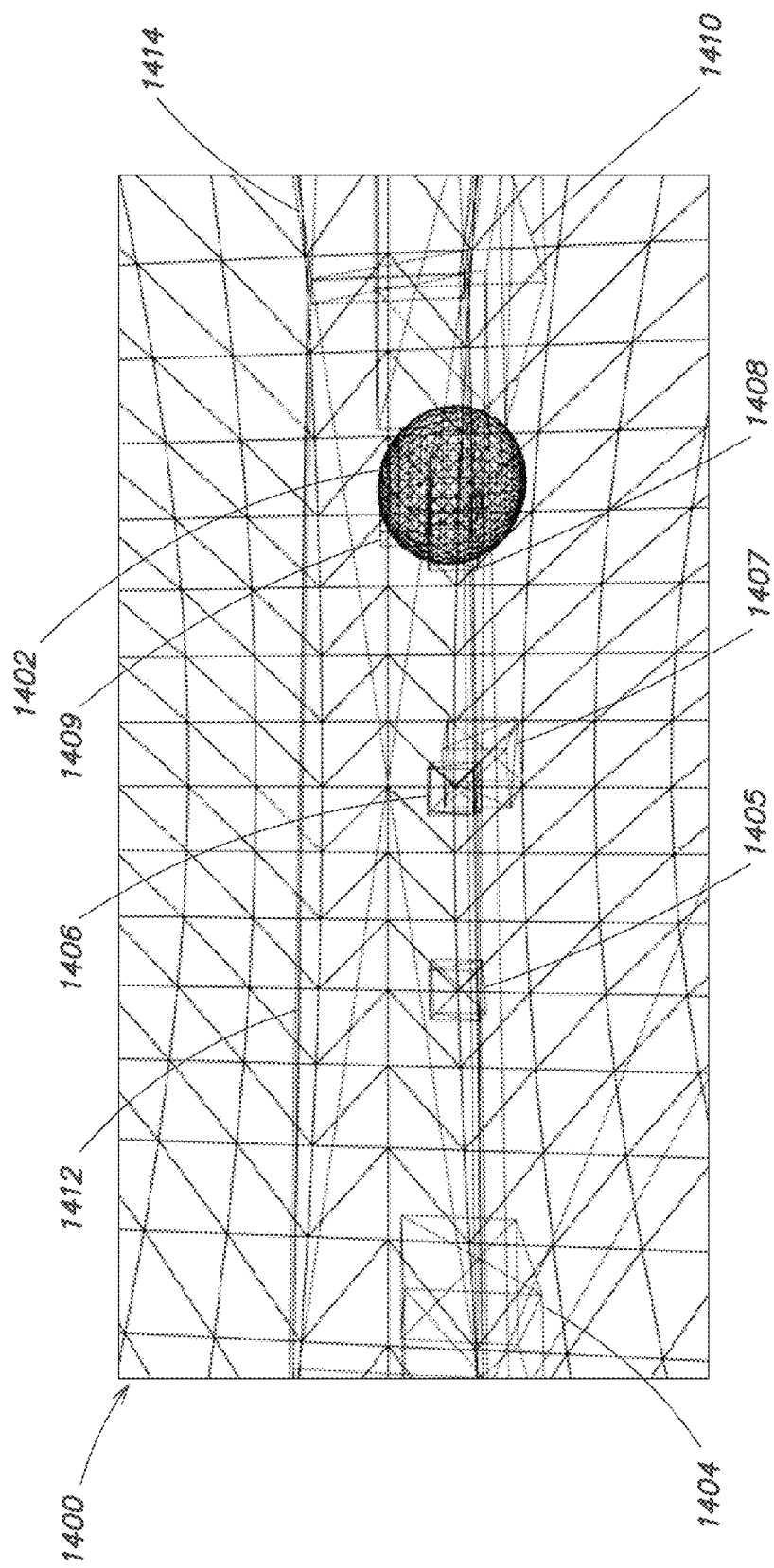
FIG. 14 is a schematic illustration of primitives for the 3D scene of FIG. 13 in accordance with one or more embodiments.

FIG. 14 is a schematic illustration of an example representation of primitive data 1400 for the 3D scene 1300 of FIG. 13 in accordance with one or more embodiments. The primitive data 1400 may include points, lines, and triangles. The points may be vertices that define triangles. The triangles may define surface models for the objects shown in the 3D scene 1300. For example, the primitive data 1400 may include one object 1402 corresponding to the sphere 1302 and seven objects 1404-1410 corresponding to the cubes 1304-1310. The primitive data 1400 also may include an object 1412 corresponding to the back wall 1312, and yet another object 1414 corresponding to the side wall 1314.

The synthetic sensor data generator 304 may receive the primitive data 1400 and generate synthetic radar sensor data therefor. For example, the sampling and rasterization process 510 may process the primitive data 1400, and produce a pixel grid. For each pixel, the pixel grid may include the pixel's x, y, z coordinates, azimuth, elevation, and range, the pixel's normal, and the pixel's material attributes. The sensor data computation process 516 may then utilize the material attributes for the pixels to perform a lookup on the material reflectivity lookup tables 318 to obtain reflectivity data for the pixels. The sensor data computation process 516 may produce a pixel grid that includes reflectivity data obtained for each pixel.

Figure 15:
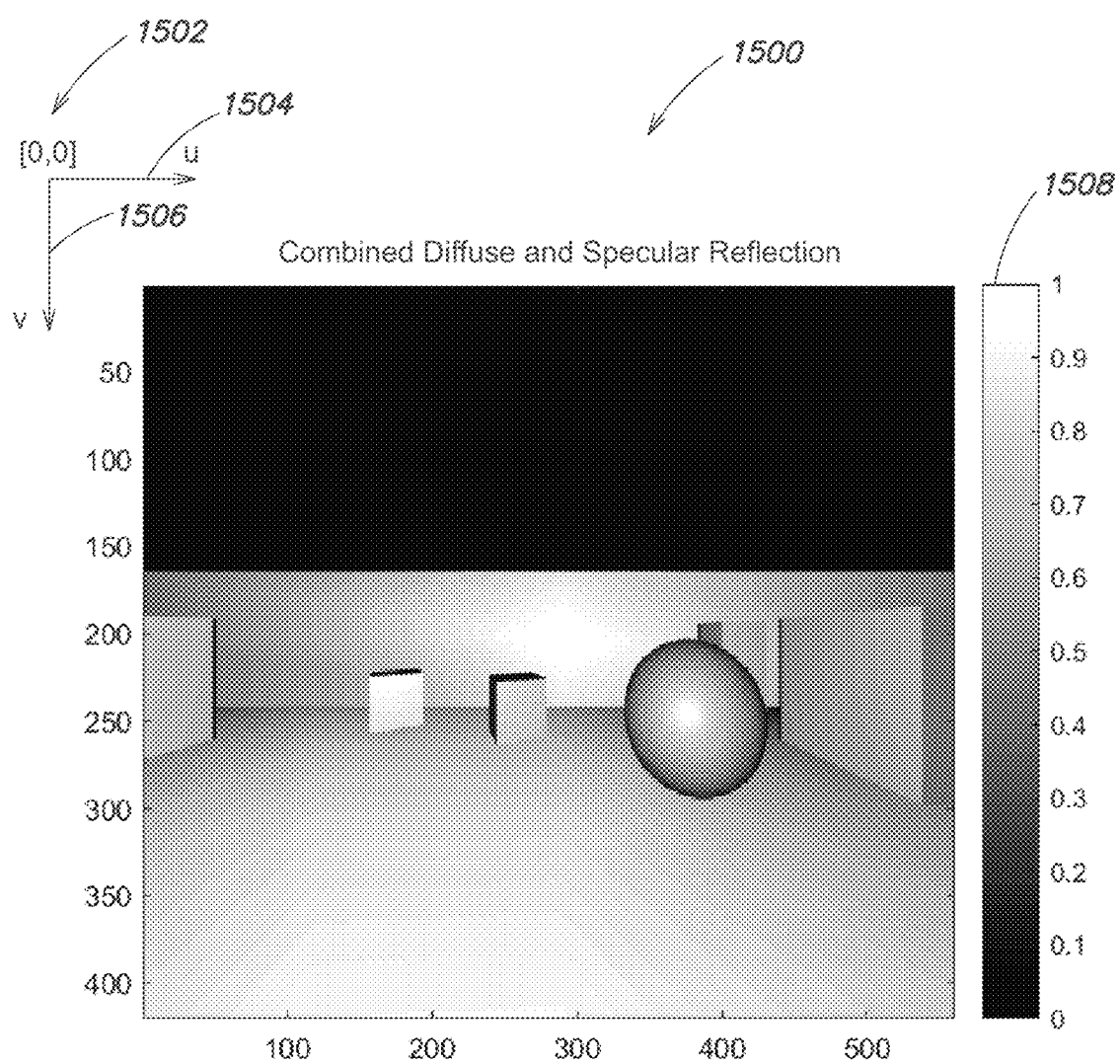
FIG. 15 is a schematic illustration of a pixel grid in accordance with one or more embodiments.

FIG. 15 is a schematic illustration of an example pixel grid 1500 for the primitive data 1400 of FIG. 14 in accordance with one or more embodiments. The pixel grid 1500 illustrates the combination of diffuse reflectivity information and specular reflectivity information for each pixel. A 2D pixel coordinate frame 1502 may be associated with the pixel grid 1500. The 2D pixel coordinate frame 1502 may include a u-axis 1504 and a v-axis 1506. The origin, e.g., pixel [0, 0] may be at an upper left corner of the pixel grid 1500. The pixel grid 1500 may have a resolution of 1920× 1080, e.g., 1080p.

Computed radar reflectivity values for each pixel, e.g., based on the pixel's material type and the normal vector, is illustrated in grayscale. A grayscale legend 1508 of reflectivity is included.

Figure 16:
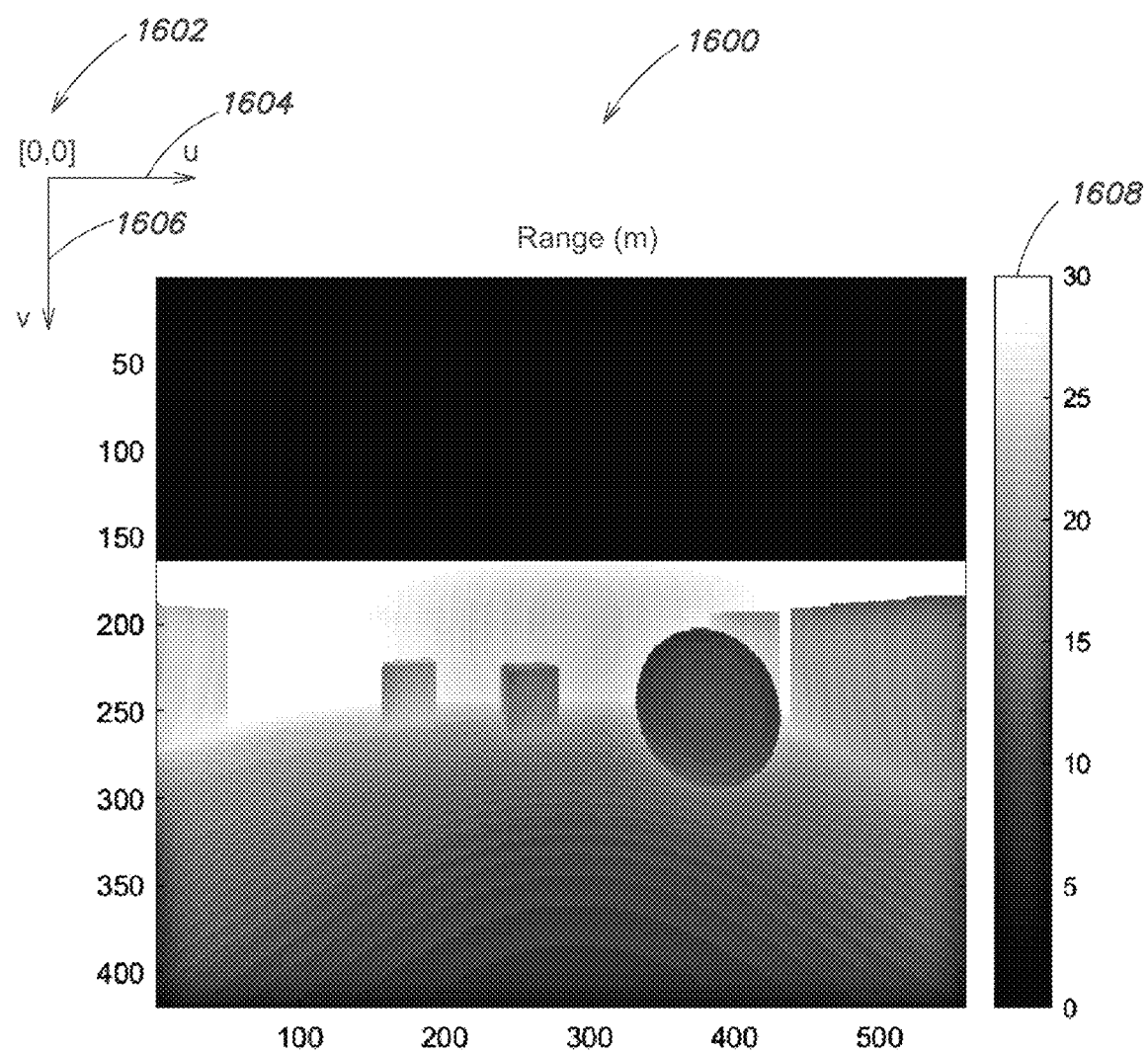
FIG. 16 is a schematic illustration of an example pixel grid in accordance with one or more embodiments.

FIG. 16 is a schematic illustration of an example pixel grid 1600 for the primitive data 1400 of FIG. 14 in accordance with one or more embodiments. The pixel grid 1600 illustrates the range information computed for each pixel. A 2D pixel coordinate frame 1602 may be associated with the pixel grid 1600. The 2D pixel coordinate frame 1602 may include a u-axis 1604 and a v-axis 1606, with an origin at an upper left corner, and a resolution of 1920×1080.

As described above, range values may be computed for each pixel using a distance formula, such as:

$$\text{range} = \sqrt{x^2 + y^2 + z^2}$$

where x, y, z are the coordinates of the respective pixel, e.g., in the virtual radar sensor coordinate frame.

Computed range values for each pixel is illustrated in the example pixel grid 1600 in grayscale. A grayscale legend 1608 of range is included.

A beam pattern from the radar beam patterns 320 may be selected for combination with the reflectivity pixel grid 1300.

Figure 17:
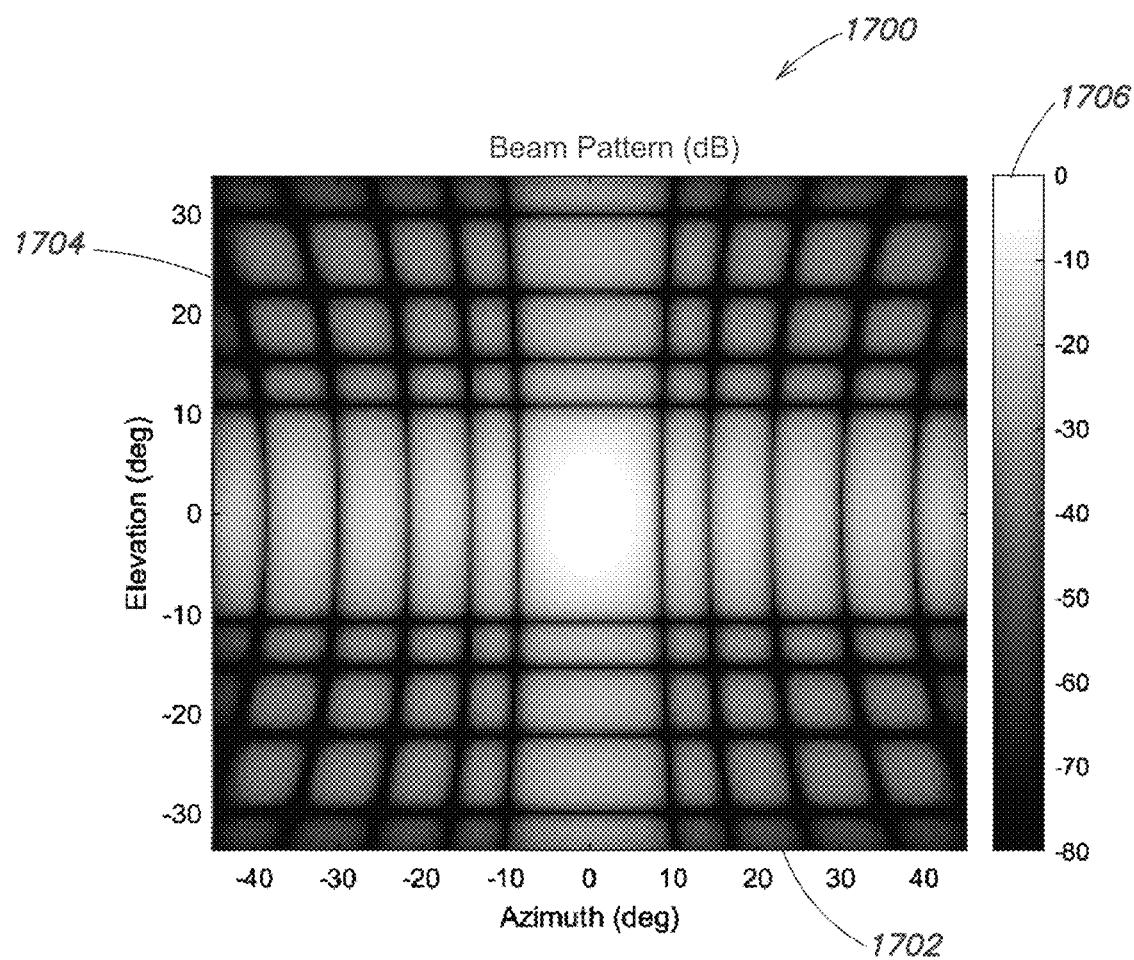
FIG. 17 is a schematic illustration of an example plot of a radar beam pattern in accordance with one or more embodiments.

FIG. 17 is a schematic illustration of an example plot 1700 of a radar beam pattern in accordance with one or more embodiments. An x-axis 1702 of the plot 1700 indicates azimuth, and a y-axis 1704 indicates elevation.

The antenna pattern is illustrated in the example plot 1700 in grayscale. A grayscale legend 1706 is included.

The sensor signal computation process 520 may combine the selected beam pattern represented by the plot 1500 with computed reflectivity values, e.g., as illustrated by the pixel grid 1300. A revised reflectivity pixel grid may be created that accounts for the antenna pattern.

Figure 18:
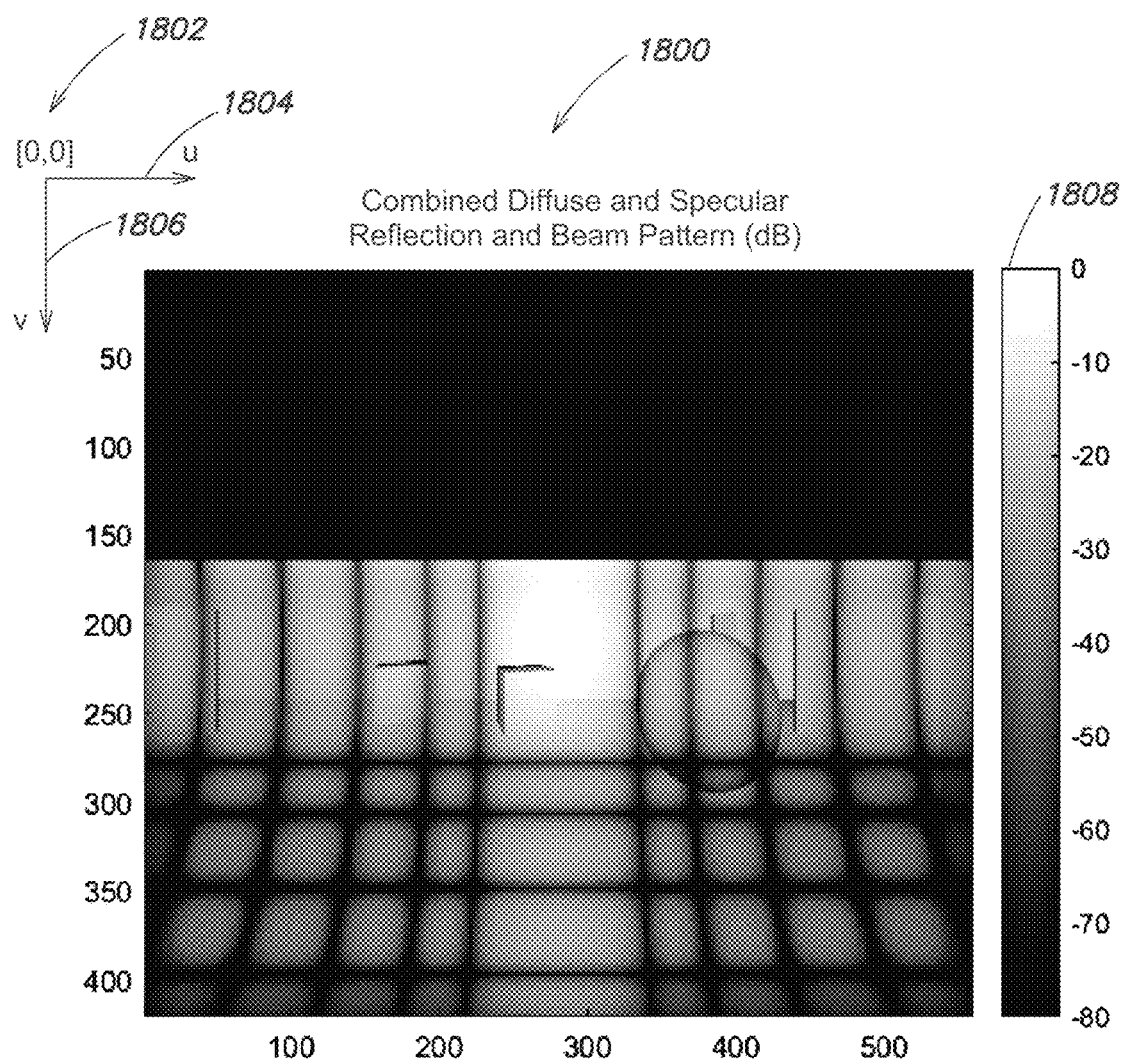
FIG. 18 is a schematic illustration of an example pixel grid in accordance with one or more embodiments.

FIG. 18 is a schematic illustration of an example pixel grid 1800 for the primitive data 1400 of FIG. 14 in accordance with one or more embodiments. The pixel grid 1800 illustrates the combination of diffuse and specular reflectivity information updated with the antenna pattern 1700 (FIG. 17). A 2D pixel coordinate frame 1802 may be associated with the revised pixel grid 1800. The 2D pixel coordinate frame 1802 may include a u-axis 1804 and a v-axis 1806, with an origin at an upper left corner, and a resolution of 1920×1080.

Radar reflectivity values for each pixel revised based on the antenna pattern 1500 is illustrated in grayscale. A grayscale legend 1808 is included.

Figure 19:
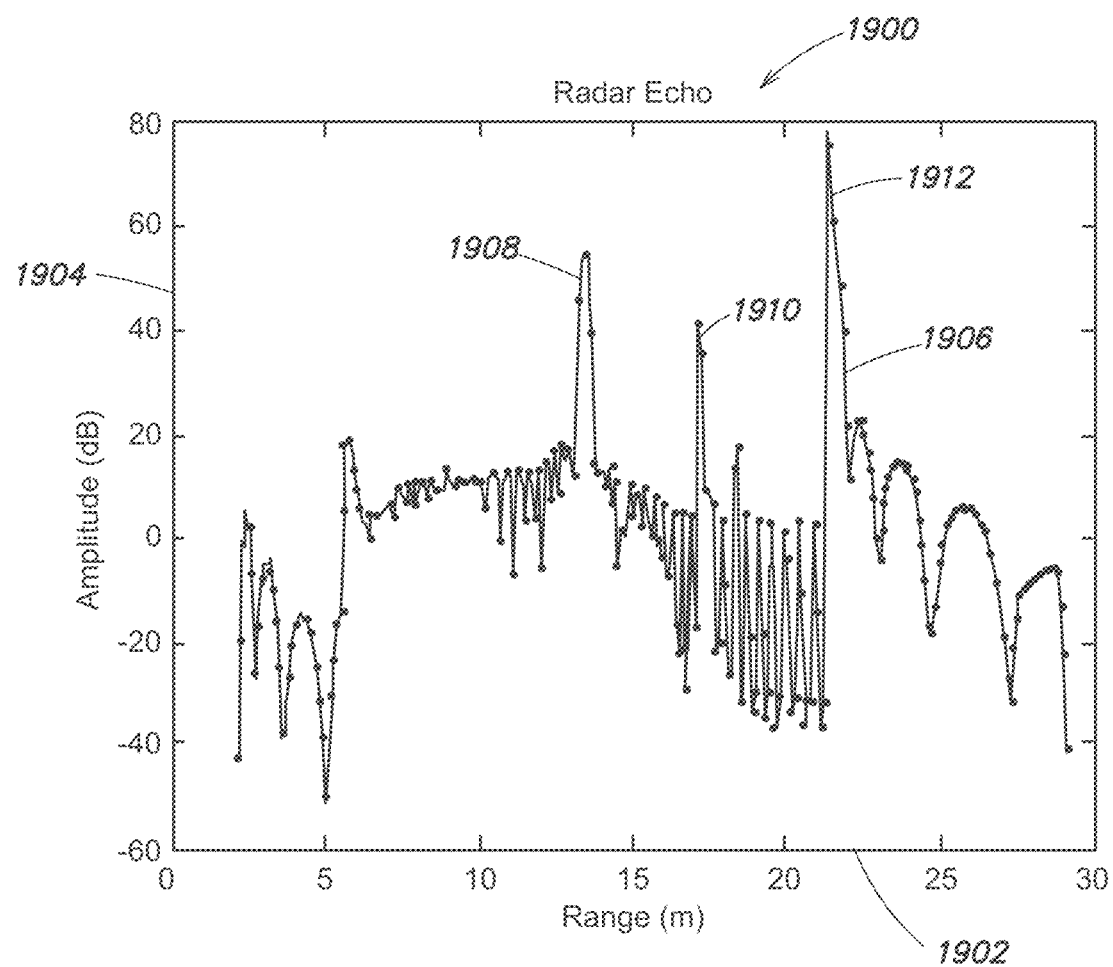
FIG. 19 is a schematic illustration of an example plot of synthetic radar range data in accordance with one or more embodiments.

FIG. 19 is a schematic illustration of an example plot 1900 of synthetic range data for the primitive data 1400 (FIG. 14) in accordance with one or more embodiments. An x-axis 1902 may indicate range in meters (m), and a y-axis may indicate the amplitude of the echo in decibels (db). The plot 1900 may include a synthetic radar range signal 1906. The radar range signal 1906 may include a peak 1908 that may correspond to the sphere object 1302 (FIG. 13), the cube object 1304, and the cube object 1310, which may all be at the same range from the virtual radar sensor 326. Another peak 1910 may correspond to the cube object 1307. Another peak 1912 may correspond to the back wall object 1312. Data corresponding to the synthetic radar range signal 1906 may be provided by the synthetic sensor data generator 304 to the modeling environment 306. The modeling environment 306 may utilize the data for the synthetic radar range signal 1906 as an input to the model 350.

As shown, the virtual radar sensor 326 may generate synthetic radar signals without computing radar cross section (RCS) values for objects.

Synthetic Sonar Data

The synthetic sensor data generator 304 in cooperation with the modeling environment 306 may also generate synthetic sensor data for the virtual sonar sensor 330.

Figure 20:
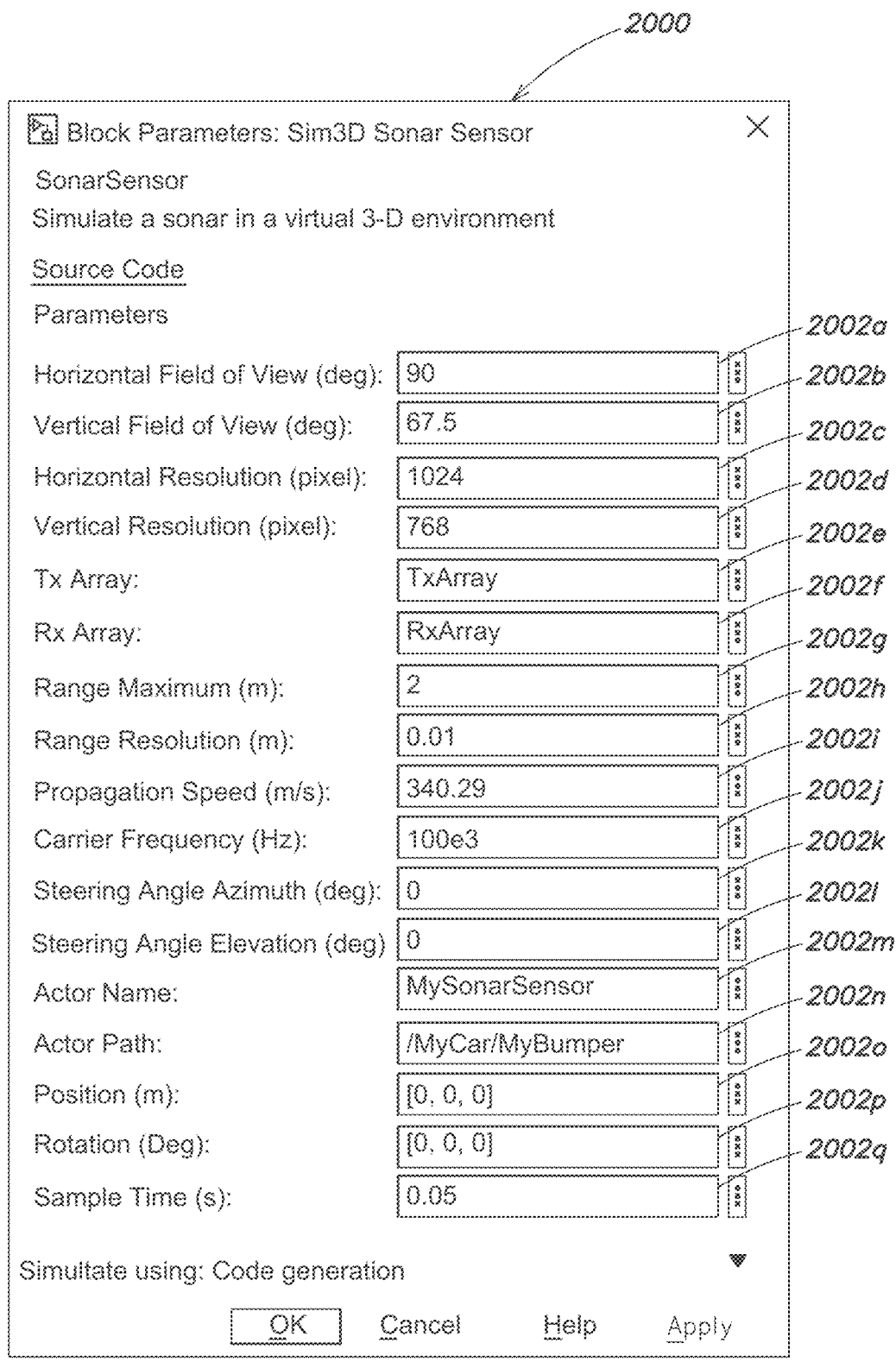
FIG. 20 is a schematic illustration of an example graphical affordance through which values for parameters of a virtual sensor may be specified in accordance with one or more embodiments.

FIG. 20 is a schematic illustration of an example graphical affordance 2000 through which values for parameters of the virtual sonar sensor 330 may be specified, e.g., set, in accordance with one or more embodiments. The graphical affordance 2000 may be created by a User Interface (UI) engine of the modeling environment 306. The graphical affordance 2000 may be in the form of a window, such as a properties page or parameter dialog, that includes a plurality of data entry boxes through which a user may set and/or select values for parameters of the virtual sonar sensor 330. For example, the graphical affordance 2000 may include horizontal and vertical field of view data entry boxes 2002*a* and 2002*b* for receiving values for the sonar sensor's horizontal and vertical fields of view, e.g., in degrees (deg). The graphical affordance 2000 also may include horizontal and vertical resolution data entry boxes 2002*c* and 2002*d* for receiving horizontal and vertical resolution values, e.g., in pixels, for an image plane created by the graphics pipeline 334 of the 3D game engine 324 for the virtual sonar sensor 330. In some embodiments, boxes 2002*c* and 2002*d* may be omitted, and the graphics pipeline 334 may use default values instead of user-specified values.

The graphical affordance 2000 may include transmit (Tx) and receive (Rx) array data entry boxes 2002*e* and 2002*f* for receiving the identity of elements for modeling the geometry of sonar sensor's transmit array and receive array.

The graphical affordance 2000 may include range maximum and range resolution data entry boxes 2002*g* and 2002*h* for receiving values for the virtual sonar's maximum (max) range and range resolution, e.g., in meters (m). The modeling environment 306 may compute the number of range bins for the virtual sonar sensor 330 as a function of the values specified for the sonar's maximum and minimum ranges and the range resolution. For example:

$$M = \frac{R_{max} - R_{min}}{\Delta R}$$

where,

M is the number of range bins, $R_{max}$ is the sonar sensor's maximum range, $R_{min}$ is the sonar sensor's minimum range, and $\Delta R$ is the sonar sensor's range resolution.

In some embodiments, the modeling environment 306 may set the virtual sonar's minimum range to zero by default. In other embodiments, a value may be specified, for example through a data entry box of the graphical affordance 2000. The modeling environment 306 may utilize the max range and range resolution values to determine the number of data points returned by the virtual sonar sensor 330 at each measurement instant, e.g., sample time. For example, the modeling environment 306 may utilize the max range and range resolution values to determine the sampling rate of a virtual sonar signal generated by the 3D game engine 324.

The graphical affordance 2000 may include a propagation speed data entry box 2002*i* for receiving a value for the speed of the sonar's sensor's sound waves, e.g., in meters per second (m/s), such as the speed of sound. The graphical affordance 2000 may include a carrier frequency data entry box 2002*j* for receiving a value for the sonar sensor's carrier frequency, e.g., in Hz, such as 77 GHz. The modeling environment 306 may utilize the propagation speed and the carrier frequency to calculate the wavelength of the virtual sonar sensor 330, and the modeling environment 306 may utilize the wavelength and the Tx/Rx array specification to calculate the sonar sensor's beam pattern. The graphical affordance 2000 may include steering angle azimuth and steering angle elevation data entry boxes 2002*k* and 2002*l* for receiving user-specified values for the direction, e.g., in degrees, in which the virtual sonar sensor 330 is pointing relative to a forward, e.g., x-direction, of the ego vehicle coordinate frame. The graphical affordance 2000 may include actor name and actor path data entry boxes 2002*m* and 2002*n* for receiving values specifying unique identifying information for the virtual sonar sensor 330 and a file location at which a data structure containing the parameters may be stored. The graphical affordance 2000 may include position and rotation data entry boxes 2002*o* and 2002*p* for receiving values for x, y, z coordinates and the pitch, roll, and yaw of the virtual sonar sensor 330 in the ego vehicle coordinate frame. The graphical affordance 2000 may include a sample time data entry box 2002*q* for receiving a value indicating how often, e.g., in seconds, the virtual sonar sensor 330 takes a measurement.

The values entered for the parameters of the virtual sonar sensor 330, e.g., by a user, may be stored as the sensor options 316, and at least some of the values may be provided to the synthetic sensor data generator 304.

In some embodiments, the synthetic sensor data generator 304 and the modeling environment 306 may utilize the same process as described for the virtual radar sensor 326 to generate the synthetic sensor signals for the virtual sonar sensor 330. For the virtual sonar sensor 330, values for some of the parameters, such as propagation and carrier frequency, may be different.

Synthetic Lidar Data

A lidar unit determines distance to a target by emitting laser light pulses, and measuring the reflected pulses at a lidar sensor. The differences in laser return times and wavelengths are used to create a 3D representation of the surface of the target. For autonomous vehicles, a lidar unit may use one or more rotating mirrors to distribute a laser ray or several laser rays over a field of view. The output of the lidar unit may be a point cloud, which is a set of data points for the reflected pulses in a 3D coordinate frame, such as the ego vehicle's coordinate frame.

Figure 21:
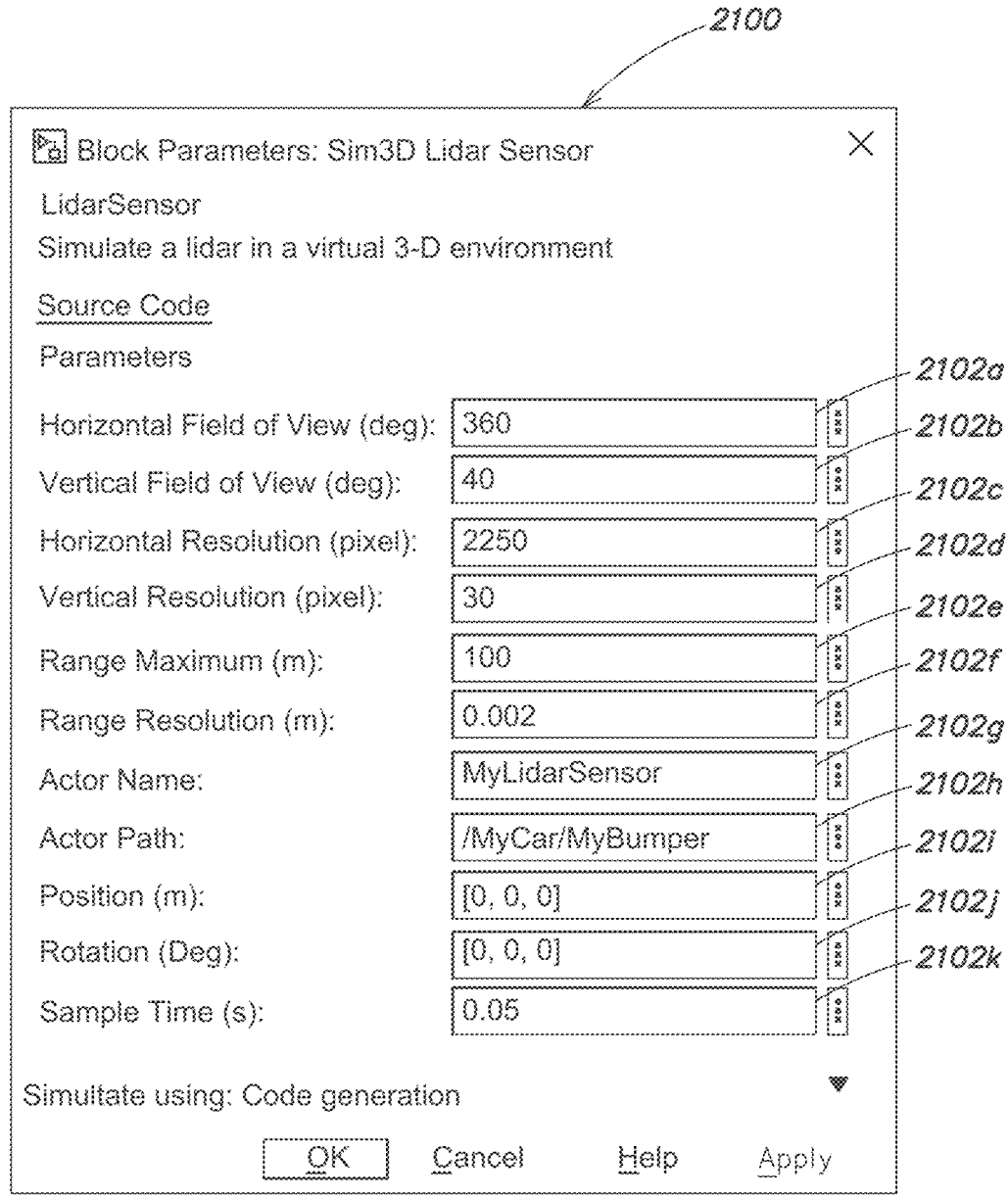
FIG. 21 is a schematic illustration of an example graphical affordance through which values for parameters of a virtual sensor may be specified in accordance with one or more embodiments.

FIG. 21 is a schematic illustration of an example graphical affordance 2100 through which values for parameters for the virtual lidar sensor 328 may be specified, e.g., set, in accordance with one or more embodiments. The graphical affordance 2100 may be in the form of a window, such as a properties page or parameter dialog, that includes a plurality of data entry boxes through which a user may specify values for parameters of the virtual lidar sensor 328. For example, the graphical affordance 2100 may include horizontal and vertical field of view data entry boxes 2102a and 2102b whose values may be specified in degrees (deg). As shown, a horizontal field of view of 360° may be set for the virtual LIDAR sensor 328. The graphical affordance 2100 also may include horizontal and vertical resolution data entry boxes 2102c and 2102d whose values may be specified in pixels. The graphical affordance 2100 may include range maximum and range resolution data entry boxes 2102e and 2102f whose values may be specified in meters (m). Range maximum refers to the maximum distance from the lidar unit an object may be, and still reflect the lidar's laser. Range resolution refers to the precision with which the sensor can measure distances. It may be provided in increments of 0.0002 meters (m) for typical lidar sensors. Range resolution may be used to quantize data generated by the synthetic sensor data generator 304. For example, range resolution may be used to quantize highly accurate range information so that the virtual lidar sensor 328 may more realistically model an actual lidar sensor's behavior. The graphical affordance 2100 may include actor name and actor path data entry boxes 2102g and 2102h for specifying unique identifying information for the virtual lidar sensor 328, and a file location at which a data structure with the parameters may be stored. The graphical affordance 2100 may include position and rotation data entry boxes 2102i and 2102j for specifying the x, y, z coordinates and the pitch, roll, and yaw of the virtual lidar sensor 328 in the ego vehicle coordinate frame. The graphical affordance 2100 may include a sample time data entry box 2102k for specifying how often in seconds the virtual lidar sensor 328 takes a measurement.

To generate synthetic lidar data, the scene selector process 502, the transformation process 506, and the sampling and rasterization process 510 may be performed in a similar manner as described. The output of the sampling and rasterization process 510 for example may be one or more pixel grids that include x, y, z coordinates, azimuth, elevation and range, normals, and material attributes for the pixels. To generate LIDAR data, the pixel shader 340 may be configured to determine reflectivity coefficients in the lidar wavelength range for the pixels. The pixel shader 340 may also generate one or more pixel grids with the determined reflectivity coefficients. In some embodiments, reflectivity coefficients may be obtained from one or more of the material reflectivity LUTs 318 implemented at the modeling environment 306. The reflectivity coefficients may be determined, e.g., from the LUTs 318, as a function of the material attribute and normals for the pixels. The pixel shader 340 may use an empirical Phong shading model to derive reflectivity coefficients for the pixels. This model may account for the direction of the lidar beam relative to the surface it is reflected from, e.g., using the surface normals, and the material type that affect its reflectivity. In some implementations, other models may be used that also take into consideration the distance to the object surface from the virtual lidar sensor 328 and/or the loss of energy when propagating through a medium, such as rain, fog, snow, etc.

The pixel shader 340 may also compute range information for the pixels, and generate one or more pixel grids with the computed range information. For example, the pixel shader 340 may determine the distance from the virtual lidar sensor 328 in the 3D scene data 312 to each pixel using the x, y, z coordinates of the pixel. Pixels whose computed range is greater than the Range Maximum parameter for the virtual lidar sensor 328 may be represented on the range pixel grid using null values, such as 0 or a custom, pre-determined value for indicating that there was no object within the range of the sensor's radar beam.

The pixel shader 340 may utilize the values for the horizontal and vertical fields of view and the values for the horizontal and vertical resolutions specified for the virtual lidar sensor 328 to generate the reflectivity coefficient pixel grid and the range pixel grid. For example, the pixel shader 340 may sample data from the 3D scene data 312 based on the values specified for these attributes of the virtual lidar sensor 328. In some embodiments, these pixel grids may represent a full 360° "view" around the virtual lidar sensor 328 in the 3D scene data 312.

Unlike the radar and sonar sensors 326 and 330, beam patterns may not be used to generate synthetic lidar data. In addition, range rate information may not be computed as part of the synthetic lidar data.

In some embodiments, the virtual lidar sensor 328 may output the data included in the reflectivity coefficient pixel grid and the range pixel grid as synthetic lidar sensor data 344. In other embodiments, the compute shader 342 may be configured to process information from the reflectivity coefficient pixel grid and the range pixel grid to create data in the form of a point cloud. For example, the compute shader 342 may quantize the data using the range resolution parameter, add noise effects, or sample a different, e.g., higher, resolution range image according to the beam pattern. The compute shader 342 may also output a null value instead of the determined range to an object, if the object is beyond the range of the virtual lidar sensor 328. The compute shader may perform coordinate transforms from spherical to Cartesian coordinates, for example for each individual laser beam in parallel.

Figure 22:
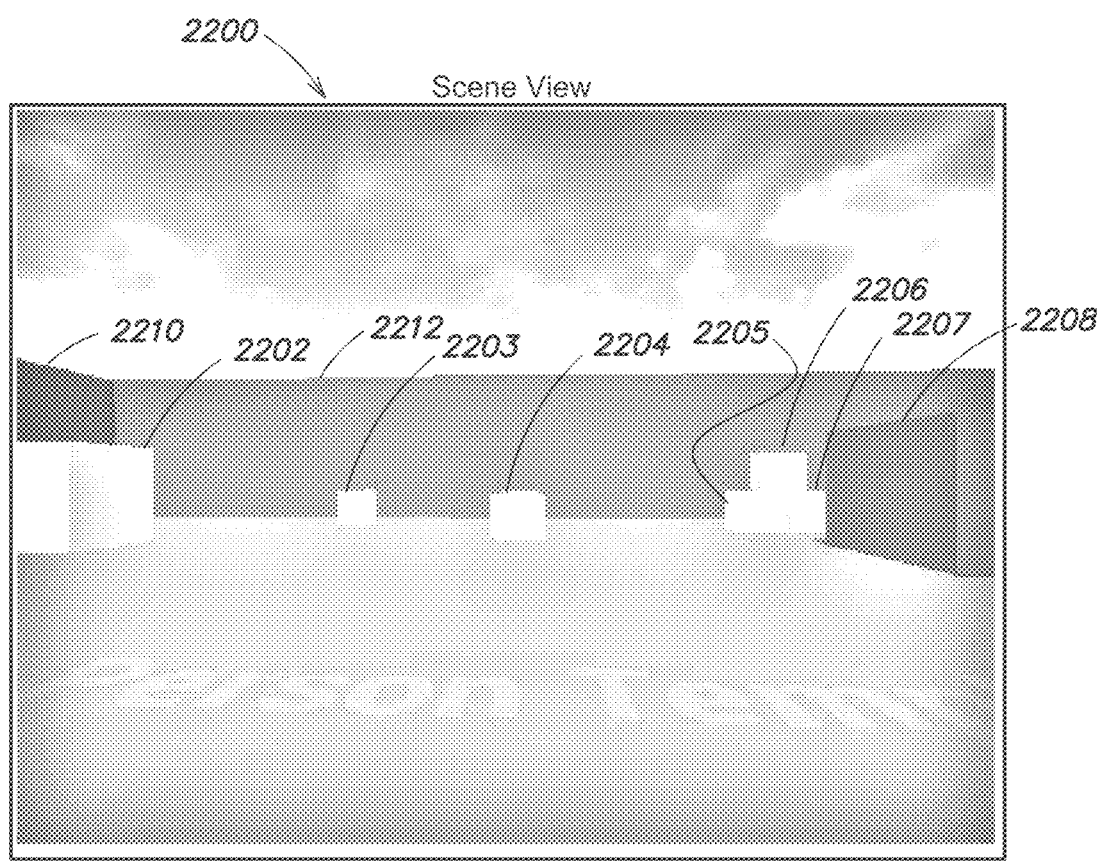
FIG. 22 is a schematic illustration of a visual representation of an example three dimensional (3D) scene in accordance with one or more embodiments.

FIG. 22 is a schematic illustration of a visual representation of a portion of an example 3D scene 2200 in accordance with one or more embodiments. The 3D scene 2200 includes seven cubes 2202-2208, a left side wall 2210, and a back wall 2212. The 3D scene 2200 may be from the point of view of the virtual lidar sensor 328. It should be understood that the 3D scene 2200 is only a portion of a 360° view surrounding the virtual lidar sensor 328.

The synthetic sensor data generator 304 may receive primitives representing the selected 3D scene data 2200, and generate synthetic lidar data therefor. For example, the sampling and vertex process 510 may process the selected primitives for the 3D scene data 2200, and produce one or more pixel grids. For each pixel, the pixel grid may include the pixel's x, y, z coordinates, azimuth, elevation, and range, the pixel's normal, and the pixel's material attributes. The sensor data computation process 516 may then utilize the material attributes for the pixels to perform a lookup on the material reflectivity lookup tables 318 to obtain reflectivity coefficients in the lidar spectrum for the pixels. The sensor data computation process 516 may produce a one or more pixel grids that includes reflectivity coefficients obtained for each pixel in a similar manner as described with the virtual radar sensor 326.

Figure 23:
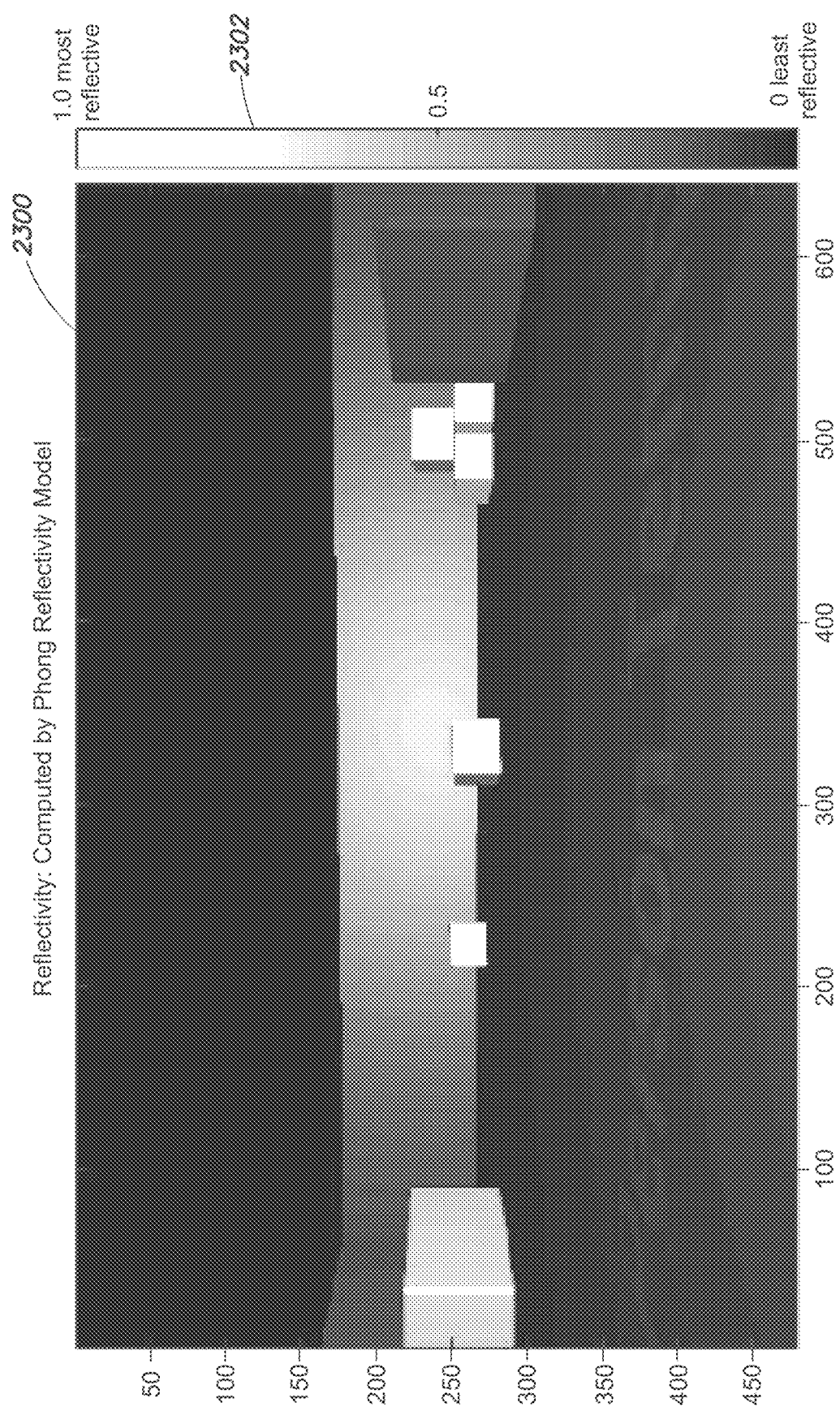
FIG. 23 is a schematic illustration of a pixel grid in accordance with one or more embodiments.

FIG. 23 is a schematic illustration of an example pixel grid 2300 with reflectivity information for the primitives of the 3D scene data 2200 of FIG. 22 in accordance with one or more embodiments. The pixel grid 2300 illustrates the combination of diffuse reflectivity information and specular reflectivity information for the pixels included in the pixel grid 2300. Computed lidar reflectivity values for each pixel, e.g., based on the pixel's material type and normal vector, is indicated in grayscale. A grayscale legend 2302 of reflectivity is also shown.

Figure 24:
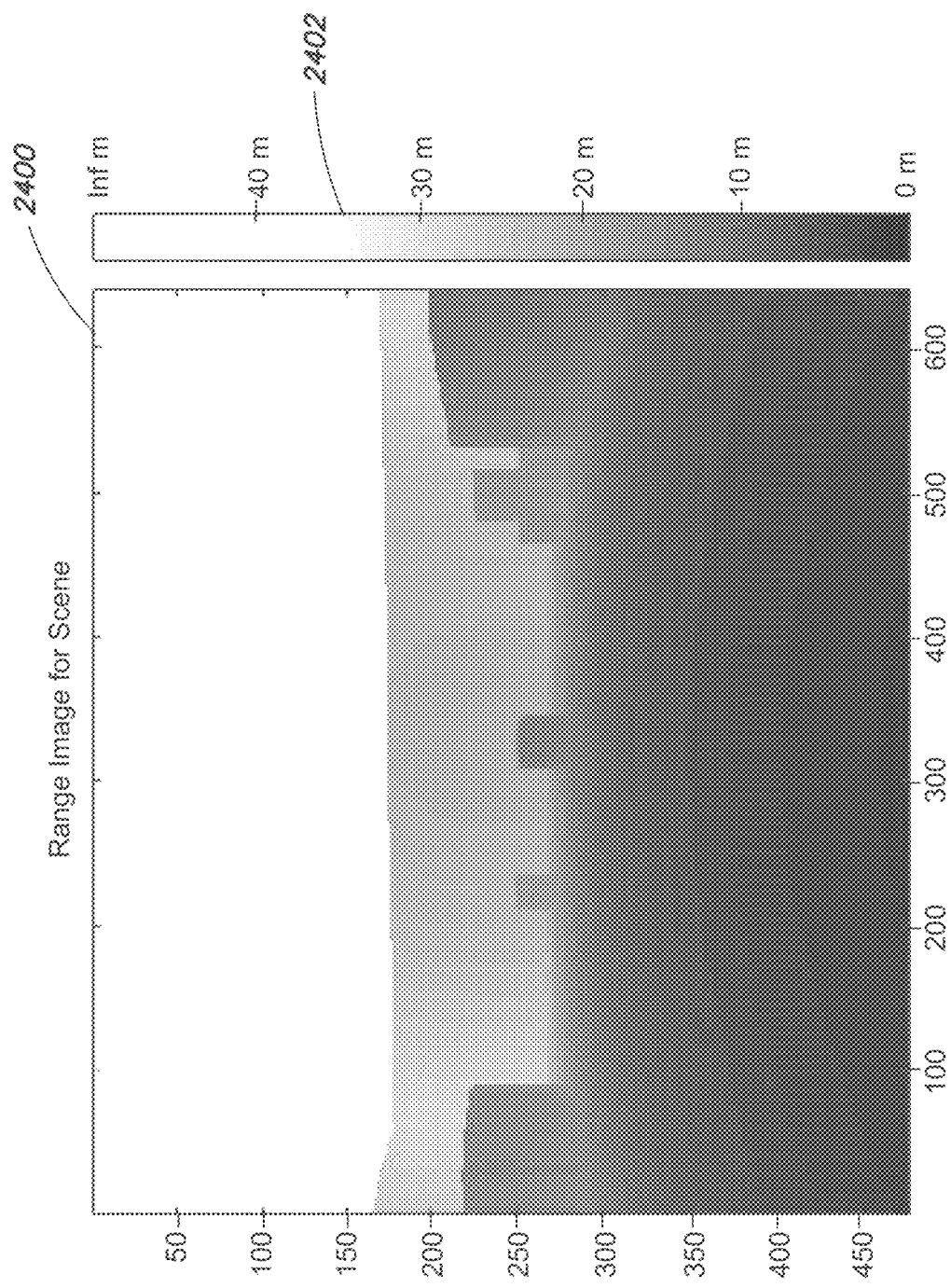
FIG. 24 is a schematic illustration of an example pixel grid in accordance with one or more embodiments.

FIG. 24 is a schematic illustration of a pixel grid 2400 with range information for the primitives of the 3D scene data 2200 of FIG. 22 in accordance with one or more embodiments. As described, range information may be computed for the pixels included in the pixel grid generated for the virtual lidar sensor 328. The range information may be computed from the x, y, z coordinates of the pixels. Computed range values for each pixel is illustrated in the example pixel grid 2400 in grayscale. A grayscale legend 2402 of range in meters (m) is also shown.

Figure 25:
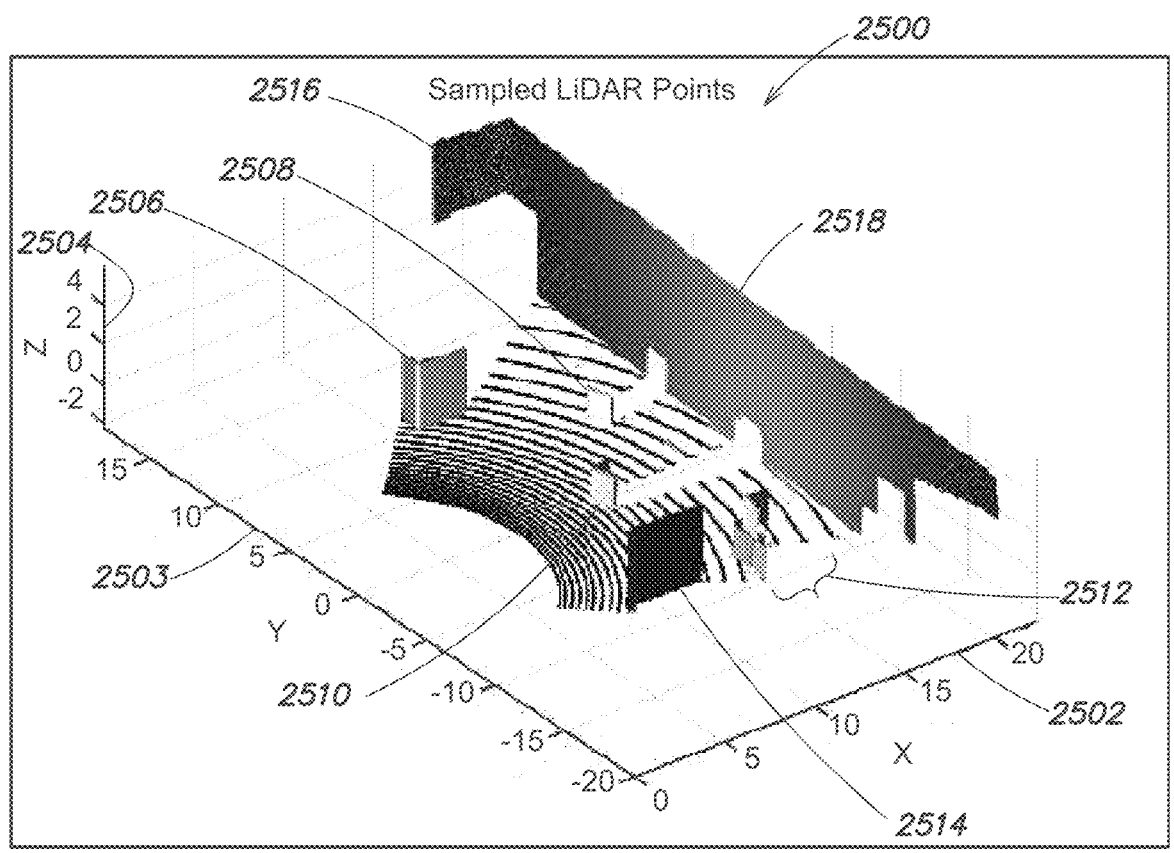
FIG. 25 is a schematic illustration of an example plot of synthetic lidar data in accordance with one or more embodiments.

FIG. 25 is a schematic illustration of point cloud data 2500 for the primitives of the 3D scene data 2200 of FIG. 22 in accordance with one or more embodiments. The point cloud data 2500 may include x, y, and z coordinates as indicated by x, y, and z axes 2502-2504, respectively. As illustrated, the synthetic point cloud data 2500 includes point data 2506 corresponding to the cube 2202, point data 2508 corresponding to the cube 2203, point data 2510 corresponding to the cube 2204, point data 2512 for the cubes 2205-2207, point data 2514 for the cube 2208, point data 2516 for the left side wall 2210, and point data 2518 for the back wall 2212.

As described, the vertex shader 338 may extract full 360° scene information from the 3D scene data 312 for use in generating synthetic lidar data. In other embodiments, synthetic lidar data may be constructed by stitching together information from views that are less than 360°. For example, in some implementations, the Actor used to implement a virtual lidar sensor may include three Unreal Engine Scene Capture 2D Camera Actors each configured with a 120° horizontal field of view, and arranged to cover the full 360° about the virtual lidar sensor. Data from each Scene Capture 2D Camera may be run through the graphics pipeline 334 as described producing three sets of reflectivity coefficients and range information, e.g., pixel grids. The compute shader 342 may be further configured to concatenate these three sets of data to produce a full 360° field of view for the virtual lidar sensor 328.

The synthetic lidar data may represent instantaneous data for the full 360° view. However, a physical, e.g., real-world, LIDAR sensor may rotate about a vertical axis, and thus may not capture a full 360° view of the real-world environment instantaneously. In some embodiments, the virtual lidar sensor 328 may be configured to model such a rotating LIDAR sensor. For example, a user may specify a rotational frequency of the virtual lidar sensor 328 as a parameter. The 3D game engine 324 may utilize the rotational frequency to configure a time, which may trigger the 3D game engine to periodically capture a smaller slice of synthetic lidar sensor data at that specified rate. These slices may then be combined to form full, e.g., 360°, synthetic lidar sensor data.

In some embodiments, synthetic lidar data 344 may be conditioned to replicate the format of data output by a particular, real-world lidar sensor. This may be performed by the compute shader 342. For example, it may be conditioned to have attributes, e.g., data dimensions, data type, start delimiter, end delimiter, etc., of the real-world lidar sensor being modeled, and may be stored in a data structure having the format of the data structures utilized by the real-world sensor. Furthermore, range information may be quantized to match the range resolution of the real-world lidar sensor being modeled, and default values may be assigned to data points that are outside of the real-world lidar sensor's technical specifications.

In some embodiments, the synthetic sensor data generator 304 may be configured to construct a binary log, and to store the synthetic lidar data in the binary log. The log may be transferred to a data processing device running code implementing an autonomous vehicle control procedure, and be read out by that code.

In other embodiments, a graphical programming language, e.g., as opposed to High-Level Shading Language (HLSL), may be used to define functionality for computing pixel reflectivity values for the radar, lidar, and/or sonar sensors.

Figure 33:
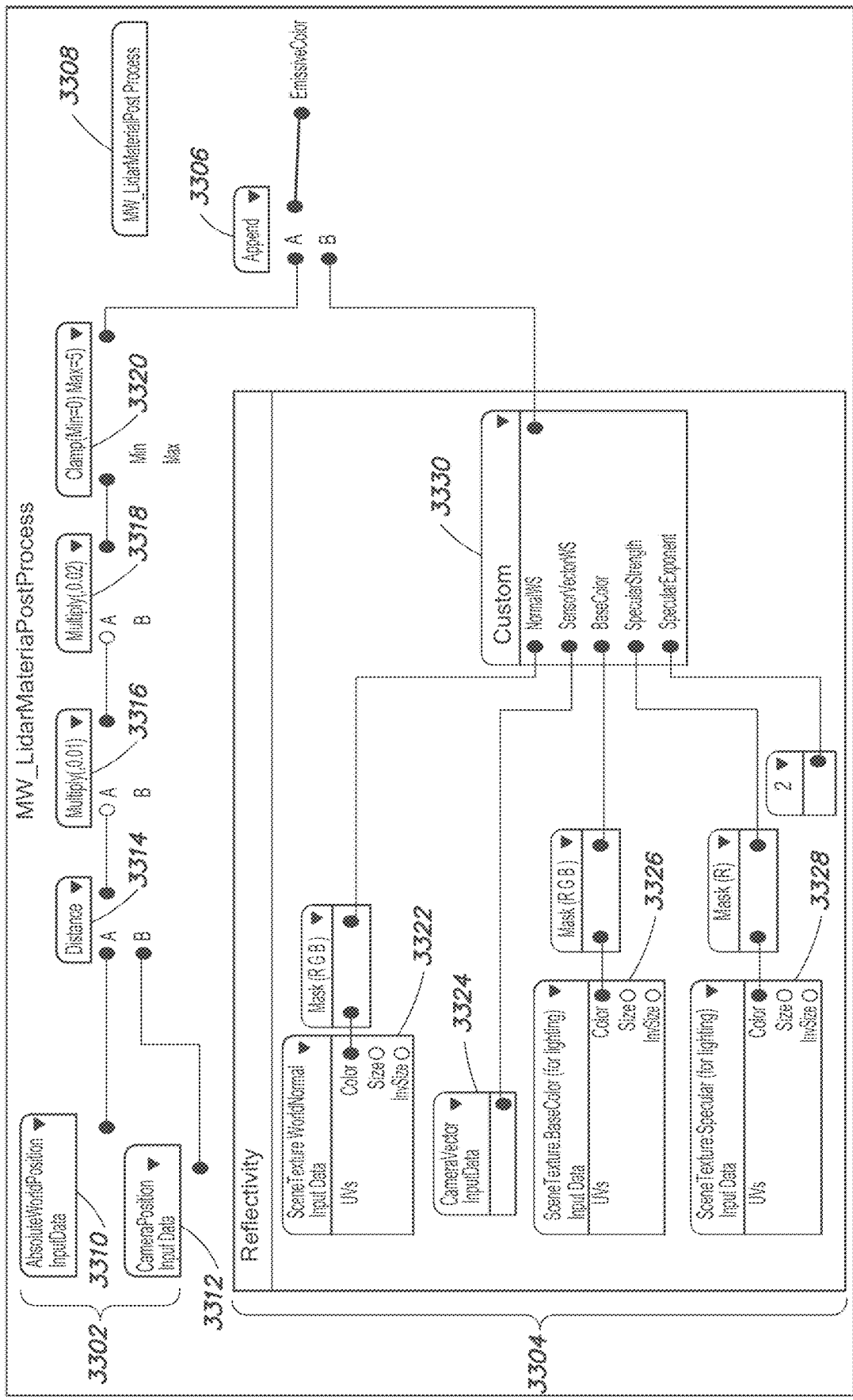
FIG. 33 is an illustration of an example graphical computer program in accordance with one or more embodiments.

FIG. 33 is an illustration of an example graphical computer program 3300 for computing diffuse and specular values for a pixel in accordance with one or more embodiments. A portion 3302 of the program 3300 may compute the range of the pixel, e.g., the distance from the sensor to the pixel, which may correspond to an object determined to be within the sensor's field of view. For example, an 'Absolute World Position' block 3310 may provide the position of a current pixel in the scene data in the Vehicle (or Camera) coordinate frame. A 'Camera Position' block 3312 may provide the position of the sensor, e.g., a lidar sensor, in the scene data in the Vehicle (or Camera) coordinate frame. A 'Distance' block 3314 may compute the range of the pixel. In some embodiments, multiply blocks 3316 and 3318 may be included, e.g., to convert or scale the computed range, e.g., from centimeters to meters. A 'Clamp(Min=0)(Max=5)' block 3320 may restrict the output values to between 0 (min) and 5 (max).

Another portion 3304 of the program 3300 may compute diffuse and specular reflectivity values for the pixel in the sensor's electromagnetic spectrum. For example, a 'SceneTexture:WorldNormal' block 3322 may provide information about the surface normal vector for the position of the current pixel in the scene data in the global coordinate frame of the Unreal Engine. A 'CameraVector' block 3324 may provide the direction unit vector that indicates how the sensor is pointed in the scene. This vector may be in the global coordinate frame. A 'BaseColor' block 3326 and a 'Specular' block 3328 may provide the diffuse and specular reflectivity coefficients for the position of the current pixel. In some implementations, these coefficients may be obtained from one or more lookup tables. A 'Custom' block 3330, may implement a reflectivity equation, such as the Phong illumination model, to compute a final reflectivity value for the current pixel.

An 'Append' block 3306 may append, e.g., concatenate, the current pixel's range, diffuse reflectivity, and specular reflectivity values, e.g., into two channels of the rendered image. A block 3308 named 'MW_LidarMaterialPostProcess' may send the rendered image to a rendering buffer on the GPU 356. The compute shader 342 may then perform post processing on the rendered image in the buffer, and send the post processed image to the CPU 354, e.g., for processing within a technical computing environment, such as the MATLAB® environment.

The graphical program 3300 may be created using the Unreal Engine game engine.

FIGS. 34A-C are partial views of an illustration of example computer code 3400 defining functionality performed by the compute shader 342 in accordance with one or more embodiments. Inputs to the code 3400 may be the buffered rendered image generated by the graphical program 3300 (FIG. 33). The output of the code 3400 may be lidar sensor output, e.g., as illustrated at FIG. 25. The code 3400 may instruct how each GPU thread should process the input image to produce the output value. A main task may be to interpolate the range and reflectivity image at the desired sampling locations for the lidar sensor. Sampling locations may be pre-calculated based on the pattern of the lidar beams of the lidar sensor, and may fall in-between two pixels. The code 3400 may interpolate the values in the input image in order to compute the lidar output value at the sub-pixel level at the exact sampling location, as contained in the InterpolatedTex variable. The interpolated values for range and reflectivity may also be quantized to integers and combined into a single unsigned 32-bit integer (uint32) value in order to produce the output of the compute shader program, as indicated at the final line of the code 3400. The quantization and combining the data to a single word may reduce the number of bytes of data that needs to be transmitted to CPU 354, e.g., for processing in the MATLAB® (or other) environment.

The entity that invokes this compute shader GPU program 3400 may wait for it to complete, and then copy over the output to shared memory where it may be accessed, e.g., by the MATLAB® (or other) environment.

Example Graphical Model

Figure 35A:
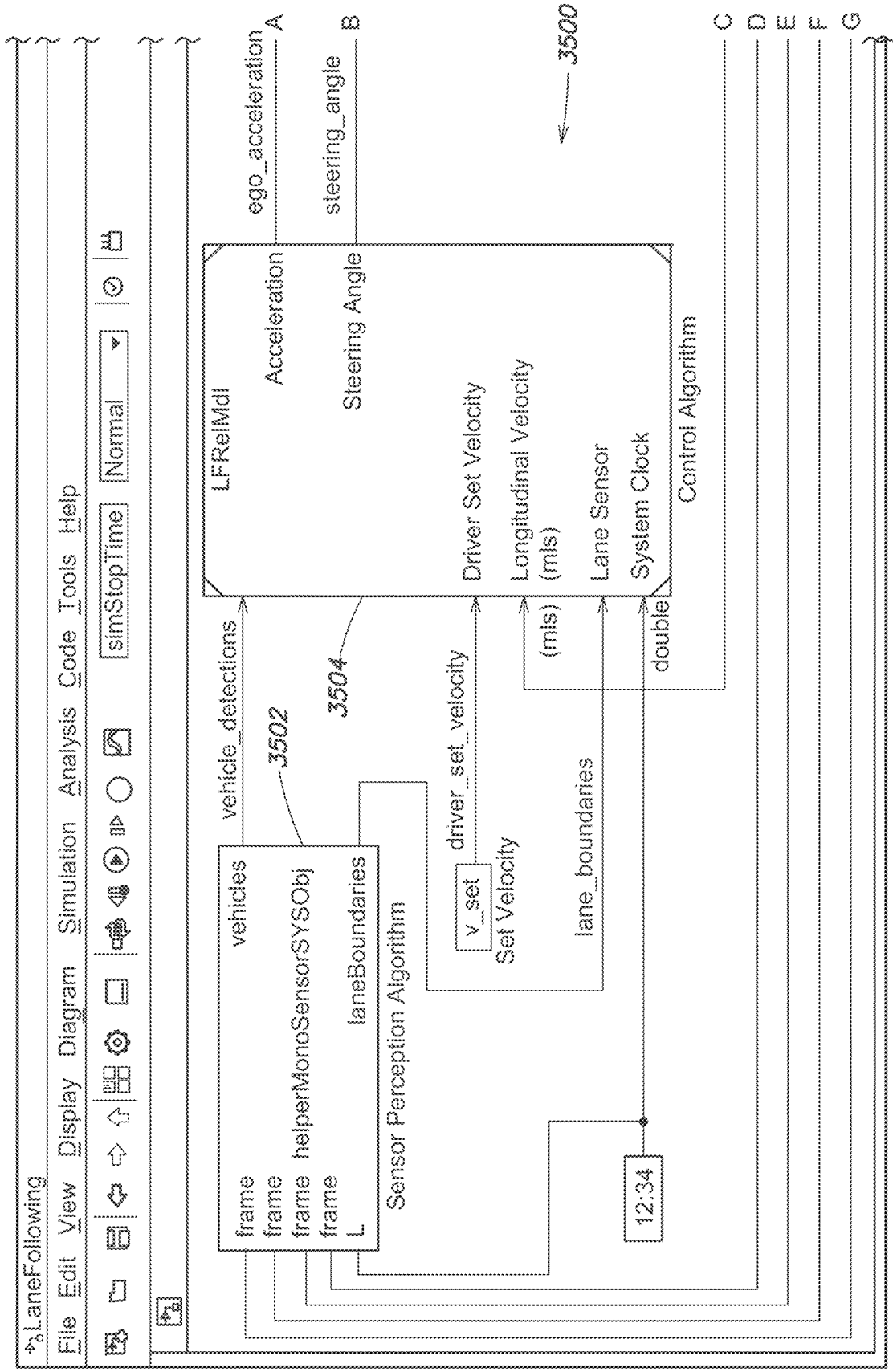
FIGS. 35A-B are partial views of an illustration of an example executable graphical model in accordance with one or more embodiments.
Figure 35B:
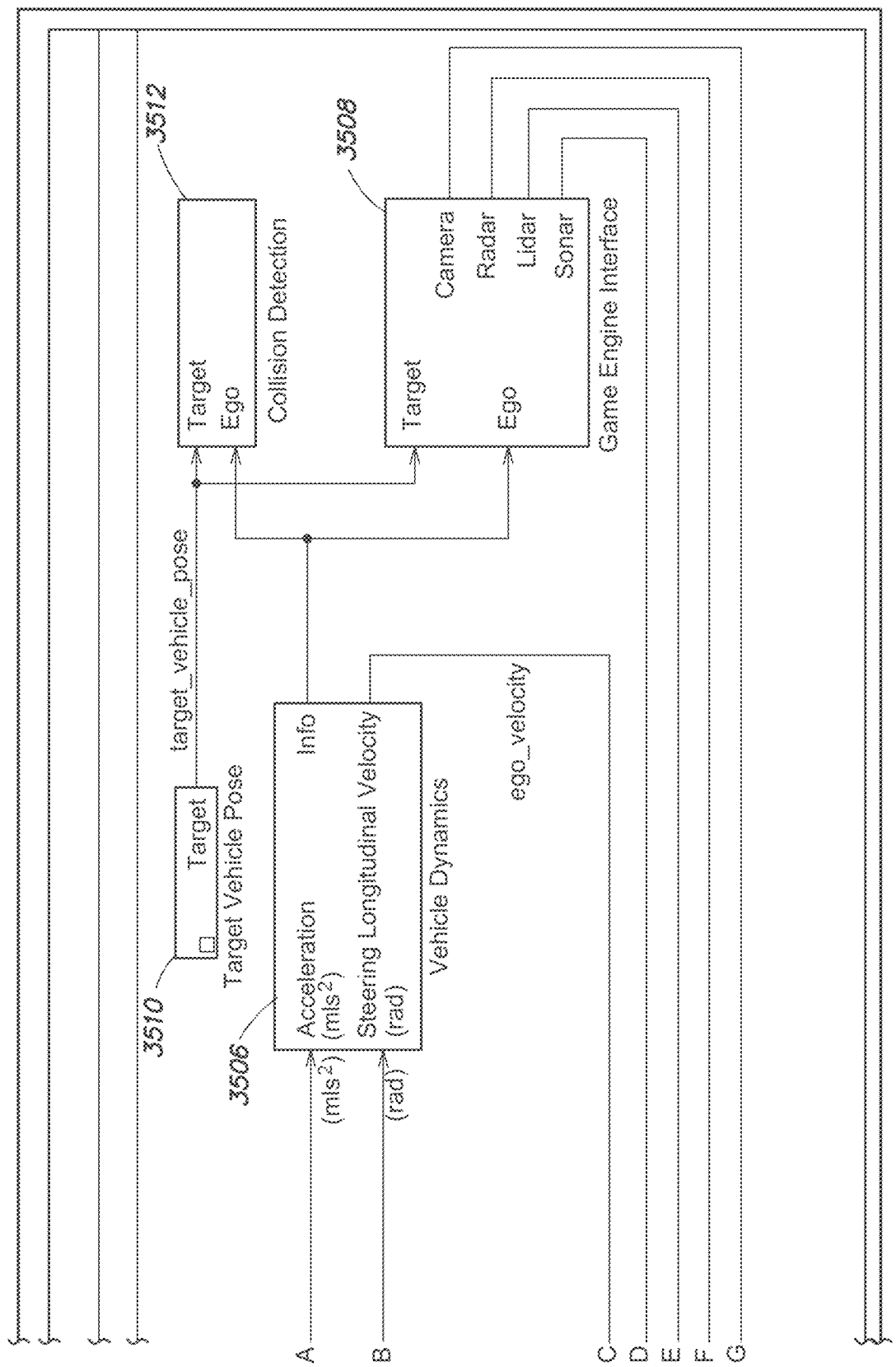

FIGS. 35A-B are partial views of an illustration of an example executable graphical model 3500 that may utilize the data computed for the virtual radar, lidar, and/or sonar sensors 326-330 in accordance with one or more embodiments. The model 3500 may include a plurality of interconnected blocks, and may perform lane following functionality for an ego vehicle based on data from vehicle mounted sensors, such as vision, radar, lidar, and sonar sensors. For example, the model 3500 may include a subsystem named 'Sensor Perception Algorithm', a model reference block 3504 named 'Control Algorithm', a subsystem 3506 named 'Vehicle Dynamics', and a subsystem 3508 named 'Game Engine Interface'. The model 3500 also may include a subsystem 3510 named 'Target Vehicle Pose' and a subsystem 3512 named 'Collision Detection'.

The model 3500 may be executed by the modeling environment 306, which may be running on the CPU 354. The Vehicle Dynamics subsystem 3506 may receive input commands, such as an acceleration command and a steering command, and may compute information indicating the movement of the ego vehicle. This information may be provided to the Game Engine Interface subsystem 3508. The Game Engine Interface subsystem 3508 may interface to the 3D synthetic sensor data generator 304 and/or the 3D game engine 324, which may be running on the GPU 356. Radar, lidar, and/or sonar sensor data may be generated from the 3D scene data 312, which may include the information computed for the ego vehicle by the Vehicle Dynamics subsystem 3506, by the 3D synthetic sensor data generator 304 and/or the 3D game engine 324, as described. The generated synthetic sensor data may be in the form of image frames. The Game Engine Interface subsystem 3508 may provide this data, e.g., the frames, to the Sensor Perception Algorithm subsystem 3502. The Sensor Perception Algorithm subsystem 3502 may process the frames, and detect vehicles and lane boundaries. Information regarding the detected vehicles and lane boundaries may be provided to the Control Algorithm block 3504. The Control Algorithm block 3504 may compute commands for the ego vehicle, e.g., to keep the ego vehicle in its travel lane and to avoid collisions with other vehicles. These commands may be provided to the Vehicle Dynamics subsystem 3506. The Target Vehicle subsystem 3510 may compute pose information for a target vehicle, which may also be provided to the Game Engine Interface subsystem 3508 and incorporated into the 3D scene data 312 from which the synthetic radar, lidar, and/or sonar data is generated. The Collision Detection subsystem 3512 may detect whether the ego vehicle will collide with the target vehicle, e.g., and issue a warning.

It should be understood that the executable graphical model 3500 is for illustrative purposes, and that the present disclosure may be used with other models and/or in other environments.

In some embodiments, one or more parameters of the virtual radar, lidar, or sonar sensors 326, 328, 330 may be tunable.

Imperfections with physical radar, lidar, and/or sonar sensors may be modeled in the present disclosure by changing one or more parameters or properties of the virtual sensors 326, 328, 330. For example, the user may manipulate one or more of the radar/sonar/lidar parameters described in connection with FIGS. 4, 20, and 21, such as mounting location, orientation, field of view, etc. For the radar and sonar virtual sensors 326 and 330, the antenna array properties may be manipulated to model effects, such as Tx/Rx location, burnt-out Tx/Rx elements, phased shift quaternization, etc., and these effects will be captured in the beam pattern used by the sensor. Alternatively or additionally, noise may be added to the synthetic data 343-345 generated for the virtual sensors 326, 328, 330. For example, one or more model elements configured to introduce noise to a signal may be applied to the synthetic data 343-345. An exemplary, non-exclusive list of model elements for introducing noise includes the Gaussian Noise Generator block, the Add White Gaussian Noise (AWGN) Channel block, the Band-Limited White Noise block, and the Time Varying Gain block of the Simulink modeling environment. In addition, as noise for radar, sonar, and lidar signals may be a function of range, a MATLAB Function block that uses the range as an input and a noise function, such as the MATLAB randn function, may also be used.

Exemplary Data Processing Device

Figure 26:
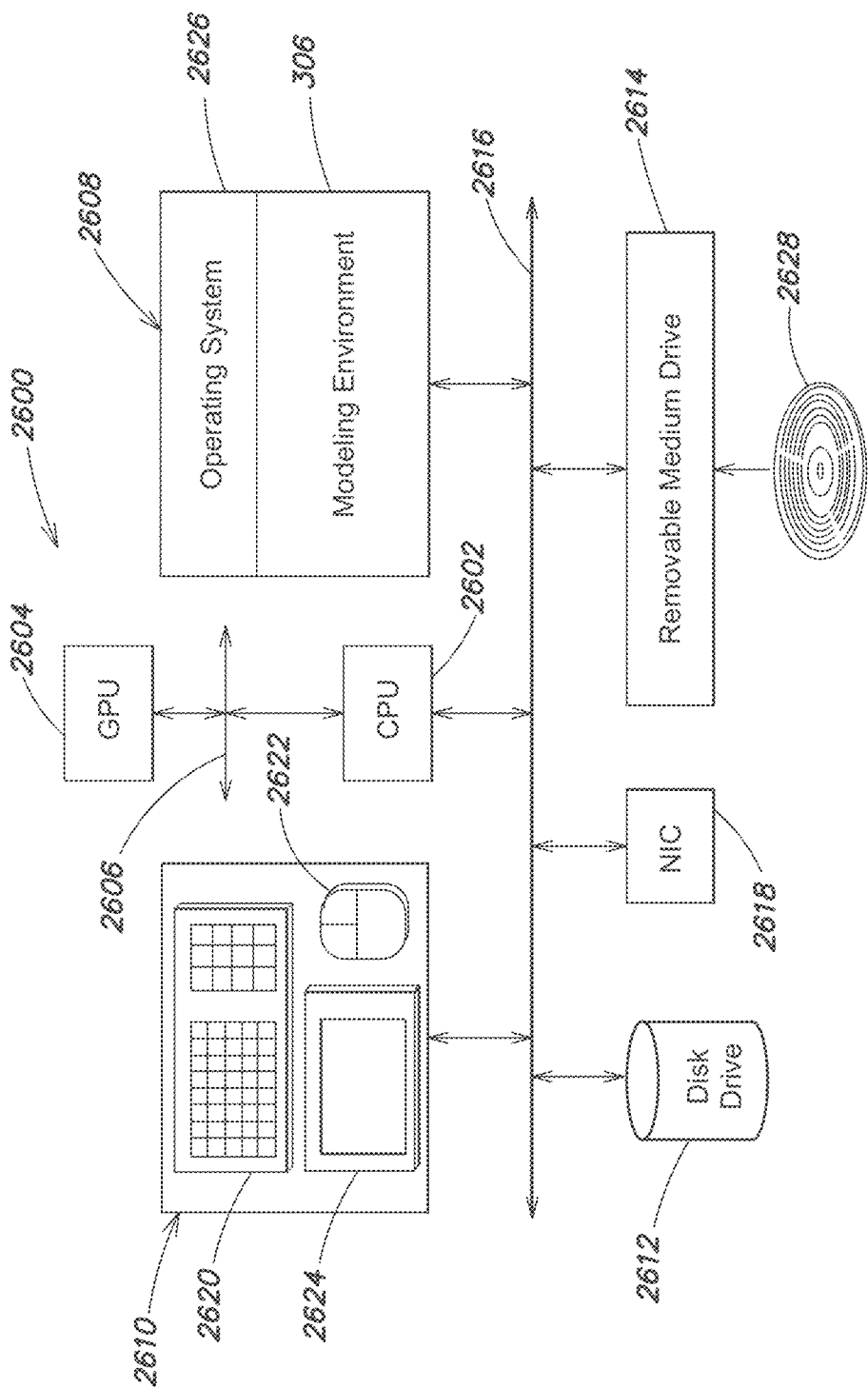
FIG. 26 is a schematic illustration of an example data processing system for implementing one or more embodiments of the present disclosure in accordance with one or more embodiments.

FIG. 26 is a schematic illustration of an example computer or data processing system 2600 for implementing one or more embodiments of the disclosure. The data processing system 2600 may include one or more processing elements, such as a Central Processing Unit (CPU) 2602 and a Graphics Processing Unit (GPU) 2604, which may be coupled via a bus 2606. The data processing system 2600 may also include a main memory 2608, user input/output (I/O) 2610, a persistent data storage unit, such as a disk drive 2612, and a removable medium drive 2614 that are interconnected by a system bus 2616. The data processing system 2600 may also include a communication unit, such as a network interface card (NIC) 2618. The user I/O 2610 may include a keyboard 2620, a pointing device, such as a mouse 2622, and a display 2624. Other user I/O 2610 components include voice or speech command systems, touchpads and touchscreens, printers, projectors, etc. Other exemplary processors include Field Programmable Gate Arrays (FPGAs), Application Specific Integrated Circuits (ASICs), microprocessors, microcontrollers, etc.

The main memory 2608, which may be a Random Access Memory (RAM), may store a plurality of program libraries or modules, such as an operating system 2626, and one or more application programs that interface to the operating system 2622, such as the modeling environment 306. The 3D scene generator 302, the synthetic sensor data generator 304, and/or the code generator 308 also may be loaded in main memory 2608 and run.

The removable medium drive 2614 may accept and read a computer readable medium 2628, such as a CD, DVD, floppy disk, solid state drive, tape, flash memory or other non-transitory medium. The removable medium drive 2614 may also write to the computer readable medium 2628.

Suitable computer systems include personal computers (PCs), workstations, servers, laptops, tablets, palm computers, smart phones, electronic readers, and other portable computing devices, etc. Nonetheless, those skilled in the art will understand that the computer system 2600 of FIG. 26 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the modeling environment 2600 may be hosted on one or more cloud servers or devices, and accessed by remote clients through a web portal or an application hosting system.

Suitable operating systems 2626 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2622 may provide services or functions for applications or modules, such as allocating memory, organizing data objects or files according to a file system, prioritizing requests, managing I/O, etc. The operating system 2626 may run on a virtual machine, which may be provided by the data processing system 2600.

As indicated above, a user, such as an engineer, scientist, programmer, developer, etc., may utilize one or more input devices, such as the keyboard 2620, the mouse 2622, and the display 2624 to operate the modeling environment 306, the 3D scene generator 302, the synthetic sensor data generator 304, and/or the code generator 308.

Exemplary Distributed Environment

Figure 27:
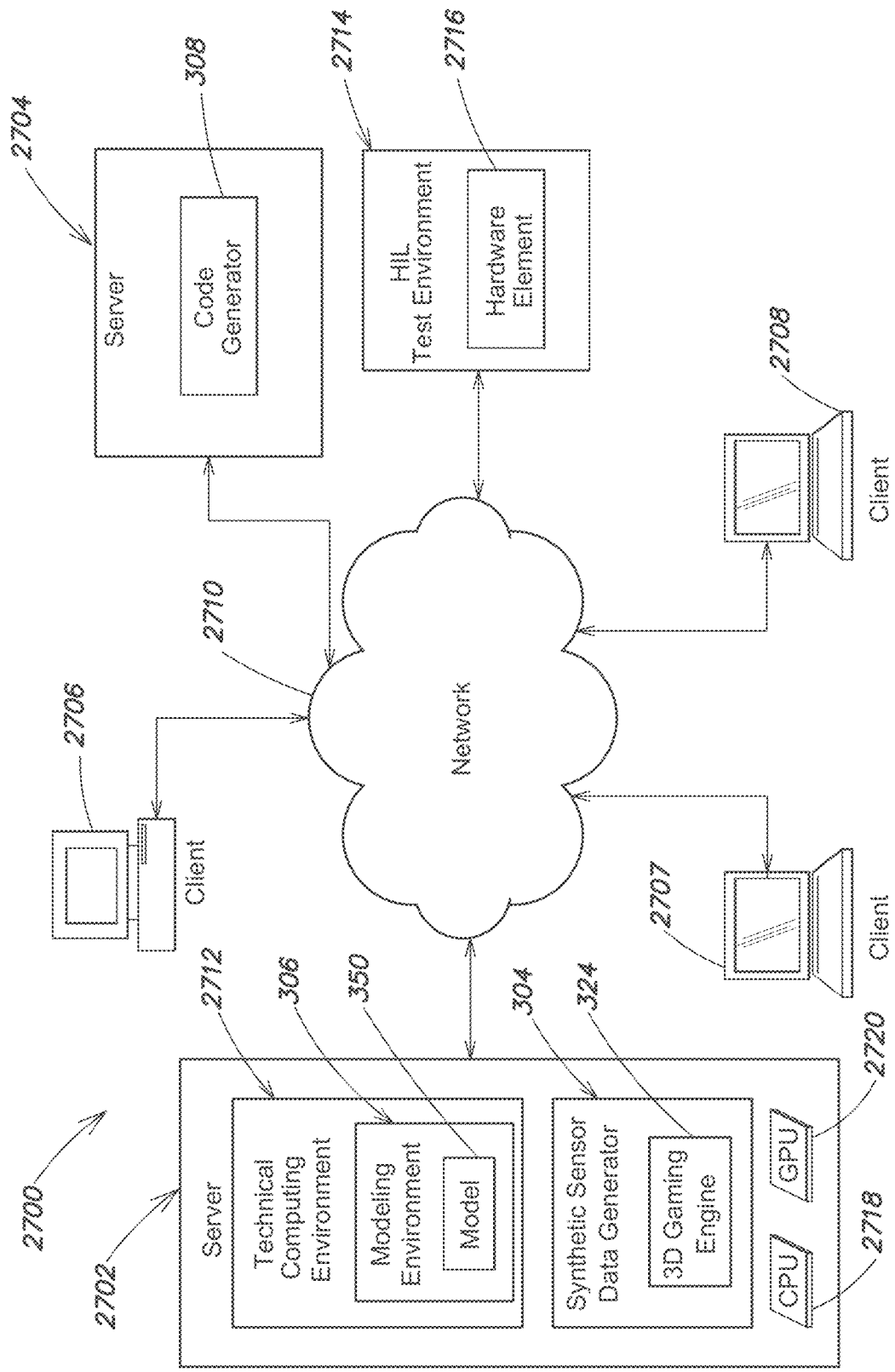
FIG. 27 is a schematic diagram of an example distributed computing environment in accordance with one or more embodiments.

FIG. 27 is a schematic diagram of an example distributed computing environment 2700 in which systems and/or methods of the present disclosure may be implemented in accordance with one or more embodiments. The environment 2700 may include client and server devices, such as two servers 2702 and 2704, and three clients 2706-2708, interconnected by one or more networks, such as network 2710. The servers 2702 and 2704 may include applications or processes accessible by the clients 2706-2708. For example, the server 2702 may run a technical computing environment 2712 and the synthetic sensor data generator 304, which includes the 3D game engine 324. The technical computing environment 2712 may run the modeling environment 306, which may run the model 350. The server 2704 may run the code generator 308 and/or some other application. The devices of the environment 2700 may interconnect via wired connections, wireless connections, or a combination of wired and wireless connections.

In some embodiments, the distributed environment 2700 may include a Hardware-in-the-Loop (HIL) test environment 2714, which may include one or more hardware elements indicated at 2716. A hardware synthesis tool chain may synthesize, e.g., fabricate, the hardware element 2716 utilizing the code 352 generated for the model 350 of the autonomous vehicle control system. For example, the HIL test environment 2714 may be an FPGA-in-the-loop (FIL) test environment in which case the one or more hardware elements 2716 may be Field Programmable Gate Arrays (FPGAs).

The servers 2702 and 2704 may include one or more devices capable of receiving, generating, storing, processing, executing, and/or providing information. For example, the servers 2702 and 2704 may include a computing device, such as a server, a desktop computer, a laptop computer, a tablet computer, a handheld computer, or a similar device. The server 2702 may include a CPU 2718 and a GPU 2720.

The clients 2706-2708 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2706-2708 may download data and/or code from the servers 2702 and 2704 via the network 2710. In some implementations, the clients 2706-2708 may be desktop computers, workstations, laptop computers, tablet computers, handheld computers, mobile phones (e.g., smart phones, radiotelephones, etc.), electronic readers, or similar devices. In some implementations, the clients 2706-2708 may receive information from and/or transmit information to the servers 2702 and 2704.

The network 2710 may include one or more wired and/or wireless networks. For example, the network 2710 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 27 is provided as an example. In practice, there may be additional devices and/or networks, fewer devices and/or networks, different devices and/or networks, or differently arranged devices and/or networks than those shown in FIG. 27. Furthermore, two or more devices shown in FIG. 27 may be implemented within a single device, or a single device shown in FIG. 27 may be implemented as multiple, distributed devices. Additionally, one or more of the devices of the distributed computing environment 2700 may perform one or more functions described as being performed by another one or more devices of the environment 2700.

Exemplary 3D game engines 324 that may be used with the present disclosure include the Unreal Engine game engine from Epic Games, Inc., and the Unity game engine from Unity Technologies ApS of Copenhagen, Denmark, among others. In addition to a 3D game engine, it should be understood that other computer-based 3D virtualization environments for creating 3D virtual environments may be used. For example, in other embodiments, a simulation/ visualization environment may be utilized, such as the Gazebo Robot simulation environment from the Open Source Robotics Foundation (OSRF) and the CarSim mechanical simulation tool from Mechanical Simulation Corp. of Ann Arbor, Mich.

Exemplary modeling environments 306 that may be used with the present disclosure include the MATLAB® technical computing environment (TCE) and the Simulink® model-based design environment both from The MathWorks, Inc. of Natick, Mass., as well as the Simscape™ physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, Tex., the Visual Engineering Environment (VEE) product from Keysight Technologies Inc. of Santa Rosa, Calif., the System Studio model-based signal processing algorithm design and analysis tool and the SPW signal processing algorithm tool from Synopsys, Inc. of Mountain View, Calif., a Unified Modeling Language (UML) environment, a Systems Modeling Language (SysML) environment, the System Generator system from Xilinx, Inc. of San Jose, Calif., and the Rational Rhapsody Design Manager software from IBM Corp. of Somers, N.Y. Models created in the high-level modeling environment may contain less implementation detail, and thus operate at a higher level than certain programming languages, such as the C, C++, C#, and SystemC programming languages. A high-level modeling environment may support modeling constructs, such as sample time, which may be absent in programming languages.

A model, such as the model 350, may simulate, e.g., approximate the operation of, a system. Exemplary systems include physical systems, such as plants and controllers. A model may be executed in order to simulate the system being modeled, and the execution of a model may also be referred to as simulating the model. Models constructed within the modeling environment 306 may include textual models, graphical models, such as block diagrams, state-based models, discrete-event models, physical models, and combinations thereof. A graphical model may include icons or blocks that represent computations, functions or operations, and interconnecting lines or arrows among the blocks may represent data, signals, or relationships among those computations, functions, or operations. The icons or blocks, moreover, may be selected by the user from one or more of the libraries or palettes that contain icons or blocks for the blocks supported by the modeling environment 306. A model editor GUI may include a Run button that may be selected by the user. The modeling environment 306 may also be configured to receive a run command entered by the user, e.g., in the GUI or in a Command Line Interface (CLI). In response to the user selecting the Run button or entering the run command, a simulation engine may execute the model, and may present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program 312 include Modelica models from the Modelica Association, Unified Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 306 may implement a declarative language. A declarative language is a language that expresses the logic of a computation without describing its control flow. A declarative language may describe what a program must accomplish in terms of the problem domain, rather than describe how to accomplish it as a sequence of the programming language primitives. In some cases, a declarative language may implement single assignment in which variables are assigned a value once and only once. For example, the Simulink® model-based design environment, which is a time-based language, supports declarative modeling and also has imperative features. Behaviors of at least some of the model elements and connection elements of a model may include computational implementations that are implicitly defined by a declarative language.

Exemplary code generators for use with the present disclosure include the MATLAB Coder, Simulink Coder, the Embedded Coder, and the Simulink HDL Coder products from The MathWorks, Inc. of Natick, Mass., and the TargetLink product from dSpace GmbH of Paderborn Germany. Suitable target language compilers include the xPC Target™ tool from The MathWorks, Inc., and a C language compiler. However, other code generation systems and other compilers may be used.

One or more of the 3D scene generator 302, the synthetic sensor data generator 304, the modeling environment 306 and/or the code generator 308 may be implemented through one or more software modules or libraries containing program instructions that perform the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, one or more of the 3D scene generator 302, the synthetic sensor data generator 304, the modeling environment 306 and/or the code generator 308 may comprise hardware registers and combinational logic configured and arranged to produce sequential logic circuits. In some embodiments, various combinations of software and hardware, including firmware, may be utilized to implement the described methods.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel.

Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, one or more of the virtual radar sensor, the virtual sonar sensor, or the virtual lidar sensor may be defined outside of the game engine and imported into the game engine. Therefore, it is the object of the appended claims to cover all such variations and modifications as come within the true spirit and scope of the disclosure.

In view of the above this application discloses the following items:

Item 1. A computer-implemented method comprising:
defining a virtual radar, lidar, and/or sonar sensor within a three dimensional (3D) simulation/visualization environment, such as a game engine, the virtual radar, lidar, and/or sonar sensor including parameters;
configuring the virtual radar, lidar, and/or sonar sensor by setting values for the parameters;
receiving 3D scene data at the 3D simulation/visualization environment, e.g., game engine, the 3D scene data including objects having vertices, normals, and attributes;
for a plurality of the objects of the 3D scene data, computing, by the 3D simulation/visualization environment, e.g., game engine, reflectivity information in a frequency range or a wavelength range for the virtual radar, lidar, and/or sonar sensor, based on the vertices, normals, and attributes of the plurality of objects and a plurality of the values for the parameters;
for the virtual radar, lidar, and/or sonar sensor, computing, by the 3D simulation/visualization environment, e.g., game engine, radar range and radar amplitude, a point cloud of lidar range and lidar reflectance, and/or sonar range and sonar reflectance, based on the reflectivity information;
transmitting the radar range and the radar amplitude, the point cloud of lidar range and lidar reflectance, and/or the sonar range and the sonar reflectance from the 3D simulation/visualization environment, e.g., game engine, to a modeling environment that includes a simulation model of a controller; and
processing the radar range and the radar amplitude, the point cloud of lidar range and lidar reflectance, and/or the sonar range and the sonar reflectance by the simulation model of the controller to produce commands.

Item 2. The computer-implemented method of item 1 wherein the virtual radar, lidar, and/or sonar sensor is mounted to a virtual ego vehicle moveable relative to the 3D scene data, the method further comprising:
receiving, at the 3D simulation/visualization environment, e.g., game engine, data moving the virtual ego vehicle relative to the 3D scene data, wherein the computing the reflectivity, the computing the radar range and radar amplitude, the point cloud of lidar range and reflectance, and/or the sonar range and sonar reflectance, the transmitting, and the processing are repeated in response to receiving the data moving the virtual ego vehicle.

Item 3. The computer-implemented method of one or more of items 1 to 2 further comprising:
generating throttle, braking, and steering information for the virtual ego vehicle at the modeling environment, wherein the throttle, braking, and steering information represents the data moving the virtual ego vehicle.

Item 4. The computer-implemented method of one or more of the previous items, wherein the 3D simulation/visualization environment, e.g., game engine, includes a vertex shader, a pixel shader, and a compute shader one or more of which may be running on one or more Graphics Processing Units (GPUs).

Item 5. The computer-implemented method of one or more of the previous items, wherein the modeling environment runs on one or more Central Processing Units (CPUs) that communicate with the one or more GPUs.

Item 6. The computer-implemented method of one or more of the previous items, wherein the parameters include a field of view (FOV) of the virtual radar, lidar, and/or sonar sensor, the plurality of the objects are within the FOV, and the computing reflectivity information for the virtual radar, lidar, and/or sonar sensor includes:
pre-distorting, by the 3D game engine, the vertices of the plurality of the objects based on a spherical projection.

Item 7. The computer-implemented method of one or more of the previous items, wherein the attributes of the plurality of the objects include material type, and the computing reflectivity information includes determining reflectivity coefficients as a function of the material types of the plurality of the objects.

Item 8. The computer-implemented method of one or more of the previous items, wherein the reflectivity coefficients are determined from one or more lookup tables and/or from texture maps associated with the plurality of the objects.

Item 9. The computer-implemented method of one or more of the previous items, wherein the computing the radar range and the radar amplitude, the point cloud of lidar range and lidar reflectance, and/or the sonar range and the sonar reflectance includes calculating range for the plurality of the objects from information included in the 3D scene data.

Item 10. The computer-implemented method of one or more of the previous items, wherein the reflectivity information is computed using an illumination model that considers diffuse and specular lighting, but not ambient lighting.

Item 11. The computer-implemented method of one or more of the previous items, wherein the reflectivity information for the virtual radar and/or sonar sensor is a function of a beam pattern determined for the virtual radar and/or sonar sensor.

Item 12. The computer-implemented method of one or more of the previous items, wherein the beam pattern is based on transmit (Tx) and/or receive (Rx) array parameters for the virtual radar and/or sonar sensor.

Item 13. The computer-implemented method of one or more of the previous items, wherein the virtual radar, lidar, and/or sonar sensor is associated with a given object of the 3D scene data, and the given object is a vehicle.

Item 14. The computer-implemented method of one or more of the previous items, wherein at least some of the objects of the 3D scene data move relative to each other over a scene time, and the steps of computing the reflectivity information and computing the radar range and the radar amplitude, the point cloud of lidar range and lidar reflectance, and/or the sonar range and the sonar reflectance are performed at a plurality of measurement times or sample times of the scene time.

Item 15. The computer-implemented method of one or more of the previous items, wherein the movement of the at least some of the objects of the 3D scene data have their movement determined by the modeling environment, for example using models of the physics of the objects, controllers of the objects, modeled human interaction with the objects, etc.

Item 16. The computer-implemented method of one or more of the previous items, wherein the steps of computing the reflectivity information and computing the radar range and the radar amplitude, the point cloud of lidar range and lidar reflectance, and/or the sonar range and the sonar reflectance are performed without determining radar cross sections (RCSs) for the objects of the scene data and without ray tracing.

Item 17. One or more non-transitory computer-readable media comprising program instructions for execution by one or more processors, the program instructions instructing the one or more processors to:

define a virtual radar, lidar, and/or sonar sensor within a three dimensional (3D) simulation/visualization environment, e.g., game engine, the virtual radar, lidar, and/or sonar sensor including parameters;

configure the virtual radar, lidar, and/or sonar sensor by setting values for the parameters;

receive 3D scene data at the 3D simulation/visualization environment, e.g., game engine, the 3D scene data including objects having vertices, normals, and attributes;

for a plurality of the objects of the 3D scene data, compute, by the 3D simulation/visualization environment, e.g., game engine, reflectivity information in a frequency range or a wavelength range for the virtual radar, lidar, and/or sonar sensor, based on the vertices, normals, and attributes of the plurality of objects and a plurality of the values for the parameters;

for the virtual radar, lidar, and/or sonar sensor, compute, by the 3D simulation/visualization environment, e.g., game engine, radar range and radar amplitude, a point cloud of lidar range and lidar reflectance, and/or sonar range and sonar reflectance, based on the reflectivity information;

transmit the radar range and the radar amplitude, the point cloud of lidar range and lidar reflectance, and/or the sonar range and the sonar reflectance from the 3D simulation/visualization environment, e.g., game engine, to a modeling environment that includes a simulation model of a controller; and process the radar range and the radar amplitude, the point cloud of lidar range and lidar reflectance, and/or the sonar range and the sonar reflectance by the simulation model of the controller to produce commands.

Item 18. The one or more computer-readable media of one or more of the previous items, wherein the attributes of the plurality of the objects include material type, and the computing reflectivity information includes determining reflectivity coefficients as a function of the material types of the plurality of the objects.

Item 19. The one or more computer-readable media of one or more of the previous items, wherein the reflectivity coefficients are determined from one or more lookup tables or from texture maps associated with the plurality of the objects.

Item 20. The one or more computer-readable media of one or more of the previous items, wherein the computing the radar range and the radar amplitude, the point cloud of lidar range and lidar reflectance, and/or the sonar range and the sonar reflectance includes calculating range for the plurality of the objects from information included in the 3D scene data.

Item 21. The one or more computer-readable media of one or more of the previous items, wherein the parameters include a field of view (FOV) of the virtual radar, lidar, and/or sonar sensor, the program instructions further instruct the one or more processors to determine the plurality of the objects that are within the FOV, and the computing reflectivity information for the virtual radar, lidar, and/or sonar sensor includes:

pre-distorting, by the 3D game engine, the vertices of the plurality of the objects based on a spherical projection.

Item 22. The one or more computer-readable media of one or more of the previous items, wherein the reflectivity information is computed using an illumination model that considers diffuse and specular lighting, but not ambient lighting.

Item 22. The one or more computer-readable media of one or more of the previous items, wherein the program instructions instruct the one or more processors to carry out a method according to one or more of items 1 to 16.

What is claimed is:

1. A computer-implemented method comprising:

receiving 3D scene data at a computer-based three dimensional (3D) virtualization environment, the 3D scene data including objects having vertices, normals, and attributes;

for a plurality of the objects of the 3D scene data, computing, by the 3D virtualization environment, reflectivity information in a frequency range or a wavelength range for at least one of a virtual radar sensor, a virtual lidar sensor, or a virtual sonar sensor, based on the vertices, normals, and attributes of the plurality of objects and a plurality of values for parameters of the at least one the virtual radar sensor, the virtual lidar sensor, or the virtual sonar sensor;

for the at least one of the virtual radar sensor, the virtual lidar sensor, or the virtual sonar sensor, computing, by the 3D virtualization environment, at least one of radar range and radar amplitude, a point cloud of lidar range and lidar reflectance, or sonar range and sonar reflectance, based on the reflectivity information;

transmitting the at least one of the radar range and the radar amplitude, the point cloud of lidar range and lidar reflectance, or the sonar range and the sonar reflectance from the 3D virtualization environment to a modeling environment that includes a simulation model of a controller; and processing the at least one of the radar range and the radar amplitude, the point cloud of lidar range and lidar reflectance, and/or the sonar range and the sonar reflectance by the simulation model of the controller to produce commands.

2. The computer-implemented method of claim 1 wherein the at least one of the virtual radar sensor, the virtual lidar sensor, or the virtual sonar sensor is mounted to a virtual ego vehicle moveable relative to the 3D scene data, the method further comprising:

receiving, at the 3D virtualization environment, data moving the virtual ego vehicle relative to the 3D scene data, wherein the computing the reflectivity, the computing the radar range and radar amplitude, the point cloud of lidar range and lidar reflectance, or the sonar range and sonar reflectance, the transmitting, and the processing are repeated in response to receiving the data moving the virtual ego vehicle.

3. The computer-implemented method of claim 2 further comprising:

generating throttle, braking, and steering information for the virtual ego vehicle at the modeling environment, wherein the throttle, braking, and steering information represents the data moving the virtual ego vehicle.

4. The computer-implemented method of claim 1 wherein the 3D virtualization environment includes a vertex shader, a pixel shader, and a compute shader running on one or more Graphics Processing Units (GPUs).

5. The computer-implemented method of claim 4 wherein the modeling environment runs on one or more Central Processing Units (CPUs) that communicate with the one or more GPUs.

6. The computer-implemented method of claim 1 wherein the parameters include a field of view (FOV) of the at least one of the virtual radar sensor, the virtual lidar sensor, or the virtual sonar sensor, the plurality of the objects are within the FOV, and the computing reflectivity information for the at least one of the virtual radar sensor, the virtual lidar sensor, or the virtual sonar sensor includes:

pre-distorting, by the 3D virtualization environment, the vertices of the plurality of the objects based on a spherical projection.

7. The computer-implemented of claim 1 wherein the attributes of the plurality of the objects include material type, and the computing reflectivity information includes determining reflectivity coefficients as a function of the material types of the plurality of the objects.

8. The computer-implemented method of claim 7 wherein the reflectivity coefficients are determined from one or more lookup tables or from texture maps associated with the plurality of the objects.

9. The computer-implemented method of claim 1 wherein the computing the at least one of the radar range and the radar amplitude, the point cloud of lidar range and lidar reflectance, or the sonar range and the sonar reflectance includes calculating range for the plurality of the objects from information included in the 3D scene data.

10. The computer-implemented method of claim 1 wherein the reflectivity information is computed using an illumination model that considers diffuse and specular lighting, but not ambient lighting.

11. The computer-implemented method of claims 1 wherein the reflectivity information for the virtual radar or the virtual sonar sensor is a function of a beam pattern determined for the virtual radar or the virtual sonar sensor.

12. The computer-implemented method of claim 1 wherein the at least one of the virtual radar sensor, the virtual lidar sensor, or the virtual sonar sensor is associated with a given object of the 3D scene data, and the given object is a vehicle.

13. The computer-implemented method of claim 1 wherein at least some of the objects of the 3D scene data move relative to each other over a scene time, and the steps of computing the reflectivity information and computing the at least one of the radar range and the radar amplitude, the point cloud of lidar range and lidar reflectance, or the sonar range and the sonar reflectance are performed at a plurality of measurement times or sample times of the scene time.

14. The computer-implemented method of claim 1 wherein the steps of computing the reflectivity information and computing the at least one of the radar range and the radar amplitude, the point cloud of lidar range and lidar reflectance, or the sonar range and the sonar reflectance are performed without determining radar cross sections (RCSs) for the objects of the scene data and without ray tracing.

15. The computer-implemented method of claim 1 further comprising:

determining that a given object included in the 3D scene data is occluded by one or more of the plurality of objects, wherein the computing step does not compute the reflectivity information for the given object that is occluded by the one or more of the plurality of objects.

16. The computer-implemented method of claim 1 wherein the point cloud of lidar range and lidar reflectance computed for the virtual lidar sensor includes coverage areas that are less than 360°, the computer-implemented method further comprising:

stitching together the range and reflectance computed for the coverage areas.

17. The computer-implemented method of claim 1 wherein the 3D virtualization environment is a 3D game engine or a simulation/visualization environment.

18. One or more non-transitory computer-readable media comprising program instructions for execution by one or more processors, the program instructions instructing the one or more processors to:

receive 3D scene data at a computer-based three dimensional (3D) virtualization environment, the 3D scene data including objects having vertices, normals, and attributes;

for a plurality of the objects of the 3D scene data, compute, by the 3D virtualization environment, reflectivity information in a frequency range or a wavelength range for at least one of a virtual radar sensor, a virtual lidar sensor, or a virtual sonar sensor, based on the vertices, normals, and attributes of the plurality of objects and a plurality of values for parameters of the at least one of the virtual radar sensor, the virtual lidar sensor, or the virtual sonar sensor;

for the at least one of the virtual radar sensor, the virtual lidar sensor, or the virtual sonar sensor, compute, by the 3D virtualization environment, at least one of radar range and radar amplitude, a point cloud of lidar range and lidar reflectance, or sonar range and sonar reflectance, based on the reflectivity information;

transmit the at least one of the radar range and the radar amplitude, the point cloud of lidar range and lidar reflectance, or the sonar range and the sonar reflectance from the 3D virtualization environment to a modeling environment that includes a simulation model of a controller; and process the at least one of the radar range and the radar amplitude, the point cloud of lidar range and lidar reflectance, or the sonar range and the sonar reflectance by the simulation model of the controller to produce commands.

19. The one or more computer-readable media of claim 18 wherein the attributes of the plurality of the objects include material type, and the computing reflectivity information includes determining reflectivity coefficients as a function of the material types of the plurality of the objects.

20. The one or more computer-readable media of claim 19 wherein the reflectivity coefficients are determined from one or more lookup tables or from texture maps associated with the plurality of the objects.

21. The one or more computer-readable media of claim 18 wherein the computing the at least one of the radar range and the radar amplitude, the point cloud of lidar range and lidar reflectance, or the sonar range and the sonar reflectance includes calculating range for the plurality of the objects from information included in the 3D scene data.

22. The one or more computer-readable media of claim 18 wherein the parameters include a field of view (FOV) of the at least one of the virtual radar sensor, the virtual lidar sensor, or the virtual sonar sensor, the plurality of the objects are within the FOV, and the computing reflectivity information for the at least one of the virtual radar sensor, the virtual lidar sensor, or the virtual sonar sensor includes:

pre-distorting, by the 3D virtualization environment, the vertices of the plurality of the objects based on a spherical projection.

23. The one or more computer-readable media of claim 18 wherein the reflectivity information is computed using an illumination model that considers diffuse and specular lighting, but not ambient lighting.

24. An apparatus comprising:

a memory storing 3D scene data of a computer-based three dimensional (3D) virtualization environment, the 3D scene data including objects having vertices, normals, and attributes; and one or more processors configured to:

for a plurality of the objects of the 3D scene data, compute, by the 3D virtualization environment, reflectivity information in a frequency range or a wavelength range for at least one of a virtual radar sensor, a virtual lidar sensor, or a virtual sonar sensor, based on the vertices, normals, and attributes of the plurality of objects and a plurality of values for parameters of the at least one of the virtual radar sensor, the virtual lidar sensor, or the virtual sonar sensor;

for the at least one of the virtual radar sensor, the virtual lidar sensor, or the virtual sonar sensor, compute, by the 3D virtualization environment, at least one of radar range and radar amplitude, a point cloud of lidar range and lidar reflectance, or sonar range and sonar reflectance, based on the reflectivity information;

transmit the at least one of the radar range and the radar amplitude, the point cloud of lidar range and lidar reflectance, or the sonar range and the sonar reflectance from the 3D virtualization environment to a modeling environment that includes a simulation model of a controller; and process the at least one of the radar range and the radar amplitude, the point cloud of lidar range and lidar reflectance, or the sonar range and the sonar reflectance by the simulation model of the controller to produce commands.

25. The apparatus of claim 24 wherein the attributes of the plurality of the objects include material type, and the computing reflectivity information includes determining reflectivity coefficients as a function of the material types of the plurality of the objects.

26. The apparatus of claim 25 wherein the reflectivity coefficients are determined from one or more lookup tables or from texture maps associated with the plurality of the objects.

27. The apparatus of claim 24 wherein the computing the at least one of the radar range and the radar amplitude, the point cloud of lidar range and lidar reflectance, or the sonar range and the sonar reflectance includes calculating range for the plurality of the objects from information included in the 3D scene data.

28. The apparatus of claim 24 wherein the parameters include a field of view (FOV) of the at least one of the virtual radar sensor, the virtual lidar sensor, or the virtual sonar sensor, the plurality of the objects are within the FOV, and the computing reflectivity information for the at least one of the virtual radar sensor, the virtual lidar sensor, or the virtual sonar sensor includes:

pre-distorting, by the 3D virtualization environment, the vertices of the plurality of the objects based on a spherical projection.

29. The apparatus of claim 24 wherein the reflectivity information is computed using an illumination model that considers diffuse and specular lighting, but not ambient lighting.

* * * * *

UNITED STATES PATENT AND TRADEMARK OFFICE
CERTIFICATE OF CORRECTION

| | | |
|---|---|---|
| PATENT NO. | : 10,877,152 B2 | Page 1 of 1 |
| APPLICATION NO. | : 16/191552 | |
| DATED | : December 29, 2020 | |
| INVENTOR(S) | : Chad M. Van Fleet et al. | |

It is certified that error appears in the above-identified patent and that said Letters Patent is hereby corrected as shown below:

In the Specification

Column 6, Line 24:
"324 may be configured to determine which is objects from"
Should read:
--324 may be configured to determine which objects from--

Column 16, Line 34:
"in the MATLAB programming language. The code 3200"
Should read:
--is in the MATLAB programming language. The code 3200--

Signed and Sealed this
Twenty-fourth Day of June, 2025

Coke Morgan Stewart
*Acting Director of the United States Patent and Trademark Office*